(12) United States Patent
Winkelmolen

(10) Patent No.: US 10,130,107 B2
(45) Date of Patent: Nov. 20, 2018

(54) PROCESSING DEVICE FOR PROCESSING SLAUGHTERED AND PLUCKED POULTRY CARCASSES, COMPRISING POULTRY-SUPPORT DEVICES AND POULTRY-PROCESSING DEVICES

(71) Applicant: Linco Food Systems A/S, Trige (DK)

(72) Inventor: Antoine Jean Herman Winkelmolen, Shawnee, KS (US)

(73) Assignee: Linco Food Systems A/S, Trige (DK)

( * ) Notice: Subject to any disclaimer, the term of this patent is extended or adjusted under 35 U.S.C. 154(b) by 525 days.

(21) Appl. No.: 14/777,129

(22) PCT Filed: Mar. 17, 2014

(86) PCT No.: PCT/EP2014/055335
§ 371 (c)(1),
(2) Date: Sep. 15, 2015

(87) PCT Pub. No.: WO2014/140375
PCT Pub. Date: Sep. 18, 2014

(65) Prior Publication Data
US 2016/0021902 A1 Jan. 28, 2016

Related U.S. Application Data
(60) Provisional application No. 61/790,714, filed on Mar. 15, 2013.

(51) Int. Cl.
*A22C 21/00* (2006.01)
*A22C 21/06* (2006.01)
(52) U.S. Cl.
CPC ...... *A22C 21/0053* (2013.01); *A22C 21/0007* (2013.01); *A22C 21/06* (2013.01)

(58) Field of Classification Search
CPC . A22C 21/00; A22C 21/0007; A22C 21/0015; A22C 21/0023; A22C 21/0046; A22C 21/0053
(Continued)

(56) References Cited

U.S. PATENT DOCUMENTS 2,658,236 A 11/1953 Altenphol
2,685,706 A 8/1954 Zebarth
(Continued)

FOREIGN PATENT DOCUMENTS

CN 203845341 U 9/2014
EP 1056347 A2 12/2000
(Continued)

OTHER PUBLICATIONS

Search Report dated Jun. 19, 2015 from International Patent Application No. PCT/EP2014/055335 filed Mar. 17, 2014.
(Continued)

*Primary Examiner* — Richard T Price, Jr.
(74) *Attorney, Agent, or Firm* — Sunstone IP

(57) ABSTRACT

A processing system for processing slaughtered and defeathered poultry bodies, comprising a plurality of processing devices which, for the processing-transport of the poultry bodies separately from a main conveyor device, is designed with a processing-holding means which is movable on a circular path. The processing system has transfer stations arranged in succession along a main conveyor line, in which the poultry bodies are transported in a suspended manner by carrier devices. Each processing device is assigned a transfer station which is formed by a transfer pair having two rotary transfer devices. The first rotary transfer device removes the poultry bodies from the carrier devices and transfers them to the processing-holding means of the processing device. The second rotary transfer device removes the processed poultry
(Continued)

bodies from the processing-holding means of the processing device and transfers them to the carrier devices. Each carrier device has a pair of carriers with receivers for limbs of the poultry body and comprises a carrier-control device. Each carrier is configured with a controllable holding device which is connected with the carrier-control device via a control element that controls a holding member of the limb receiver. The limb receiver is open in an open position of the controllable holding member for the clamping-free insertion and removal of the poultry body limbs. The poultry-processing device has a processing-control device with which the processing-holding means is connected and is controllable along its circular path, namely in a starting position for receiving a poultry body, at least one processing position, and an end position for removing the poultry body.

47 Claims, 31 Drawing Sheets

(58) Field of Classification Search
USPC .......................... 452/106, 177, 179, 182–184
See application file for complete search history.

(56) References Cited

U.S. PATENT DOCUMENTS

| 4,178,659 | A | | 12/1979 | Simonds | |
|---|---|---|---|---|---|
| 4,184,230 | A | * | 1/1980 | Fox | A22C 21/0023 |
| | | | | | 452/120 |
| 4,658,476 | A | * | 4/1987 | van den Brink | A22C 21/0053 |
| | | | | | 452/53 |
| 4,660,256 | A | * | 4/1987 | Innes | A22C 21/0053 |
| | | | | | 452/167 |
| 4,709,448 | A | * | 12/1987 | McGuire | A22C 21/0053 |
| | | | | | 452/167 |
| 4,715,092 | A | * | 12/1987 | Lerner | A22C 21/0023 |
| | | | | | 452/151 |
| 5,269,721 | A | * | 12/1993 | Meyn | A22C 21/06 |
| | | | | | 452/117 |
| 5,453,045 | A | * | 9/1995 | Hobbel | A22C 21/0053 |
| | | | | | 452/182 |
| 5,505,657 | A | | 4/1996 | Janssen et al. | |
| 5,672,098 | A | * | 9/1997 | Veraart | A22C 21/0053 |
| | | | | | 452/182 |
| 6,227,021 | B1 | * | 5/2001 | Imanari | B21B 37/22 |
| | | | | | 72/11.4 |
| 6,277,021 | B1 | | 8/2001 | Meyn | |
| 7,018,283 | B2 | * | 3/2006 | Schmidt | A22C 21/0053 |
| | | | | | 452/179 |
| 7,520,802 | B1 | * | 4/2009 | Veldkamp | A22C 15/001 |
| | | | | | 452/51 |
| 7,662,034 | B2 | * | 2/2010 | Van Hillo | A22C 21/0023 |
| | | | | | 452/155 |
| 8,708,785 | B2 | * | 4/2014 | Aandewiel | B65G 47/846 |
| | | | | | 452/182 |

FOREIGN PATENT DOCUMENTS

| GB | 2118511 A | 11/1983 |
|---|---|---|
| NL | 8900871 A | 11/1990 |

OTHER PUBLICATIONS

Office Action dated Oct. 25, 2016 from Chinese Patent Application No. CN201480025243.9.
International Preliminary Report on Patentability dated Nov. 24, 2015 from International Patent Application No. PCT/EP2014/055335 filed Mar. 17, 2014.
International Search Report and Written Opinion of the International Searching Authority dated Oct. 20, 2015 from International Patent Application No. PCT/EP2014/055335 filed Mar. 17, 2014.

* cited by examiner

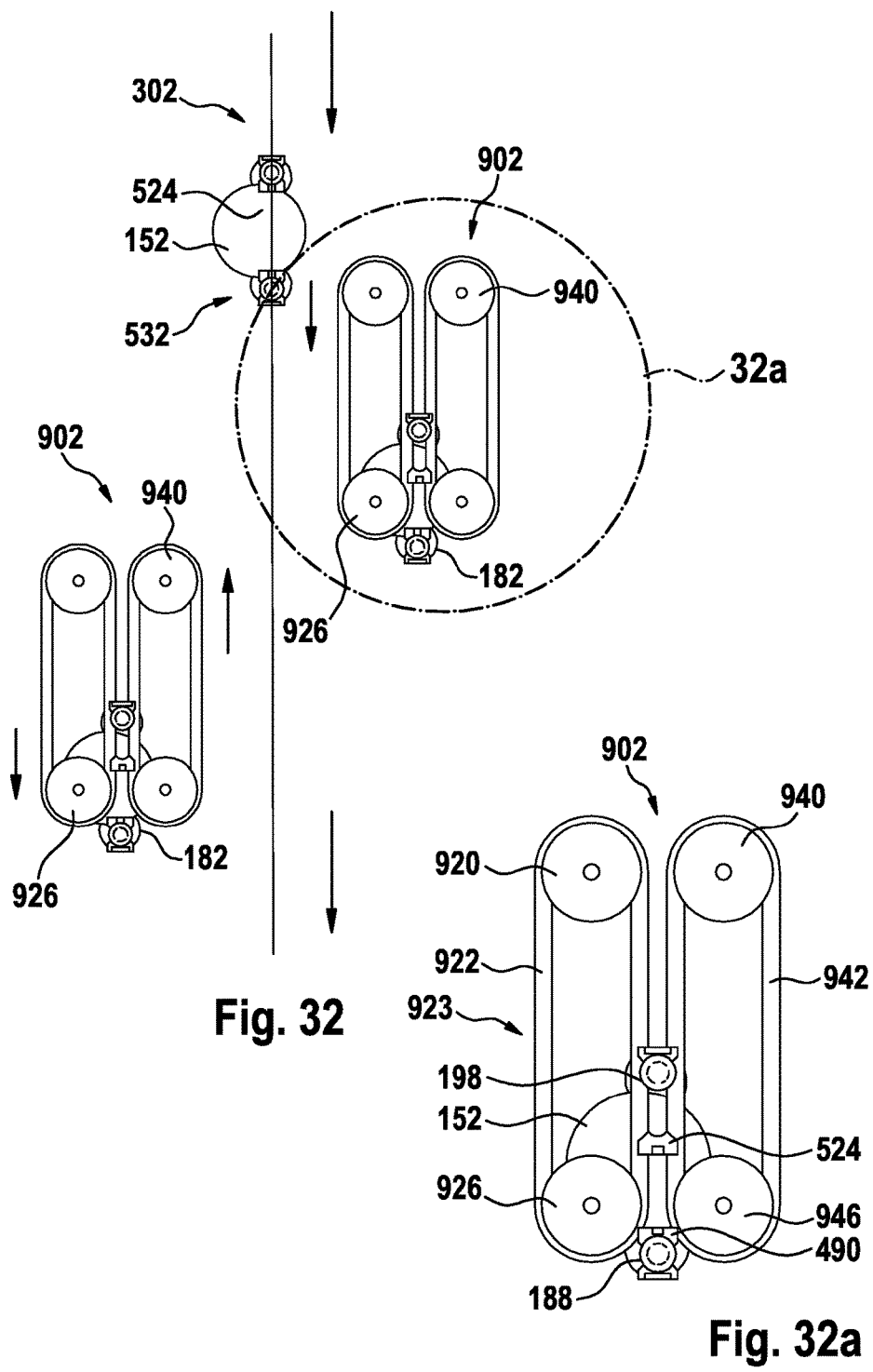

PROCESSING DEVICE FOR PROCESSING SLAUGHTERED AND PLUCKED POULTRY CARCASSES, COMPRISING POULTRY-SUPPORT DEVICES AND POULTRY-PROCESSING DEVICES

The invention relates to a processing system for processing slaughtered and defeathered poultry bodies, comprising a main conveyor device having carrier devices which are conveyed in succession along a main conveyor line and are each configured for the lateral transport of the poultry body, wherein each carrier device has a pair of carriers for suspending the poultry body by paired limbs, as well as a plurality of processing devices.

The invention relates also to a carrier device for the suspended lateral transport of a poultry body, in particular configured to form the main conveyor device of a processing system according to the invention having a plurality of such carrier devices, comprising an upper portion having a connecting member for connection with a conveyor line of a conveyor device, and a lower portion which has a pair of carriers with limb receivers for suspending the poultry body by paired limbs.

The invention is further directed to a processing device which is adapted and configured for use in a processing system according to the invention.

For carrying out the processing/treatment (called processing hereinbelow) of slaughtered poultry which is intended for consumption, specially configured systems, which form installations or machines, are used. Poultry processing comprises in particular the separation/removal of animal parts in order to separate desired tissue parts from undesired tissue parts. In addition, flesh parts and tissue parts which have been separated off and can be put to good use are finished and packaged for sale to consumers.

Known poultry-processing systems are equipped with a conveyor installation which has carrier devices for transporting the slaughtered animals through different treatment stations or devices. Known carrier devices each have a pair of carriers, in particular in the form of carrier loops, which in pairs receive in particular hocks or ankle joints of the poultry, wherein the poultry body so suspended by paired limbs is oriented with its rear end upwards and with the front end downwards. The treatment stations are formed by processing devices, by way of which animal parts or tissue parts are separated off when the poultry passes through the processing devices. In conventional poultry-processing systems (treatment installations), the poultry is suspended in the carrier device once and, always in conjunction with this carrier device, is transported to all the processing devices and, suspended in the carrier device, processed therein. Other processing devices are known which have two or more overhead/suspended conveyors each equipped with carrier devices, wherein the poultry is transferred by transfer devices from one overhead/suspended conveyor to another. In such known systems, the speed of the treatment operation and the mechanical treatment of the poultry is limited. The conveyor sections and devices must be adapted in particular to the processing devices. Conversely, the processing devices must also be adapted and designed in particular for use on the conveyor section. Transport of the whole poultry body during processing/manipulation of the poultry body by way of the carrier device of the overhead/suspended conveyor also impairs the quality control or the weighing of the poultry in a total process.

Objects of the invention are to provide a processing system for slaughtered and defeathered poultry bodies which is equipped to simplify and improve the manipulation and transport of the poultry bodies along a main conveyor line. In particular, high conveyor speeds of a main conveyor device are to be achieved; carrier devices of the main conveyor device are to remain free of processing forces; the suspension of carrier devices of the main conveyor device is to be simplified; loading and unloading of the conveyor-carrier devices with the poultry bodies are to be reliable and safe; the conveyor-carrier devices are to be universally configured for the transfer of poultry bodies to processing devices and also for the removal of the poultry bodies from processing devices; the processing system is to be configured optimally for the transport, positioning and processing of the poultry bodies for a plurality of processing operations, in particular for evisceration, gutting, cleaning, cutting up and weighing; any adaptation of the main conveyor-carrier devices to the various individual processing operations is to be unnecessary; hygiene requirements are to be met to a special degree. These objects are to be achieved in a mutually complementary manner.

In conjunction with the features of the processing system mentioned hereinbefore, the objects according to the invention are achieved in that, for the processing-transport of the poultry bodies separately from the main conveyor device, the processing devices are each formed with a processing-holding means which is movable on a circular path, in that the system has at least two transfer stations which are arranged in succession along the main conveyor line and each of which has at least one associated processing device, wherein each transfer station is formed by a transfer pair which has two rotary transfer devices, namely a first rotary transfer device which, in each case on a tangential path, is arranged and configured to remove the poultry bodies from the carrier devices of the main conveyor line and to transfer the removed poultry bodies to the processing-holding means of an associated mentioned processing device, and a second rotary transfer device which, in each case on a tangential path, is arranged and configured to remove the processed poultry bodies from the processing-holding means of an associated mentioned processing device and to transfer them to mentioned carrier devices, which are free for the suspension of poultry bodies, for lateral further transport along the main conveyor line.

The processing system according to the invention, which forms at least part of a treatment installation for poultry treatment, comprises the succession of carrier devices, each of which conveys a poultry body along the main conveyor line of the main conveyor device (conveyor installation) to the processing devices, in particular also cutting-up stations, weighing devices and/or cleaning devices. The carrier device holds the poultry body firmly, for example by the legs, with the cloaca at the top and the neck at the bottom. The transfer stations are configured to transfer the poultry bodies to the processing devices and to remove them from the processing devices and transfer them to the carrier devices of the main conveyor device again. Each transfer station comprises the two rotary transfer devices, in a pair, which remove the poultry bodies from the carrier devices on a tangential path or suspend them in free carrier devices again. Similarly, one rotary transfer device transfers the poultry bodies to at least one processing device, and the other rotary transfer device in the pair receives all the poultry bodies from the at least one processing device. The poultry bodies are processed independently of and without any connection with the main conveyor device or the conveyor installation of the machine. The carrier devices are arranged in particularly close succession along the main conveyor line independently of processing requirements, so that the number of poultry bodies which can be conveyed through the treatment installation is maximised. The first rotary transfer device is a rotary device of the carousel type, which is arranged in a rotatable manner, namely with gripper devices that are movable along a circular path, immediately adjacent to the main conveyor line of the main conveyor device. The second rotary transfer device is preferably identical in terms of construction with the first rotary transfer device.

In conjunction with the features mentioned hereinbefore, a carrier device according to the invention, in particular as a multiple part of the mentioned main conveyor device, is designed in such a manner that the carrier device has a carrier-control device which forms part of the carrier device and has at least one control element, and that each of the two carriers is configured with a controllable holding device which is connected via the at least one control element with the carrier-control device and which has at least one holding member, which can be controlled by way of a mentioned control element, as part of the limb receiver, wherein the limb receiver, in an open position of the controllable holding member, is open for the insertion and removal of the limbs without clamping and can be brought into contact, that is to say into positive and/or non-positive engagement, with the limbs only in a closed position of the holding member.

A processing device according to the invention which is adapted and configured for use in a processing system according to the invention is designed, for the processing-transport of the poultry bodies wholly separately from elements of the main conveyor device, with a processing-holding means which is movable on a circular path, and the processing device has a control device with which the processing-holding means is connected and is controllable in terms of its position in dependence on its path position along the circular path, wherein at least three positions are provided, namely a starting position for receiving a poultry body, at least one processing position for holding the poultry body during processing, and an end position for removing the poultry body from the processing device. The poultry bodies are positioned in a particular manner by the processing-holding means. The configuration and arrangement are in particular also such that the poultry bodies can be placed by way of the controllable adjustment in height positions (vertical positions), in horizontal positions and/or in positions between those positions. That is to say, each poultry body is positioned optimally and individually at or in front of each tool or, generally, a processing device, which also include, for example, positioning device, suction device or fluid-delivering device, wholly independently of conveyor means of the main conveyor line, in particular independently of carrier devices, holding loops or the like transported in succession on a line. In particular, processing is simplified, the yield is increased, the processing quality is improved and the operating speed is increased. Improved, in particular quicker and localised, cleaning is achieved, and maintenance and also in particular operating safety are simplified.

The transfer stations provided according to the invention, in conjunction with the independent processing devices equipped with their own conveyor/holding means, are of particular importance in terms of the mentioned advantages. It is essential that each transfer station is formed by a transfer pair which has the two rotary transfer devices. The transfer pair uncouples a processing device or a group of processing devices from the main conveyor device. It is also essential that the removal or transfer of the poultry bodies always takes place on a tangential path, wherein the poultry bodies are freed completely from the main conveyor-carrier devices but the main conveyor-carrier devices are configured to interact with the transfer pair in such a manner that they continue the main conveying when processing is complete or solely during processing-free transport. Transfer on a tangential path is characterised in that each poultry body, while continuing to be transported laterally, changes conveyor path in a transfer zone with the same conveying direction and continuously, that is to say without a bend in the path. The configuration is advantageous such that, in each transfer zone, corresponding gripper device and holding/carrier device overlap with gripper/holding openings. The carrier devices of the main conveyor device advantageously have holding openings or receivers which are associated with the two limbs and which, on transfer or removal, can be placed, by control, in a clamping-free, contactless state with each of the limbs. For transfer/removal on a tangential path, the arrangement can also be configured with a transfer zone between the carrier devices and the rotary transfer device, or between the latter and the associated processing device, which is without overlap. The arrangement is then such that the gripper/holding openings or receivers are movable in the transfer zone next to one another, in particular also vertically without offset, and each transfer zone has an associated guide device, for example comprising a rod or a lever or also a slide, which pushes the limbs out of one gripper/holding opening into the other gripper/holding opening, in a direction transverse to the tangential transfer path. The carrier devices are then also advantageously equipped with at least one receiver which can be placed, by control, into a clamping-free state.

The processing of the poultry bodies between the transfer pair of the transfer station can be configured universally and accordingly adapted to individual requirements. The processing system as a whole can correspondingly be configured universally, can be operated particularly reliably and with a high conveying speed with the main conveyor device, and can be adapted to operational changes. For example, a transfer station having at least one associated processing device can simply be removed from the processing operation as a whole and replaced by a corresponding transfer station having at least one associated processing device, for example in order to carry out maintenance work and/or refitting.

Advantageously, at least one transfer station is configured to be in transfer communication with a processing group which comprises at least two processing devices. A particular group configuration is a configuration in which three transfer stations are in transfer communication with three processing devices, wherein a processing device is associated with each transfer station. The three processing devices advantageously form a group which removes viscera from the poultry bodies. Accordingly, the group comprises a first processing device, namely a cloaca-cutting device for opening the rear end of the poultry body before evisceration, a second processing device, namely an opening device for making a cut in the poultry body from the cloaca to the breastbone, and a third processing device, namely an eviscerating device for removing the viscera from the poultry body. The number of transfer stations of the group can be reduced by combining a plurality of the mentioned processing devices into one unit.

In a particularly preferred form of the invention, the eviscerating device is connected with a viscera-conveyor device which is configured to convey removed viscera and is formed by a viscera-circulating conveyor and a viscera-transfer device, wherein the viscera-transfer device is arranged to remove the viscera of each poultry body from the eviscerating device and to transfer the viscera to the viscera-circulating conveyor. It is an important and particular feature that the viscera-transfer device is arranged in the region of the at least one processing device for evisceration, which is generally uncoupled from the main conveyor device by way of the transfer pair of the rotary transfer devices, between the two rotary transfer devices.

In a further preferred form, in order to synchronise the transport of the viscera provided by the viscera-circulating conveyor with the transport of the eviscerated poultry bodies provided by the main conveyor device, the viscera-conveyor device is so configured that the viscera are associated with the separately transported poultry bodies from which they have been removed. Advantageously, an inspection device for evaluating the viscera assigned to the associated eviscerated poultry body is formed in that an inspection conveyor portion of the viscera-circulating conveyor and an inspection conveyor portion of the main conveyor device are designed and arranged to run synchronously side by side.

In another particular form, one of the transfer stations is in transfer communication with a processing group which comprises three tissue-removing processing devices, wherein the group for processing has, in succession, a crop-removing device for removing neck tissue, in particular the crop and windpipe, a neck-removing device for detaching and removing the neck, and a lung-removing device for removing the lungs. The tissue-removing processing group in an installation can particularly advantageously be arranged and operated downstream of said group with which viscera are removed.

In an advantageous form, at least one of said transfer stations is arranged on a different running and processing side of the main conveyor device from at least one further mentioned transfer station. In particular in conjunction with this form, in one embodiment the two carriers of the carrier pair of the carrier device are formed to be open on at least one lateral longitudinal side of the carrier device so that the poultry bodies can be suspended and removed free of vertical offset. In conjunction therewith, the carrier devices are advantageously each suspended on a conveyor line free of rotation about a vertical axis corresponding to the direction of suspension of the poultry body.

In a particular and preferred form, each of the two carriers of a said carrier device is configured with a holding device which, for suspension and for the removal of the left and right paired limbs, can be controlled into an open state, a closed state and, associated therewith, into a holding state in dependence on the conveyor position of the carrier device along the main conveyor line.

It is essential that each carrier in the phase of transfer in the open state delivers the poultry body without clamping or receives the poultry body without clamping, on a tangential path. This is achieved by means of the mentioned control system, which is distinguished in particular and preferably in that the holding devices of the two carriers can be operated and controlled independently of and separately from one another. As a result, the transfer operation is particularly quick, safe and controllable. If required, the control system can be so configured that specific poultry bodies, for example poultry bodies detected by an electronic monitoring and tracking device, pass through the transfer station without being removed from the carrier device.

In a preferred form, at least one of the processing devices has a control device with which the processing-holding means, associated with and in dependence on its path position along its circular path, can be controlled in terms of its height position, wherein at least three height positions are provided, namely a starting position, which is associated with the transfer of the poultry bodies from the first rotary transfer device, at least one processing position during processing, and an end position, which is associated with the removal of the poultry bodies from the processing device.

The processing-holding means is advantageously formed by a succession of identical processing-holding devices or units which are arranged along the circular path and are each formed with a gripper device for receiving, firmly holding and delivering the pair of limbs of the poultry bodies. In a preferred form, at least one of the processing devices comprises a frame device or a body on which there are arranged a succession of identical processing units or stations and also the processing-holding means which is movable on the circular path. Advantageously, each processing unit/station comprises at least one processing devices from a group of processing devices which includes processing tools and positioning devices. According to a preferred form, at least one of the processing devices comprises a control device with which at least one mentioned processing means of the processing units can be controlled to act on the poultry body in dependence on the processing-transport of the poultry body.

The carrier device according to the invention, which is configured for the controlled production of a clamping-free open state, is distinguished inter alia in that the limbs of the poultry body can be placed in positive locking and/or non-positive locking engagement with the limb receiver only when the holding member is in a closed position. In any open position of the controllable holding member, the limbs can freely be inserted into and removed from the receiver. Advantageously, the carrier-control device can be so configured that the controllable holding members are freely movable beyond a controlled open position for further opening of the limb receiver.

In a preferred form of the carrier device, each of the two carriers has a pair of carrier-leg members, wherein free leg ends of the carrier-leg members are the only means for forming the limb receiver for the suspended holding of the left or right limbs and wherein in each case at least one carrier-leg member of the leg-member pair forming said controllable holding member is movable by way of the at least one control element from a closed position, which holds the associated limb receiver in the closed state, by an adjusting movement into an open position which is distanced from the other leg member and opens the limb receiver, and can be positioned into the closed position again by controlled elimination of the offset.

With regard to particularly reliable removal of the poultry body from the receiver, the carrier-control device is advantageously so configured that the movable leg ends are held in the closed position at a fixed maximum distance from the opposing leg member of the pair, free of clamping and return force.

A particularly compact form of the carrier device is achieved when carrier-leg members of the two leg-member pairs that are located on the inside in the carrier device are movable in a controlled manner for opening and closing the limb receivers, while the two other, outer carrier-leg members of the two leg-member pairs are fixedly arranged on the carrier device. Advantageously, the movable carrier-leg members are each pivotably mounted about a pivot axis for movement between the closed position and the open position.

In a preferred form of the carrier device, there is formed between mutually facing carrying edges of the carrier receivers a passage which is open at both longitudinal sides of the carrier device, the passage being provided at least in the state of the open limb receiver.

The carrier-control device according to the invention, which is configured to control the two controllable holding devices independently and separately from one another, has control elements which are each associated with a holding device. The form of the carrier device is then advantageously such that the two control elements each have a control body, for example a control projection, protruding from the carrier device with an arrangement such that the control bodies are configured, independently of one another, to engage into an individual control member of a control-guide device. Advantageously, the two control bodies protrude from the carrier device on mutually opposing longitudinal sides thereof. Advantageously, the carrier device comprises a carrier housing which forms a cavity in which the carrier-control device is arranged. A particularly compact and robust design of the carrier device is achieved.

The connecting member of the carrier device, which is configured for connection with a conveyor line of the main conveyor device, advantageously has a pivot bearing for pivotal articulation about a horizontal pivot axis, which is so configured that the carrier device in the suspended state for the lateral transport of a poultry body comes to lie parallel to the straight-line section of the conveyor line. This means that the carrier device is articulated either about a pivot axis perpendicular to the straight-line main conveyor line or about a pivot axis parallel with the main conveyor line. This pivotal mounting can assist with the operations in the transfer zones. The pivotal mounting can also be provided in order to load and empty the carrier devices particularly simply.

According to a particularly advantageous form of the poultry-processing device, each processing-holding device receiving the paired limbs of the poultry body is configured with a clamping device for positioning the poultry body, which clamping device is formed by a stationary positioning element, which is fixedly arranged on the processing device, and the associated processing-holding device, wherein the positioning element is arranged and configured to engage behind part of the poultry body, a clamping space for a clampable part of the poultry body is formed between the positioning element and the processing-holding device, and the clamping position of the poultry body can be produced by a movement, controllable by way of the processing-control device and associated with the processing position, of the processing-holding device relative to the stationary positioning element. Advantageously, the clamping device comprises a buffer device connected between the processing-holding device and a holding-guiding device of the processing-control device, which buffer device, when a clamping distance determining the clamping state of the poultry body between the positioning element and the processing-holding device is reached, effects the limitation thereof and accordingly counteracts the movement of the processing-holding device controlled by means of the control device.

Dependent claims are directed to the mentioned embodiments of the invention and to other expedient and advantageous embodiments. Only particularly expedient and advantageous forms and possibilities of embodiment are described in greater detail with reference to the following description of the exemplary embodiments shown in the schematic drawings. Any single or detailed feature described within an exemplary embodiment is to be understood as being an independent detailed example for other embodiments or forms which fall under the invention and which are not described or are not described in full.

The terminology used in the description serves merely for easier reference; it is not to be interpreted as limiting. For example, expressions such as upwards, downwards, forwards, backwards, rearwards, right and left relate to the disclosed object as oriented in the view under consideration. The expressions "inwards" and "outwards" relate to directions towards and away from the geometric centre of the described object and specified parts thereof. The terms forwards and backwards relate in principle to the direction of movement. The terminology encompasses the mentioned terms and expressions, derivations thereof and expressions having a similar meaning.

In the drawings

FIG. 30-34 and 30A-33A show top views of the weighing device with a poultry body which is being weighed and transferred to a carrier device.

An embodiment of a processing system 210, which forms a treatment installation, is shown in its entirety and with details by means of FIG. 1-34.

Figure 1:
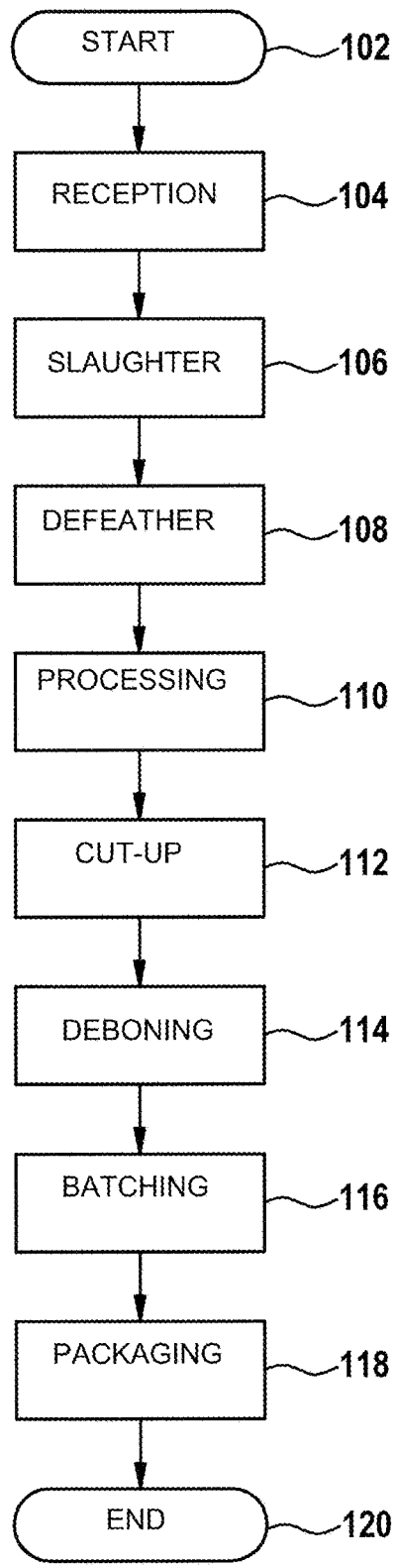
FIG. 1 shows a flow diagram which illustrates the method steps of poultry processing and treatment in general.

FIG. 1 is a flow diagram which illustrates general method steps of the processing, including the treatment, of poultry bodies. Starting from the start 102, live poultry first reaches the entry step 104. The poultry is there prepared for slaughter 106. After slaughter in step 106, the poultry bodies are defeathered in step 108 in order to prepare them for processing or treatment in step 110. After processing/treatment 110, the poultry bodies are treated further in order to remove desired and undesired tissue by cutting up 112 and deboning 114. Desired tissue, namely usable or edible parts such as in particular fillets and/or other poultry parts, are then portioned in step 116 and packaged according to step 118 for supply and delivery to consumers. The method described generally by the overview ends at step 120.

Operations of processing of step or process section 110 are carried out by way of a processing system 210 according to the invention. In one embodiment, the processing system 210 comprises an integrated computer monitoring and control system (not shown) for controlling the movement and operation of a conveyor installation, to which there belong the processing device with a main conveyor device 302 and a plurality of transfer stations 60 and associated processing devices 21, during the entire process and for acquiring, processing and using information or data relating to each poultry body 152 in the processing system 210.

Figure 2:
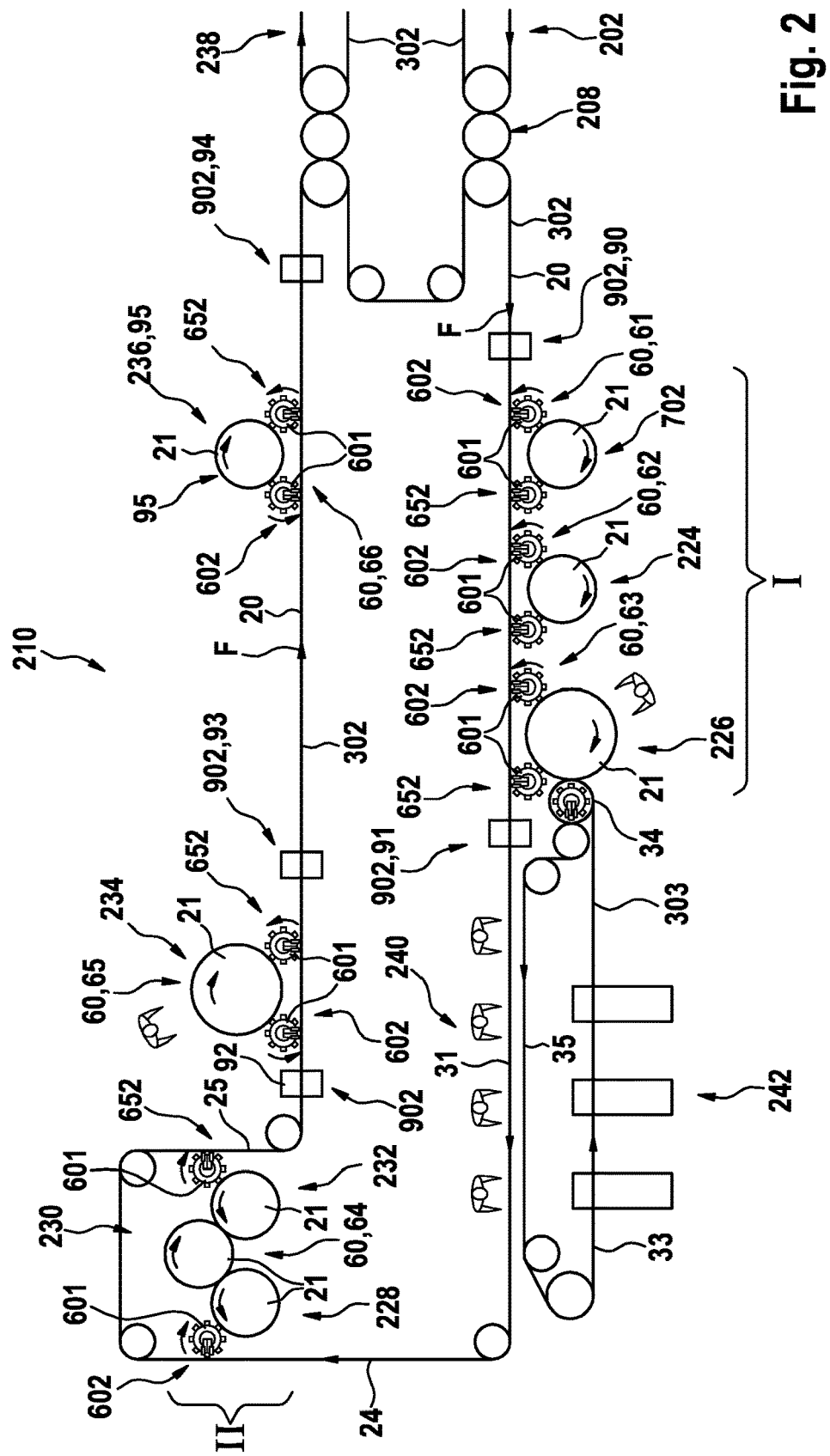
FIG. 2 shows a top view of an exemplary embodiment of a processing device according to the invention, which illustrates principles of the disclosed subject-matter.

FIG. 2 shows a top view of an exemplary embodiment of the processing system 210, which comprises six transfer stations 60, 61-66 and the associated processing devices 21. Poultry bodies 152 (see FIG. 3) pass from a pre-processing installation or device 202 into the processing system 210, from which they pass into a post-processing installation or device 238. The pre-processing device 202 comprises said steps of receipt/entry 104, slaughter 106 and defeathering 108. In one embodiment, the poultry bodies 152 are transferred from the pre-processing device 202 to a rotary weighing unit 208, in order to determine the weight of each poultry body 152 and separate from one another rope/chain-conveyor sections of the device 202 and of the system 210.

In one embodiment, the weight of the poultry bodies 152 is determined at one or more locations within the processing system 210 by way of weighing way or devices 902, 236, which are provided in addition to or instead of the rotary weighing unit 208. Weighing of each poultry body 152 prior to processing 110 provides a starting weight for each poultry body 152, on the basis of which it is possible to obtain a precise determination of the product yield of the poultry bodies 152 passing through the processing installation or processing system 210. At the end of the processing operations in step 110, the poultry bodies 152 are transferred from the processing system 210 to the post-processing device 238. For this transfer too, the poultry bodies 152 are suspended on another rope/chain-main conveyor section.

According to one embodiment, the poultry bodies 152 in the processing system 210 are transferred to a rotary weighing unit 236 operated with a transfer station 60, 66 before they pass to the post-processing device 238. In an alternative embodiment, the weight of the poultry bodies 152 is determined by way of a weighing device 94, 902 instead of by means of the rotary weighing unit 236. Each weighing device 902 can be replaced by a rotary weighing unit 236.

The processing system 210 comprises carrier devices 402 of the main conveyor device 302 for conveying the poultry bodies 152 to and from each transfer station 60 and optionally between the transfer stations 60. According to one embodiment, each carrier device 402 has a marking such as, for example, a visual marking, a marking which can be detected by a computer, and/or a radio frequency identification (RFID) element. As a result, an operator is able, for example, to follow the poultry body 152 visually and/or by means of an integrated computer monitoring and control system through the entire processing/treatment operation. By following the carrier devices 402 and the poultry bodies 152 conveyed thereby, it is possible to detect and evaluate visual features and characteristics of the poultry body 152. Such features and characteristics are in particular broken wings, broken bones, blood spots, remaining feathers and the like, the current position of the poultry body 152 in the processing system 210, and the determination of which processing devices 21 a poultry body 152 has already passed through.

The carrier devices 402 move through the processing system 210 by means of the main conveyor device 302 along a main conveyor line 20. In the exemplary embodiment according to FIG. 2, each poultry body 152 first passes through a transfer station 60, 61. The transfer station 61, like the other transfer stations 60 of the processing system 210, is formed by a transfer pair 601, which has a first rotary transfer device 602 and a second transfer device 652. By means of the rotary transfer device 602, the poultry body 152 is transferred from the carrier device 402 to a processing device 21. The second rotary transfer device 652 removes the poultry body 152 from a or the processing device 21 and transfers it to a free carrier device 402.

A viscera-removing group I of processing devices 21 comprises three separate processing devices 21. That is to say, each of these processing devices 21 is arranged in transfer communication with an associated rotary transfer station 60. A plurality of these processing devices can also be connected directly together in a group. The first processing device 21 comprises a cloaca-cutting device 702 for opening the rear end of the poultry body 152 prior to disembowelment. The second processing device 21 is formed by an opening device 224 for making a cut in the poultry body 152 from the cloaca 156 to the breastbone. The third processing device 21 of the group I is an eviscerating device 226 for removing the internal organs of the poultry.

Downstream of the first group I of processing systems 21 there is arranged on the main conveyor line 20 a second group II of processing devices 21 which remove tissue. A first processing device 21 of group II is formed by a crop-removing device 228 for removing unwanted tissue parts attached to the neck, such as in particular the crop and the windpipe. The second processing device 21 of group II is a neck-removing device 230 for detaching and removing the neck. The third processing device 21 is formed by a lung-removing device 232.

In the case of processing group II, the three processing devices 21 are in transfer communication with a single associated transfer station 64. The three processing devices 21 of processing group II form a processing arrangement which receives the poultry bodies 152 from the first rotary transfer device 602 of the transfer station 64 and transfers the processed poultry bodies 152 to free carrier devices 402 by means of the second rotary transfer device 652. The three processing devices 21 of processing group II are formed by devices of the carousel type, wherein direct transfer of the poultry bodies 152 between the processing devices 21 is provided. The transfer station 64 is further characterised in that it is arranged between two conveyor portions 24, 25 of the main conveyor line 20 which are formed by diverting the main conveyor line 20. The conveyor directions of the two conveyor portions 24 and 25 are opposite relative to one another, wherein the first rotary transfer device 602 of the transfer pair 601 of the transfer station 64 is arranged in the conveyor portion 24 situated upstream, and the second rotary transfer device 652 is arranged in the conveyor portion 25 situated downstream.

Downstream of the tissue-removing processing group II there is arranged on the main conveyor line 20 a further transfer station 65 which is configured in conjunction with a processing device 21 of the carousel type in the form of a cleaning device 234. This is configured to clean the inside and outside of the poultry body 152 in order to remove all residues or spots left behind after the preceding processing steps.

At the end of the processing section of the processing system 210 there is formed a transfer station 66 in transfer communication with a processing device 21 of the carousel type, which is formed by the weighing device or unit 236.

All the transfer stations 60 are structurally identical with the transfer pairs 601 of the rotary transfer devices 602, 652. Structurally identical rotary transfer devices 602, 652 can be used interchangeably in the form of module pairs. They can be arranged on either of the longitudinal sides of the main conveyor line 20, as desired. In the exemplary embodiment, the transfer stations 61-63 and 65, 66 are arranged on one, the left, running side, and the transfer stations 64 are arranged on the other, the right, running side of the main conveyor device 302.

As is shown in the exemplary embodiment according to FIG. 2, in a preferred particular optional form, the first processing group I comprises a viscera-conveyor device 303 which is part of an inspection device 240. At the eviscerating device 226 there is arranged, viewed in the rotary conveying direction thereof, before the second rotary transfer device 652, in the vicinity thereof at the end of the processing section of the eviscerating device 226, a viscera-transfer device 34 which removes viscera in the form of viscera packs from each poultry body 152 and transfers them to a viscera-circulating conveyor 33 of the viscera-conveyor device 303. A viscera pack is usually formed by the heart, liver and stomach, which are held together by means of membrane. Such a viscera pack can be seized for transfer and transport at the protruding oesophagus, and the viscera-transfer device 34 and the viscera-circulating conveyor 33 are configured for that purpose.

The viscera-conveyor device 303 comprises an inspection conveyor portion 35, through which the viscera packs first pass before they reach a viscera-removing station 242 of the viscera-conveyor device 303. The inspection conveyor portion 35 is part of the inspection device 240. The inspection conveyor portion 35 and an inspection conveyor portion 31 of the main conveyor device 302 associated therewith in the inspection device 240 are arranged next to and run parallel with one another. Operation of the viscera-circulating conveyor 33, in conjunction with operation of the transfer station 63 and the associated pair of rotary transfer devices 602 and 652, is synchronised with the operation of the main conveyor device 302, so that the poultry bodies 152 are synchronised with their respective viscera pack and both parts are subject to a visual inspection together as a result of the parallel path thereby configured. The visual inspection allows the detection of anomalies which make a poultry body 152 or a viscera pack unsuitable for human consumption, or the detection of poultry bodies 152 or viscera packs which do not meet quality standards. The visual inspection can be carried out by operating personnel, as is shown in FIG. 2, or with full or partial automation, for example by means of a camera system. For example, a ClassifEYE® image processing system from Baader Linco, which carries out a quality classification, is used. By means of an automated visual inspection system, the visual inspection data determined for each poultry body 152, in particular using the RFID element attached to each product carrier 402, can be assigned to associated poultry bodies 152. After leaving the inspection device 240, the viscera packs are passed to associated removal points of the removal station 242, for example containers for gathering/collecting. Poultry bodies 152 that are to be removed from the process can be removed in section 31 of the inspection device 240 of the main conveyor device 302. Advantageously, the removal can take place on a running side of the main conveyor line 20 that is remote from the inspection conveyor portion 35 by means of carrier devices 402 configured therefor. Affected poultry bodies 152 can be isolated at a later point in time or in another location by means of appropriately marked carrier devices 402 in conjunction with the mentioned tracking system.

Instead of the eviscerating device 226, it is possible very generally to provide a separating-processing device, also in individual arrangement in the processing path between the two rotary transfer devices 602, 652. For example, a processing device is configured for cutting up the poultry bodies 152, with which device wings, for example, are separated off. Instead of the viscera-transfer device 34 there is provided very generally a separating-transfer device, which removes separated poultry parts from the separating-processing device and transfers them to a separating-circulating conveyor having a separating-conveyor device. These are configured in principle like the viscera-circulating conveyor 33 and the viscera-conveyor device 303. Instead of the inspection device 240, there can be provided very generally a monitoring and testing device, which assigns the separated poultry parts conveyed by way of the separating-circulating conveyor 33 to the poultry bodies 152 from which the separated poultry parts have been removed and which, for further conveying along the main conveyor line 20 by means of the carrier devices 402, is located downstream of the second rotary transfer device 652 of the associated transfer pair 601. The monitoring and testing device is configured with means known per se for determining the distance- and time-related positions of the poultry bodies or of parts thereof for the purpose of tracking. In particular, the separating-conveyor device comprises at least one station to which the separated poultry parts are preferably transported automatically.

After finally being weighed by way of the rotary weighing device 236 and/or the weighing device 902, the poultry bodies 152 leave the processing system 210 and are treated further in the post-processing device 238. In the post-processing device 238, the steps of cutting up 112, deboning 114, allocating or dividing into batches or portioning 116 and packaging 118 are carried out.

FIGS. 3-4 and 15-26 show parts of the processing system 210, namely the pair 601 of the two first and second transfer devices 602, 652 of the transfer station 60 and embodiments of the processing device 702. FIGS. 6 to 13 show embodiments of the carrier device 402.

Figure 3:
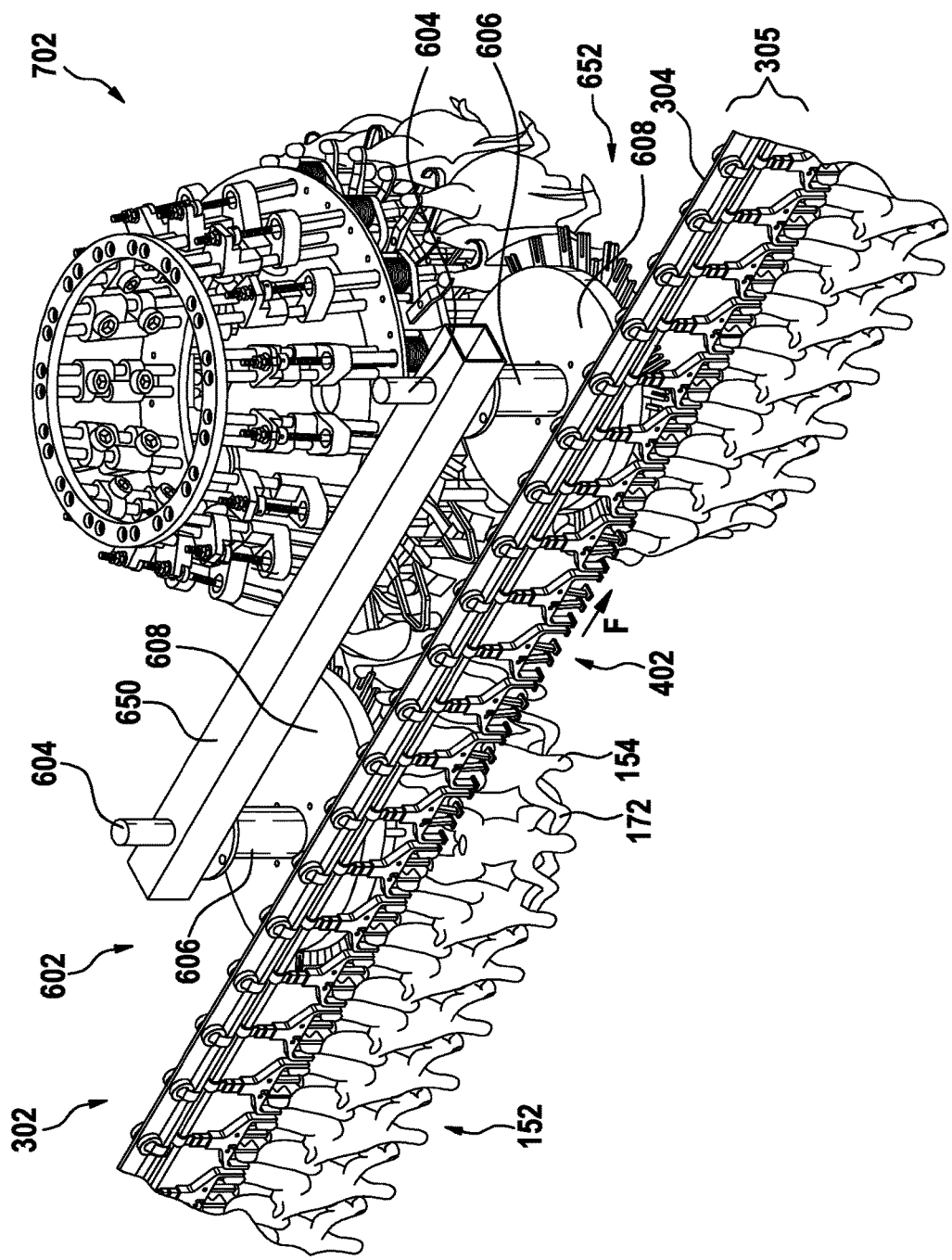
FIG. 3 shows a perspective partial view of the exemplary embodiment of the processing device, which shows poultry bodies which are being processed by a cloaca-cutting device.
Figure 5:
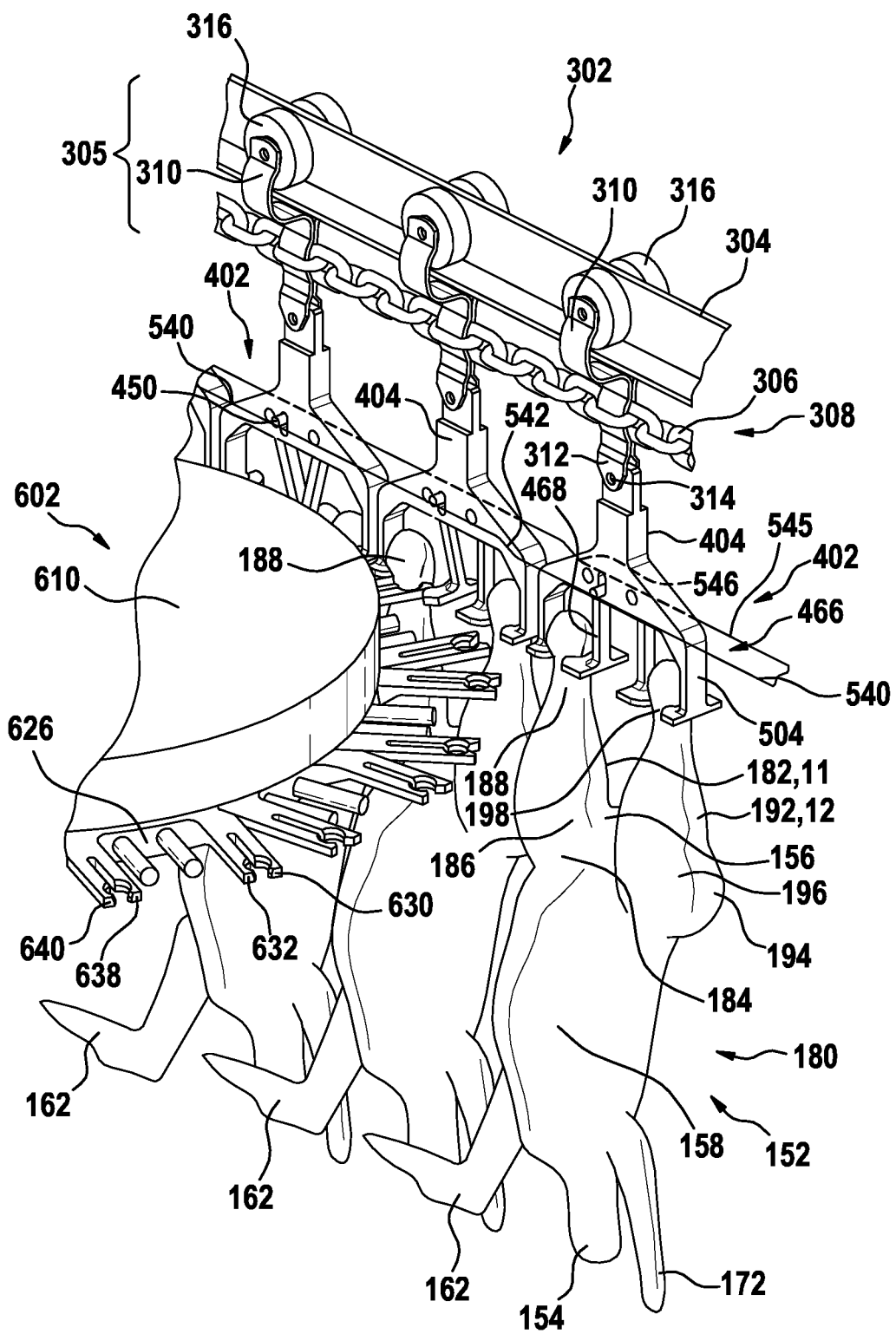
FIG. 5 shows a perspective partial view of a main conveyor device, which transfers poultry bodies to a first rotary transfer device.

As can be seen in FIGS. 3 and 5 in particular, the main conveyor device 302 according to one embodiment substantially comprises a plurality of trolleys 308 which are suspended from a track 304 and are movable along the track 304. Each trolley 308 has a frame 310 which supports rollers or wheels 316 which engage into the track 304 in a rolling manner. Each trolley 308 is connected by means of a fixing element 312 to an associated carrier device 402. The trolleys 308 are connected along the track 304 to form a line by a connecting member 306, which comprises a chain. The trolleys 308 are spaced apart along the track 304 by the connecting member 306 in such a manner that the distance between the mid-points of conveyed poultry bodies 152 is approximately six inches. The trolleys 308 are moved forwards along the track 304 by a drive element (not shown) which engages into the connecting member 306. The track 304 together with the connecting member forms a conveyor line 305, which determines the main conveyor line 20.

An embodiment of the carrier device 402 is described with reference to FIG. 3-14. The carrier device 402 is generally so configured that it receives a poultry body 152 with the left and right poultry legs 182, 192, in each case at the ankle joint. Instead of being suspended by these paired limbs, the poultry body 152 can also be suspended by other paired limbs 11, 12, for example by the wings.

As can be seen in FIG. 5, the poultry body 152 comprises a body and limbs. The body extends between the neck 154 and the cloaca 156, with the breast 158 at the ventral end 180 and the back meat on the opposing rear side. The limbs include wings 162, 172 and poultry legs 182, 192. The left wing 162 is arranged on the poultry body 152 on one side and the right wing 172 is arranged on the other side next to the neck 154. The left poultry leg 182 extends between the left ankle joint 188 and the left hip 184 with the left knee 186 located in between. The left poultry leg 182 is connected to the poultry body 152 via the left hip 184. The right poultry leg 192 extends between the right ankle joint 198 and the right hip 194 with the right knee 196 in between. The right poultry leg 192 is connected to the poultry body 152 via the right hip 194. It will be seen that the poultry bodies 152 in the described arrangement are conveyed laterally, namely with the outside of the leading left leg and the inside of the following right leg to the front. Of course, the poultry body 152 can also be suspended the other way round, with the right leg leading and the left leg following.

The carrier device 402 comprises an upper portion 404 and a lower portion 412. The upper portion 404 has a carrier neck 406 which extends between a first end on the lower portion 412 and a second end forming a connecting member 409. The connecting member 409 has a through-hole 408 for connecting the carrier device 402 with the main conveyor device 302. In one embodiment according to FIG. 3-12, the through-hole 408 extends in the width of the carrier neck 406 between a first face 416 and a second face 426 of the carrier device 402. In another embodiment (FIG. 13), the through-hole 408 extends in the length of the carrier neck 406, namely perpendicular to said width dimension and parallel to the conveyor line 305.

The lower portion 412 comprises a gripper device 466 which extends beneath a housing body 414 downwards therefrom. The housing body 414 also comprises part of the carrier neck 406. The gripper device 466 comprises a left carrier 41 for the suspension of the left poultry leg 182 and a right carrier 42 for the suspension of the right poultry leg 192, so that the gripper device 466 holds the poultry body 152 by its legs 182, 192. In one embodiment, the housing body 414 has a generally planar triangular shape, the carrier neck 406 extending upwards from a mid-point of the triangle. The housing body 414 has a substantially rectangular lower cavity 434 with a downwardly directed opening 435 and a pair of mutually adjacent first and second tubular cavities 436, 438, which extend from an upper end of the cavity 434 into the housing neck 406 and form cylindrical spaces which are open at the bottom.

The gripper device 466 comprises a pair of first and second outer carrier-legs 468, 502, which extend side by side and are fixedly (immovably) arranged on the housing body 414, and a pair of corresponding first and second inner carrier-arms 478, 512, which extend side by side and are movable relative to the fixed carrier-legs 468, 502. The first carrier-leg 468 comprises an elongated carrier-leg member 470 which extends downwards from a first end next to the opening 435 on the housing body 414 and ends at a second free leg end with a foot or plate-like carrying element 473, which has an inwardly projecting carrying edge 472. The inwardly facing edge of the carrying edge 472 has a crescent-shaped edge recess 474. The second carrier-leg 502 is arranged opposite the first carrier-leg 468 and at a distance therefrom. The second carrier-leg 502 comprises an elongated carrier-leg member 504 which extends downwards from a first end next to the opening 435, opposite the first leg 468, on the housing body 414 and ends at a second free leg end with a foot or plate-like carrying element 507, which has an inwardly projecting carrying edge 506. The inwardly facing edge of the carrying edge 506 forms a crescent-shaped edge recess 508.

The first carrier-arm 478 is arranged between the first carrier-leg 468 and the second carrier-leg 502 and cooperates with the first carrier-leg 468 to engage or release the left leg 182 of the poultry body 152. The first carrier-arm 478 has an elongated carrier-leg member 480 which comprises at a first end a head 482 and at an opposite free second end a plate-like carrying element 475 or a foot having an outwardly projecting carrying edge 490. The outwardly facing edge of the carrying edge 490 forms a crescent-shaped edge recess 492. The head 482 is received in the lower cavity 434 to be pivotable about a pivot axis 440 formed by a pin. The pin passes through a hole 484 in the head 482 and a first hole 418 in the first housing face 416 and a first hole 428 in the second housing face 426. The upper end of the head 482 comprises opposing first and second projections or lugs 486, 488, which are directed away from the head 482 towards the second carrier-leg 502 in order to receive a first control element 444 in the form of an actuation pin.

The second carrier-arm 512 is arranged between the first carrier-arm 478 and the second carrier-leg 502 and cooperates with the second carrier-leg 502 to engage and release the right leg 192 of the poultry body 152. The second carrier-arm 512 has an elongated carrier-leg member 514 which comprises at a first end a head 516 and at an opposite free second end a plate-like carrying element 525 or a foot with an outwardly projecting carrying edge 524. The outwardly facing edge of the carrying edge 524 forms a crescent-shaped edge recess 526. The head 516 is mounted in the lower cavity 434, remote from the first carrying arm 478, to be pivotable about a pivot axis 441 formed by a pin. The pin passes through a hole 518 in the head 516 and a second hole 420 in the first housing face 416 and a second hole 430 in the second housing face 426. The upper end of the head 516 comprises opposing first and second projections or lugs 520, 522, which are directed away from the head 516 towards the first carrier-leg 468 and receive a second control element 454 in the form of an actuation pin.

It will be seen that the carrier 41 is formed by the pair of carrier-leg members 470, 480 and the carrier 42 is formed by the pair of carrier-leg members 501, 514. As will be described below, the carrier-leg member 480 forms a controllable holding member of the carrier 41, or of the receiver 40.1. The leg member 514 forms a controllable holding member of the carrier 42, or of the receiver 40.2.

Advantageously, the upper housing portion 404, the lower housing portion 412, the first and second carrier-legs 468, 502 and the first and second carrier-arms 478, 512 are made of metal, for example stainless steel, or of a material which can be resiliently loaded. There come into consideration as materials which can be resiliently loaded reinforced plastic, nylon, polyoxymethylene and polyethylene in particular of high density. Said components can be produced by injection moulding, extrusion or mechanical processing.

Figure 6:
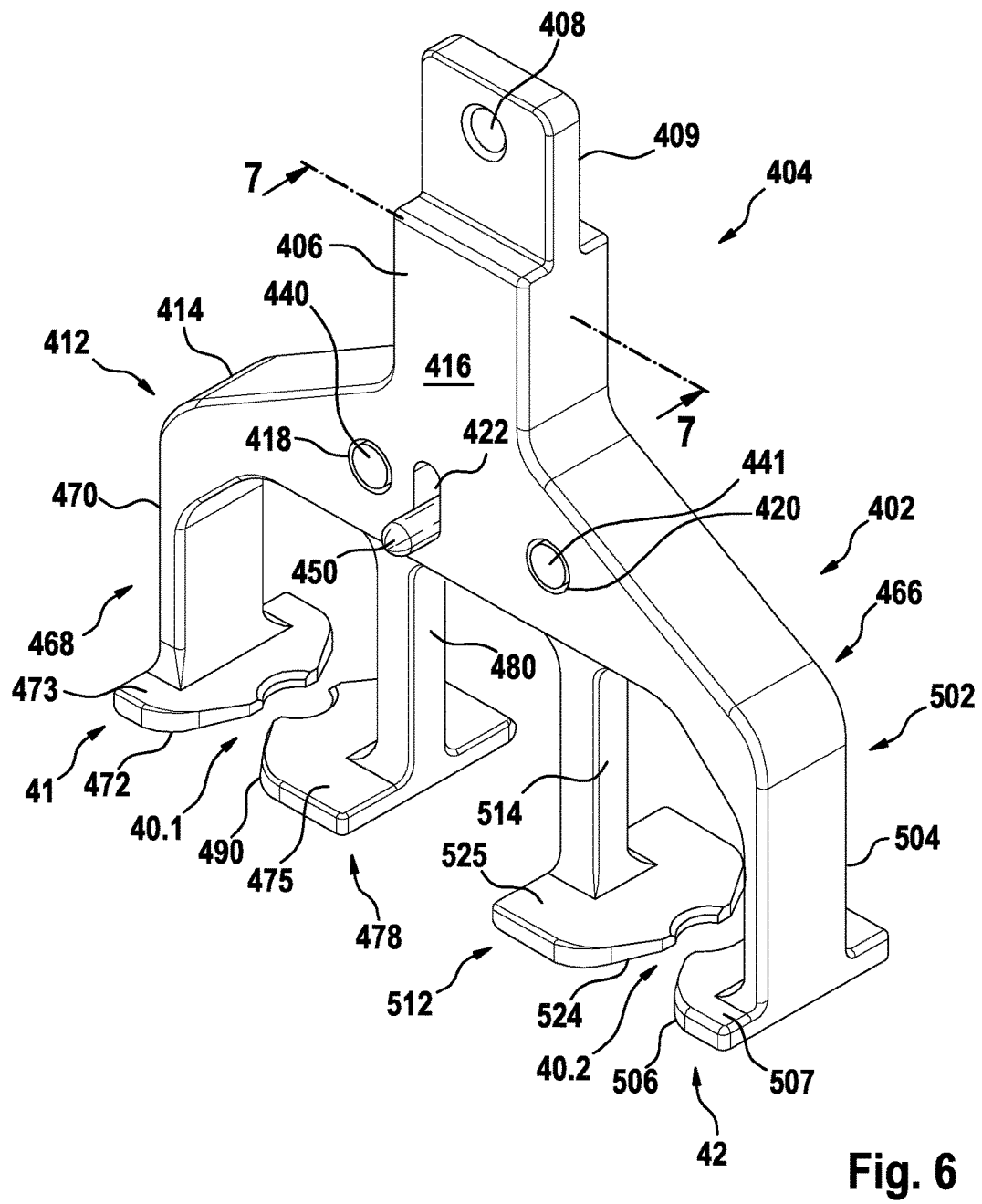
FIG. 6 shows a perspective view of a carrier device according to the invention, which shows a first side with two controllable carriers in closed positions.
Figure 7:
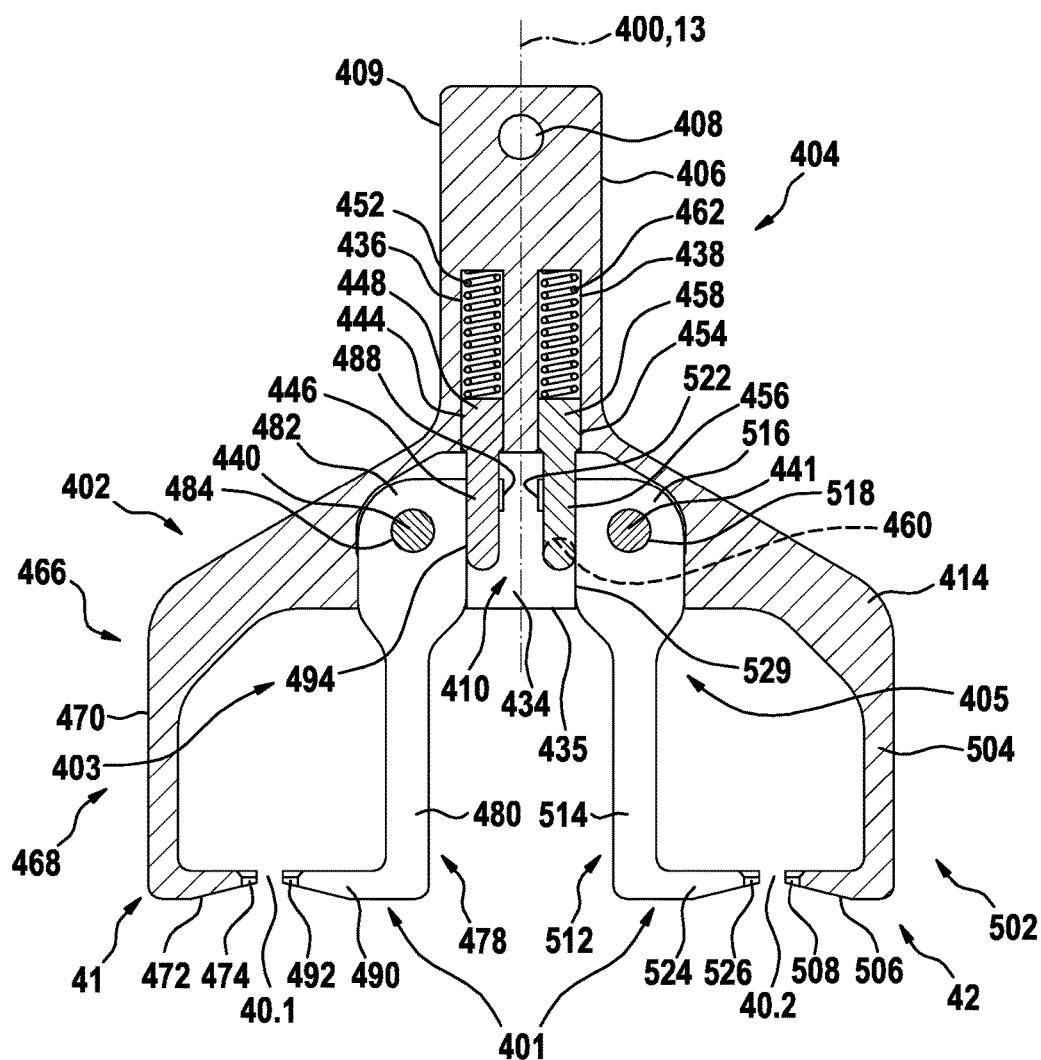
FIG. 7 shows a sectional view of the carrier device according to line 7-7 in FIG. 6 with the controllable carriers in the closed position.
Figure 8:
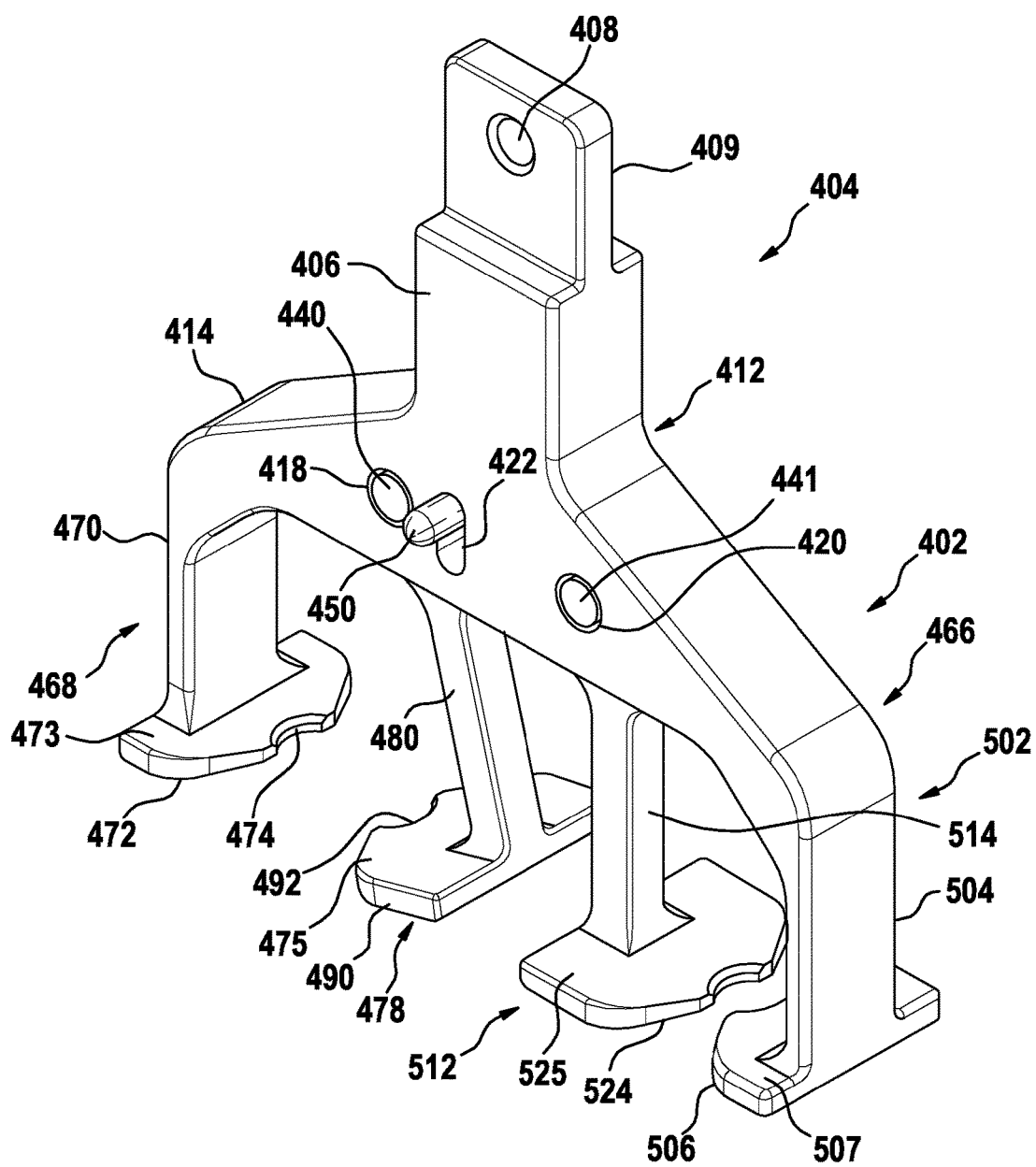
FIG. 8 shows a perspective view of a first side of the carrier device with one (the first) controllable carrier in the open position of an associated first controllable holding member.
Figure 9:
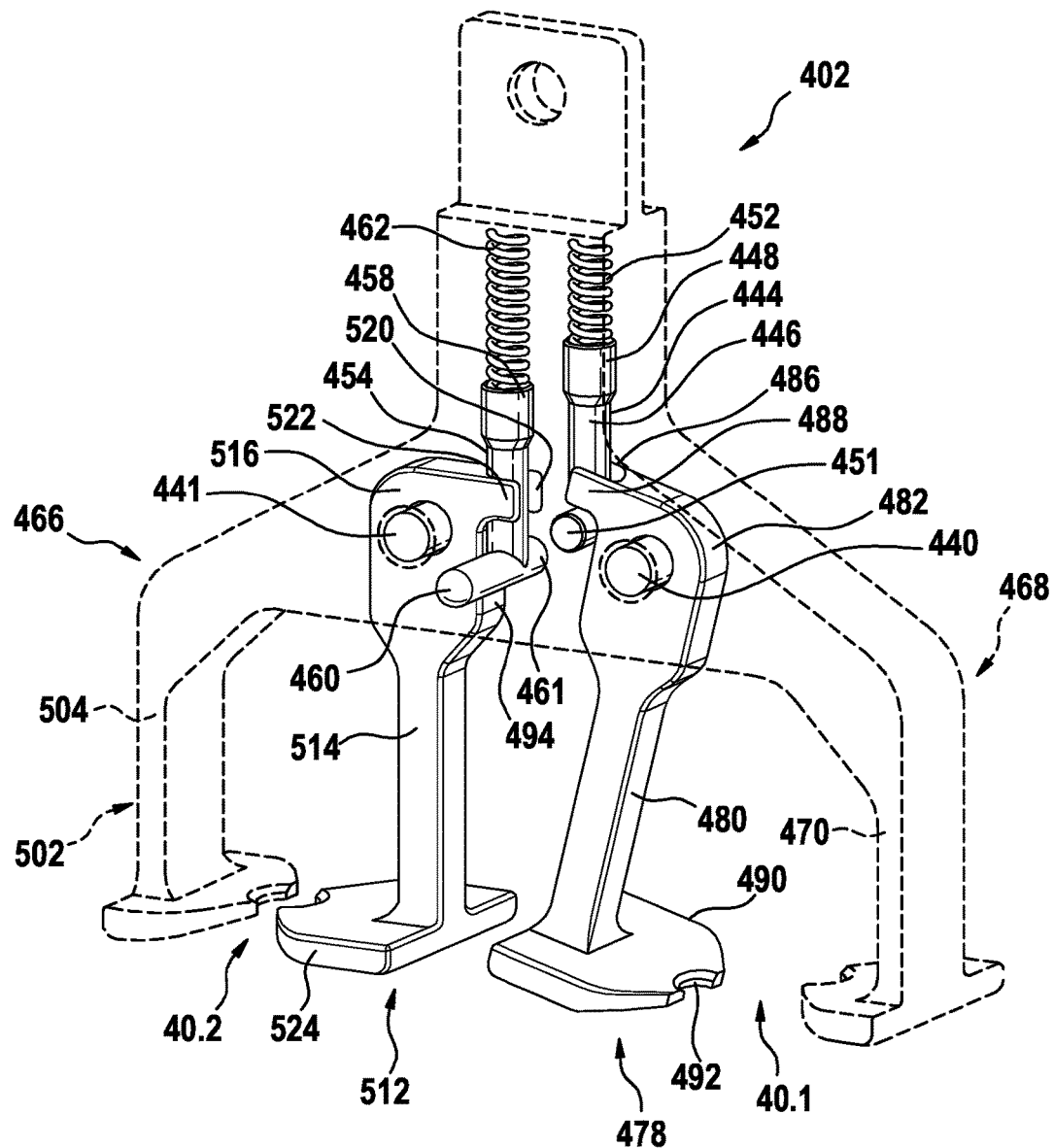
FIG. 9 shows a perspective view of the other (second) side of the carrier device with the first controllable carrier in the open position of the associated first controllable holding member.
Figure 10:
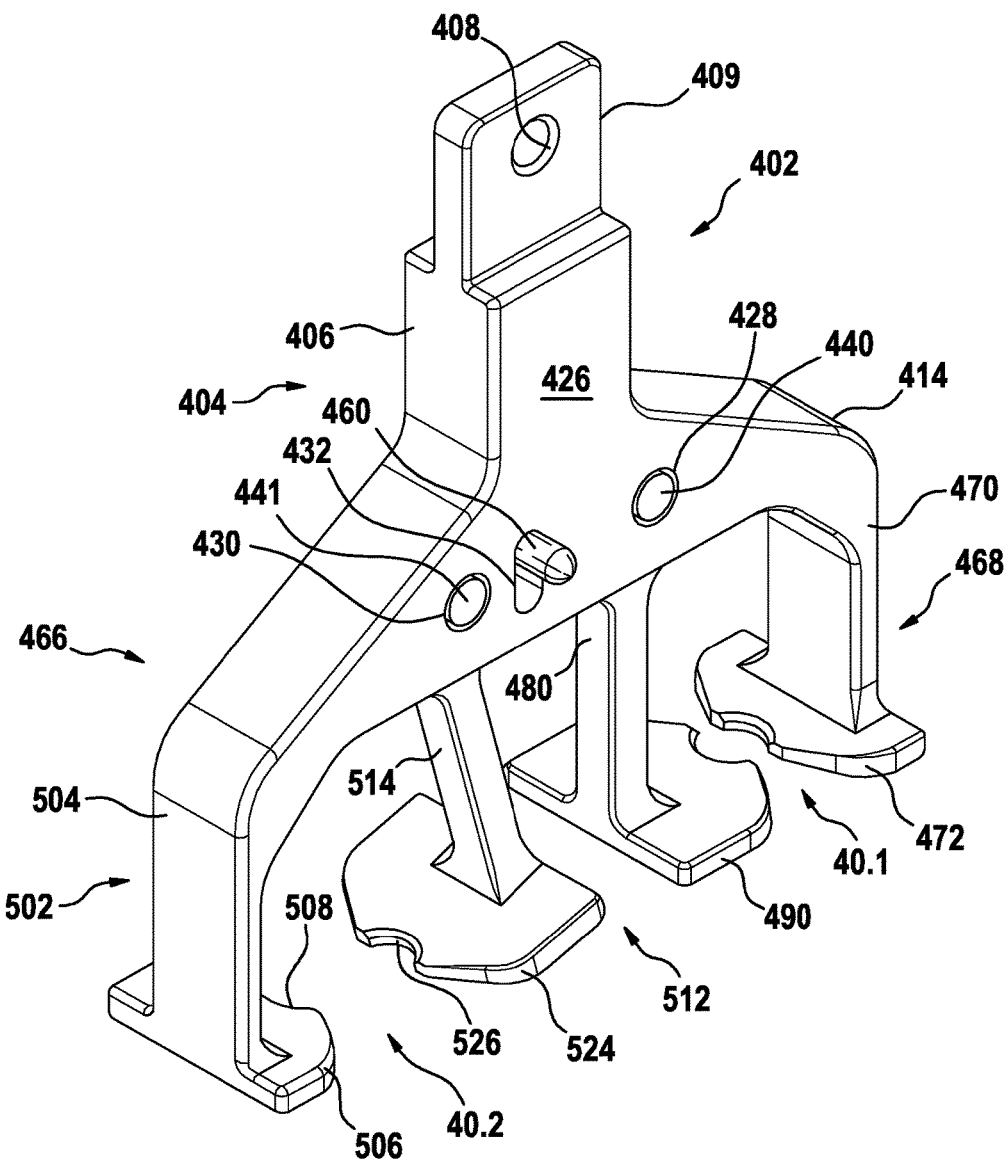
FIG. 10 shows a perspective view of the second side of the carrier device with the other (second) controllable carrier in the open position of an associated second controllable holding member.
Figure 11:
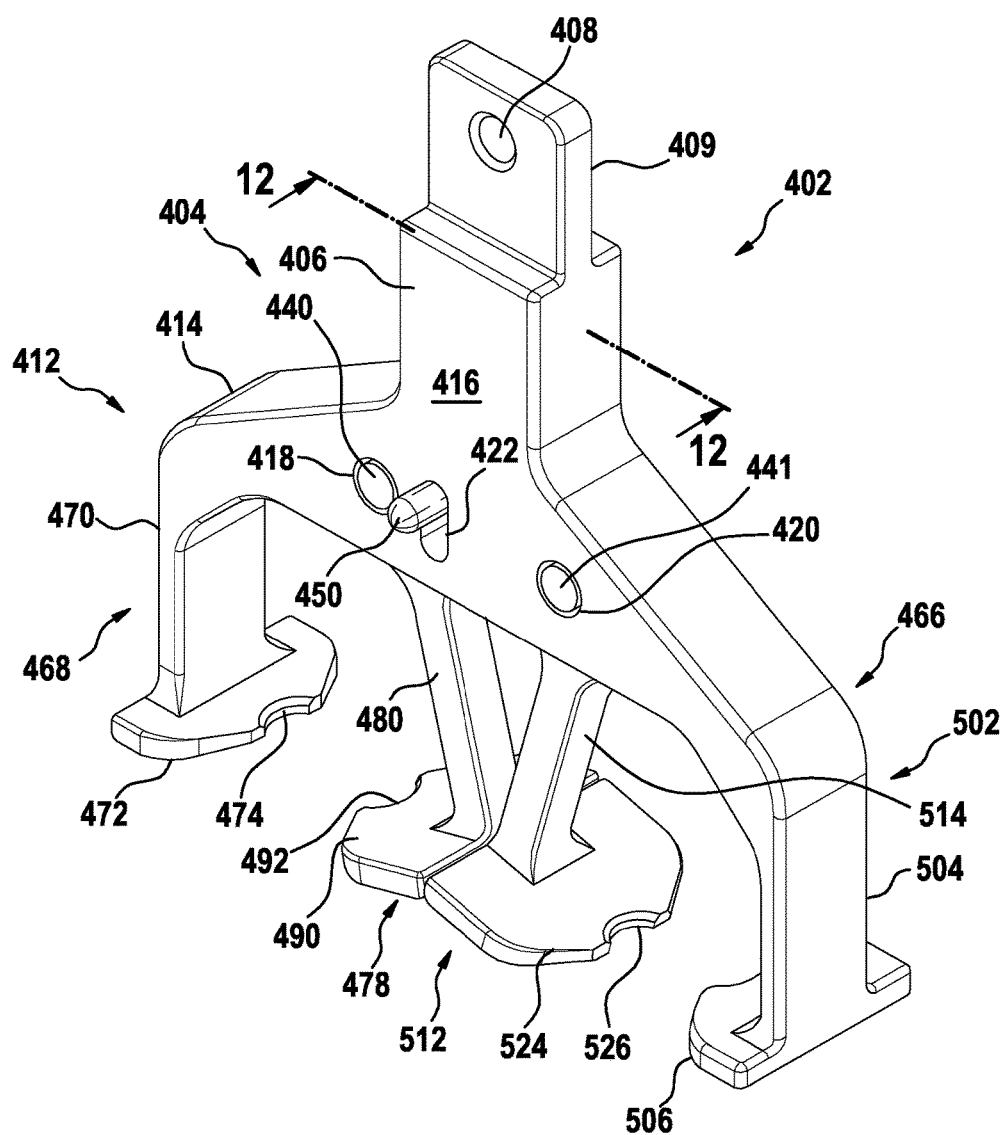
FIG. 11 shows a perspective view of the first side of the carrier device with the first controllable holding member and the second controllable holding member in the open position.
Figure 12:
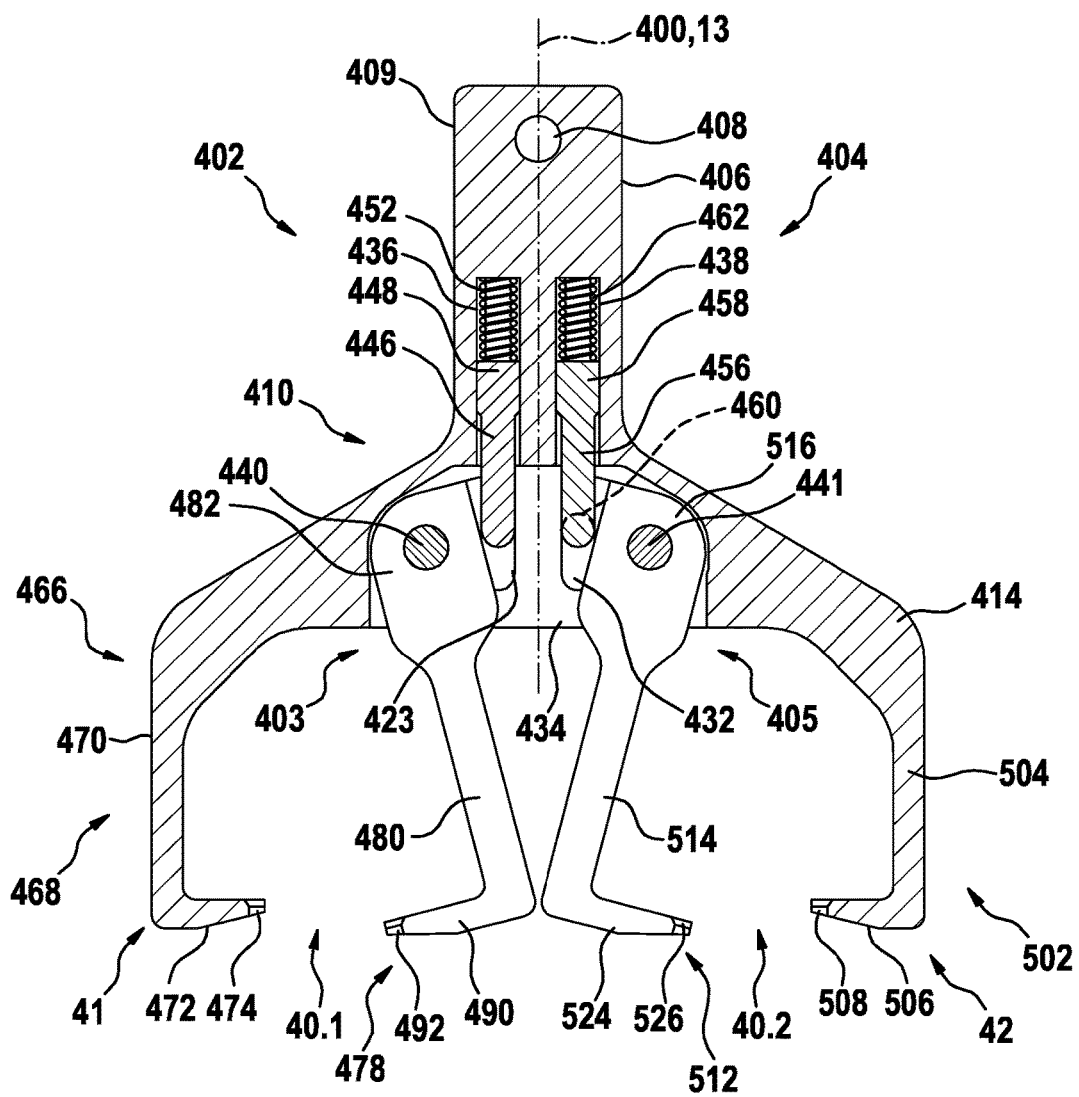
FIG. 12 shows a sectional view of the carrier device according to line 12-12 in FIG. 11 with the first controllable holding member and the second controllable holding member in the open position.

The first control element 444, namely the first actuation pin, comprises a rod member 446 formed by a rod-shaped body, having at a first end a bearing head 448 and having at a second end a control foot, formed by a control body 450 in the form of a control projection 450, and a shoulder 451. The rod member 446 passes through the U-shaped space between the first and second lugs 486, 488, the control body 450 and the shoulder 451 engaging beneath the lugs 486, 488. The control body 450 reaches outwards from the lower cavity 434 through an elongated opening 422 in the first housing face 416. An elongated recess 423, which is formed on the inside wall of the lower cavity 434 opposite the elongated opening 422, receives the shoulder 451. A first biasing device 452, which comprises a helical spring and is arranged between the upper side of the head 448 and the upper end, forming an opening base, of the first tubular cavity 436, provides a downwardly acting biasing force against the first control element 444, in order to bias it in a bottom position, the first carrier-arm 478 being in a closed position in relation to the first carrier-leg 468 (FIGS. 6 and 7). The carrier-leg member 480 with the carrying edge 490 is in the closed position, so that the receiver 40.1 of the carrier 41 is correspondingly in the closed state. The carrier-leg member 480 assumes a fixed distance with respect to the carrier-leg member 470, so that no active clamping force is produced between the carrying edges 472, 490 or the edge recesses 474, 492, that is to say no return force between said members that is effective active for holding. When the carrier-leg member 480 is swung open, the poultry leg 182 suddenly becomes free of clamping, that is to say free of any clamping support or clamping.

When the control projection 450 is in a lower position than the pin (pivot axis 440), the first carrier-arm 478 is prevented from pivoting inwards by the first control element 444, which occupies the space in the lower cavity 434 next to the lower portion of the head 482. In order to pivot the first arm 478 from the closed position (FIGS. 6 and 7) into an open position (FIGS. 8-9 and 11-12), the lower portion of the head 482 is moved into the cavity 434. Against compression of the first biasing device 452, the control projection 450 can be displaced into a higher position than the pin (pivot axis 440). As a result, the head 448 moves upwards into the first tubular cavity 436. During this upwards movement of the first control element 444, the shoulder 451 engages beneath the second lug 488 and the control body 450 engages beneath the first lug 486, whereby the first carrier-arm 478 pivots about the pivot axis 440, as a result of which the distance between the projecting carrying edges 472, 490 increases. Advantageously, the head 482 is provided with an inwardly facing biasing face 494, for example of stainless steel, in order to counteract wear between the first control element 444 and the first carrier-arm 478.

A second control element 454, namely a second actuation pin, comprises a rod member formed by a rod-shaped body, having at a first end 456 a bearing head 458 and having at a second end a control foot, formed by a control body 460 in the form of a control projection, and a shoulder 461. The rod member 456 passes through the space between the first and second lugs 520, 522, the control body 460 and the shoulder 461 engaging beneath the first and second lugs 520, 522. The control body 460 projects outwards from the lower cavity 435 through an elongated opening 434 in the second housing face 426. An elongated recess (not shown), which is formed in the inside wall of the lower cavity 435 opposite the elongated opening 434, receives the shoulder 461. The form corresponds to the recess 423 which is opposite the elongated opening 422. A second biasing device 462, which comprises a helical spring and is arranged between the upper side of the bearing head 458 and the upper end of the second tubular cavity 438, provides a downwardly acting biasing force against the second control element 454 in order to bias it in a bottom position, the second carrier-arm 512 being in the closed position in relation to the second carrier-leg 502 (FIG. 6-9).

When the control body 460 is in a lower position than the pin (pivot axis 441), the second carrier-arm 512 is prevented from pivoting inwards by the second control element 454, which then occupies the space in the lower cavity 434 next to the lower portion of the head 516. In order to pivot the second carrier-arm 512 from the closed position (FIG. 6-9) into an open position (FIG. 10-12), the lower portion of the head 516 is moved into the cavity 434. Against compression of the second biasing device 462, the control body 460 can be displaced into a higher position than the pin (pivot axis 441). As a result, the bearing head 458 moves upwards in the second tubular cavity 438. During this upwards movement of the second control element 454, the shoulder 461 engages beneath the first lug 520 and the control body 460 engages beneath the second lug 522, whereby the second carrier-arm 512 pivots about the pivot axis 441 and the distance between the projecting carrying edges 506, 524 increases. Advantageously, the head 516 is provided with an inwardly facing biasing face 528, for example of stainless steel, in order to counteract wear between the second control element 454 and the second arm 512. When the carrier-leg member 514 is swung open, the poultry leg 192 suddenly becomes free of clamping, that is to say free of any clamping support or clamping.

It will be seen that the control elements 444, 454 together with the biasing devices 452, 462 form a carrier-control device 410 which is integrated into the carrier device 404 or into the housing body 414. Each carrier 41, 42 is formed with its own controllable holding device 403 or 405, which on the one hand is configured with the first holding member, namely the movable carrier-leg element 480, and on the other hand with the second holding member, namely the movable carrier-leg element 514. The arrangement described by way of example allows the two holding devices 403, 405 to be controllable independently of one another, so that the carriers 41, 42 can be opened and closed in succession.

In an advantageous configuration, the mutually facing carrying edges 472, 490, 506 and 524 of the carrying elements 473, 475; 507, 525 are narrower than opposing rearward higher edges of the carrying elements. In particular, the face on the underside of the plate-like carrying elements 473, 475; 507, 525 is set back in such a manner that the thickness of the carrying elements decreases from a rearward portion to a forward portion. This measure in particular has the effect that gripper elements of the rotary transfer devices 60, for overlapping in the associated transfer zone, cooperate optimally with the receivers 40.1 and 40.2 for opening and closing.

The first and second control elements 444, 454, the first and second biasing devices 452, 462 or the elements thereof, and the pins forming pivot axes 440, 441 are advantageously made of metal, for example of stainless steel, or of another hardened, corrosion-resistant material.

In the closed state of the carrier device 402 (FIGS. 6-7 and 13), the edge recesses 474 and 492 of the first carrier-leg 468 and of the first carrier-arm 478 are located opposite one another, whereby they form an opening, forming an enclosure, for receiving part of the left poultry leg 182 between the left hock or ankle joint 188 and the left knee 186 of the poultry body 152. The enclosure is smaller than the left ankle joint 188 in the corresponding dimension, so that the carrier device 402 is able to hold the left poultry leg 182. The edge recesses 508 and 526 of the second carrier-leg 502 and of the second carrier-arm 512 are also located opposite one another, so that they form an opening, forming an enclosure, for receiving part of the right poultry leg 192 between the right hock or ankle joint 198 and the right knee 196. The enclosure is smaller than the right bird joint 198 in the corresponding dimension, so that the carrier device 402 is able to hold the right poultry leg 192. However, in the exemplary embodiment, when the receivers 40.1 and 40.2 are in the closed state, no active clamping force (resilient clamping with return force) is exerted as a result of the mentioned fixed distance between the mutually opposite edge recesses. The mentioned enclosures, formed by the mentioned carrier-leg members and carrying edges, are the only parts between which the poultry legs are held. As a result, clamping-free insertion of the poultry legs into the receivers 40.1 and 40.2 opened in a controlled manner, and clamping-free removal therefrom, are achieved.

In the drawings, the carrier devices 402 are shown transporting the poultry bodies 152 with the left poultry leg 182 leading in front of the right poultry leg 192. Depending on the desired orientation of the poultry bodies 152, however, it is also possible for the pair consisting of the first carrier-leg 468 and the first carrier-arm 478 to engage the right poultry leg 192, and for the pair consisting of the second carrier-leg 502 and the second carrier-arm 512 to engage the left poultry leg 182. In either case, the poultry bodies 152 are transported laterally, that is to say with the left or right poultry leg leading.

Figure 13:
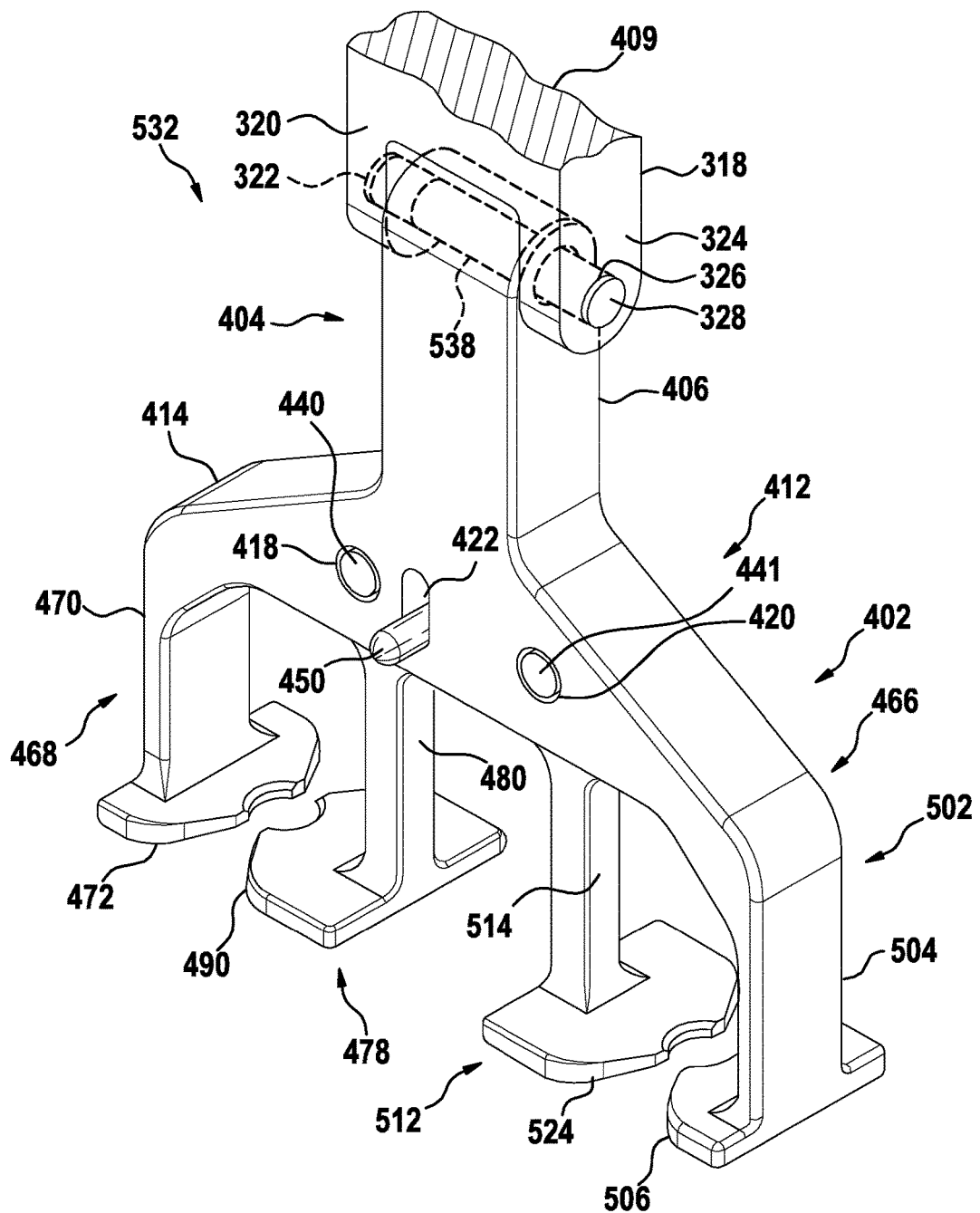
FIG. 13 shows a perspective view of a modified embodiment of the carrier device.

FIG. 13 shows a modified embodiment of the carrier device 402, namely a carrier device 532 having an upper portion 404 which is formed with a neck 406 which extends between a first end on the lower portion 412 to a second end with a modified connecting member 409. The second end comprises a through-hole 538 for connecting the carrier device 532 with the main conveyor device 302. The through-hole 538 passes through the neck 406 in the longitudinal distance between lateral edge faces. A connecting body 318 connects the carrier device 532 with the main conveyor device 302. The connecting body 318 is U-shaped with downwardly directed first and second legs 320, 324. First and second bearing openings 322, 326 receive a bearing pin 328, so that the carrier device 532 is able to pivot about a horizontal axis oriented parallel to the conveyor line 20.

According to an embodiment of the pairs of carrying elements 473, 475; 507, 525, the feet of the carrier-arms 478, 512 and carrier-legs 468, 502 enter a joining arrangement as soon as the carrier-arms and carrier-legs are in the closed position. With the limb receivers 40.1 and 40.2 in the closed state, a holding enclosure that is closed on all sides is formed. Shear forces that act on the poultry body 152 when the left and right poultry legs 182, 192 are removed from the gripper device 466 are thereby counteracted.

Figure 14:
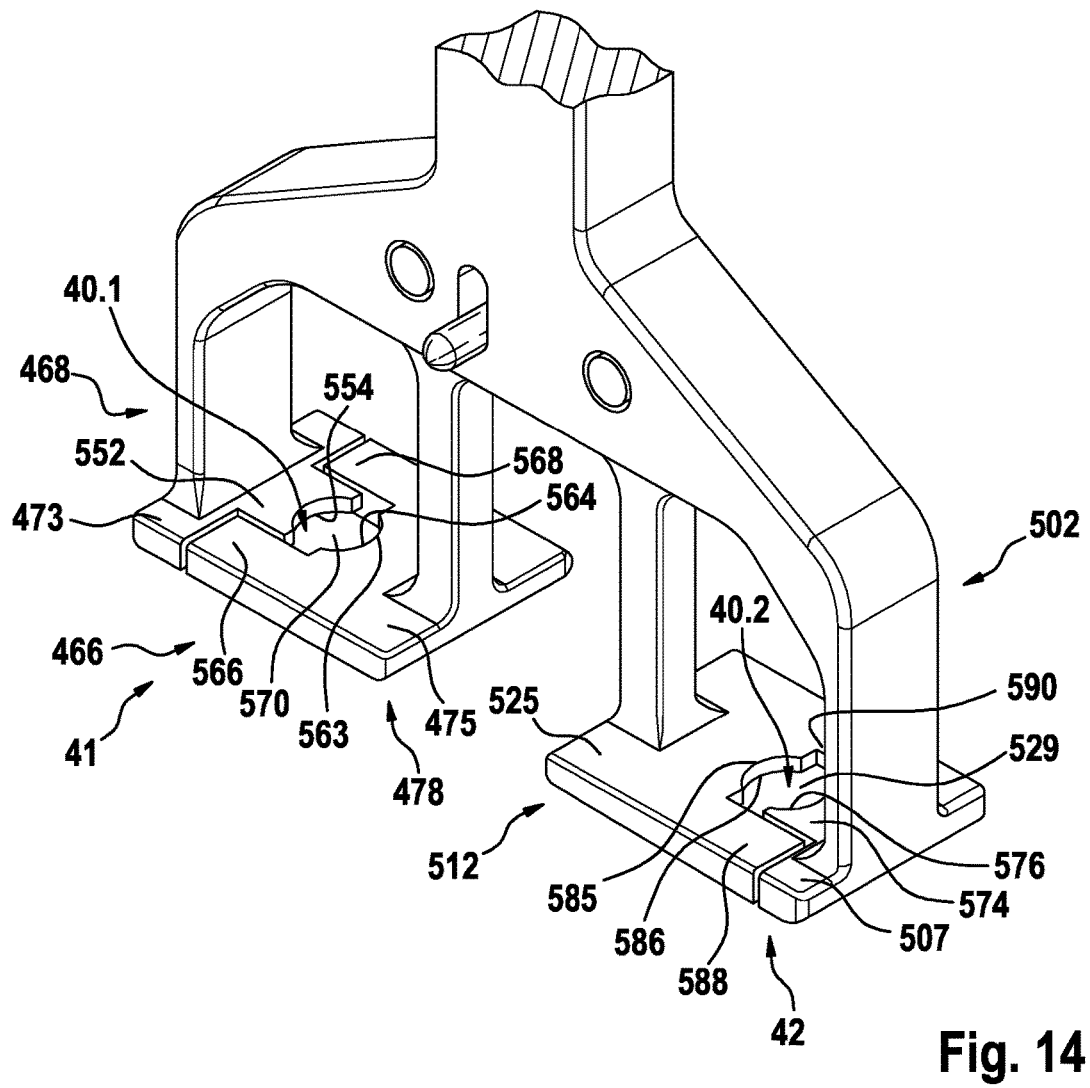
FIG. 14 shows a perspective view of a modified embodiment of the carrier device.

As will be seen in FIG. 14, a carrying element 473 formed at the second end of the first carrier-leg 468 comprises an inwardly projecting edge member 552, the inwardly facing edge of which forms a crescent-shaped recess 554. A carrying element 475 formed at the second end of the first carrier-arm 478 comprises a pair of outwardly projecting first and second tabs 566, 568 which are spaced apart from one another and form between them a recess 570 for receiving the projecting edge member 552. A rear web edge 563 between the tabs 566, 568 has a crescent-shaped recess 564. The recesses 554, 564 are located opposite and spaced apart from one another and form together with the first and second tabs 566, 568 a completely closed enclosure for receiving the left poultry leg 182 in a part between the left ankle joint 188 and the left knee 186.

A carrying element 507 formed at the second end of the second carrier-leg 502 comprises an inwardly projecting edge member 574, the inwardly facing edge of which forms a crescent-shaped recess 576. A carrying element 525 formed at the second end of the second carrier-arm 512 comprises a pair of outwardly projecting first and second tabs 588, 590 which are spaced apart from one another and form between them a recess 529 for receiving the projecting edge member 574. A rear web edge 585 between the tabs 588, 590 has a crescent-shaped recess 586. As in the first carrier 41, the recesses 576, 586 in the case of the second carrier 42 too are located opposite and spaced apart from one another and form together with the first and second tabs 588, 590 a completely closed enclosure for holding part of the right poultry leg 192 between the right ankle joint 198 and the right knee 196.

It will be seen that the carrier device 402 or 532 is formed substantially as a mirror image with respect to a vertical middle plane 400 (FIG. 7, 12). The controllable holding devices 403, 405 arranged in a pair are part of the carrier device 402, 532. Each carrier-control device 410 comprises the control element 444, 445 in conjunction with the associated biasing device 436, 438. Each control element 444, 454 is formed by the rod member 446, 456 with the control foot 450, 451; 460, 461. The control feet have the control bodies 450, 460, which project from the opposite longitudinal faces 416, 426 of the carrier device 402, 532 and are associated with control devices 540, 545 having control members, for example guide/inclined tracks 542, 546, of the main conveyor device 302. In this respect, the control feet and the longitudinal recesses guiding their shoulders 451, 461 are configured and arranged substantially point-symmetrically relative to the centre axis 13 of the carrier device 402, 532.

The carrier-leg members 480, 514 and the carrier-pivot arms 478, 512 can be so configured and arranged that they are able to swing open further in the open state of the receiver 40.1, 40.2. This is achieved, for example, with sufficient distancing of the pivot axes 440, 441 and sufficient size of the cavity 434 in the corresponding distance dimension.

The rotary transfer device 602 of the transfer pair 601 of the transfer station 60 will be described hereinbelow with reference to the first rotary transfer device 602 of the first transfer station 61.

Figure 15:
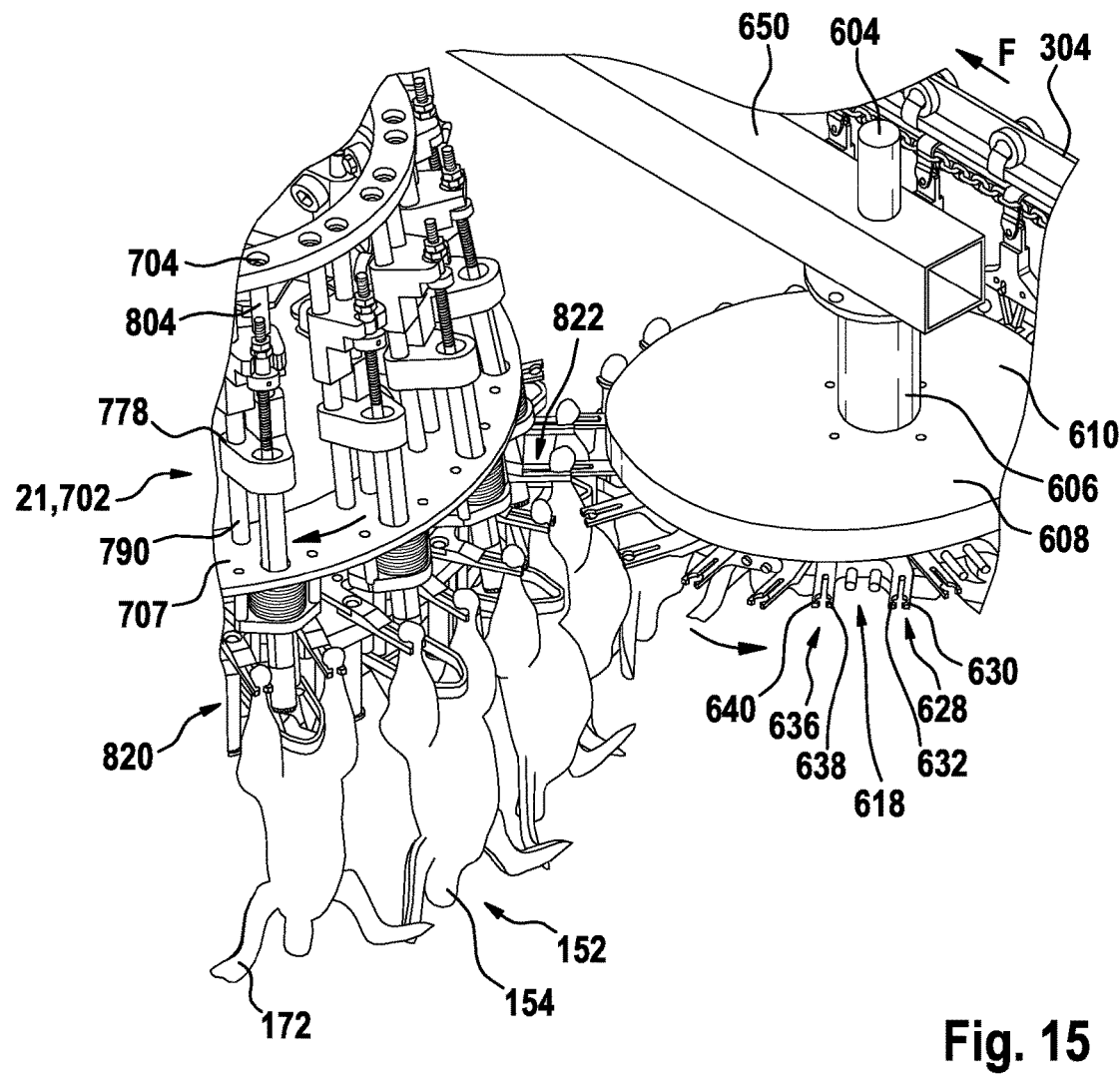
FIG. 15 shows a perspective partial top view of a first rotary transfer device of a transfer station which transfers poultry bodies to a first processing device, namely to a cloaca-cutting device, for example.
Figure 16:
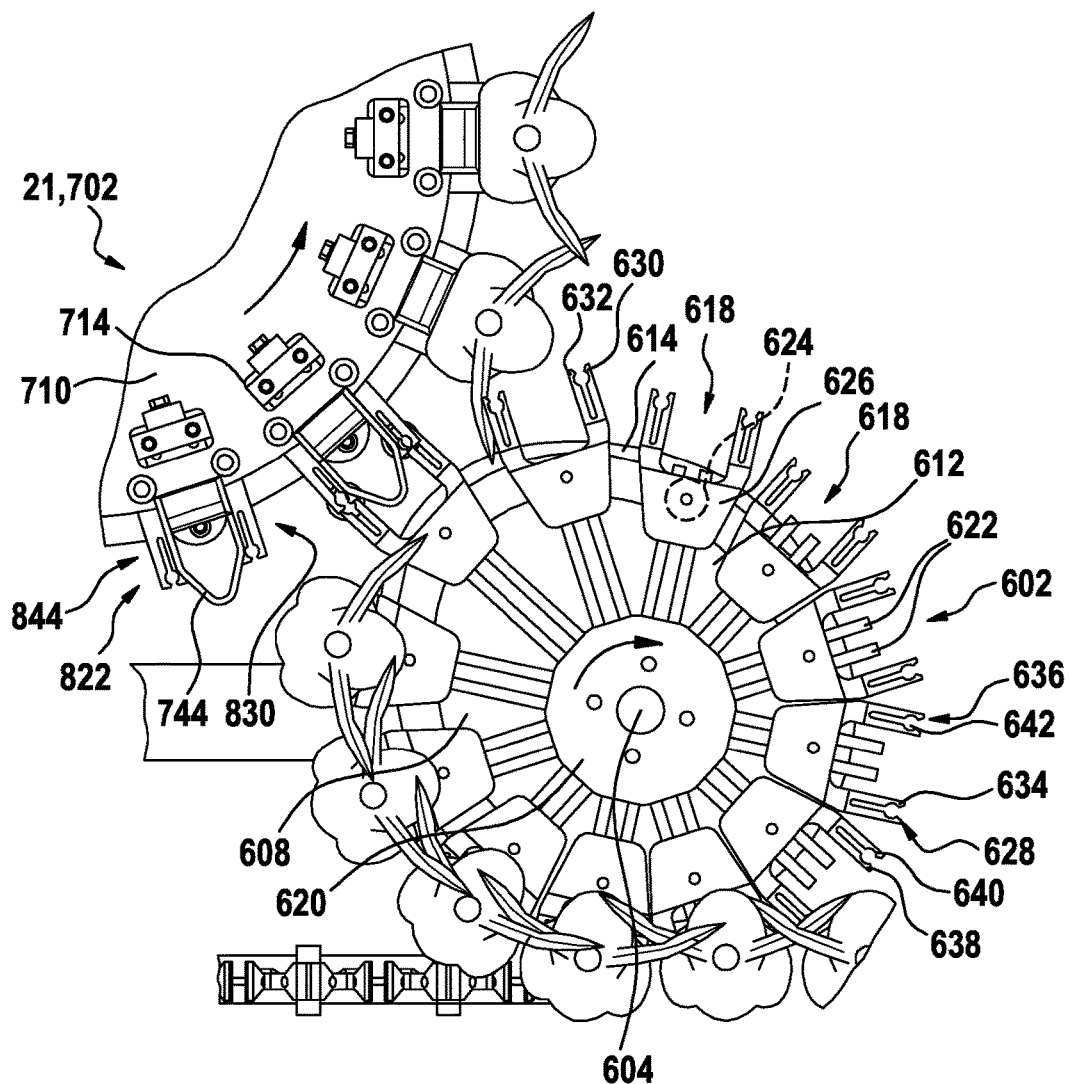
FIG. 16 shows a partial bottom view of the first rotary transfer device and of the cloaca-cutting device.
Figure 17A:
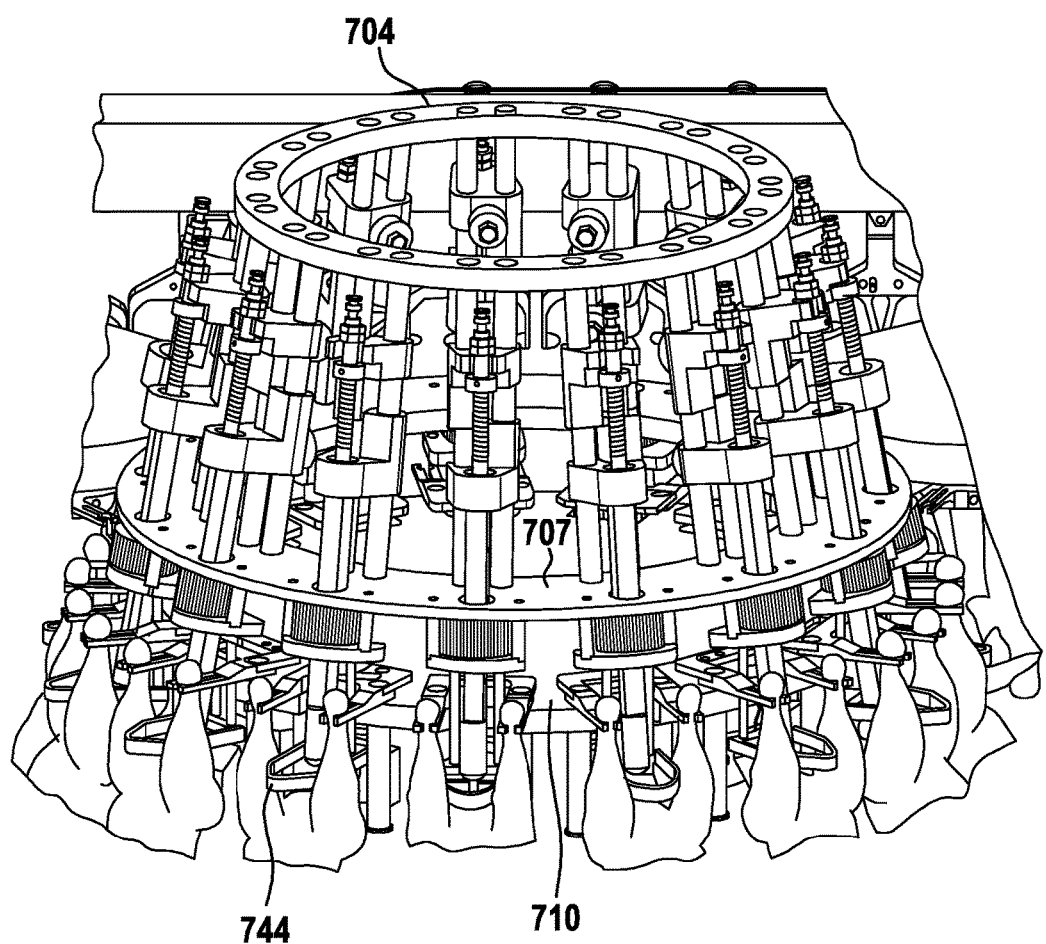
FIGS. 17A and 17B show, in a perspective view, processing units of the cloaca-cutting device, which are formed by cutting devices.
Figure 17B:
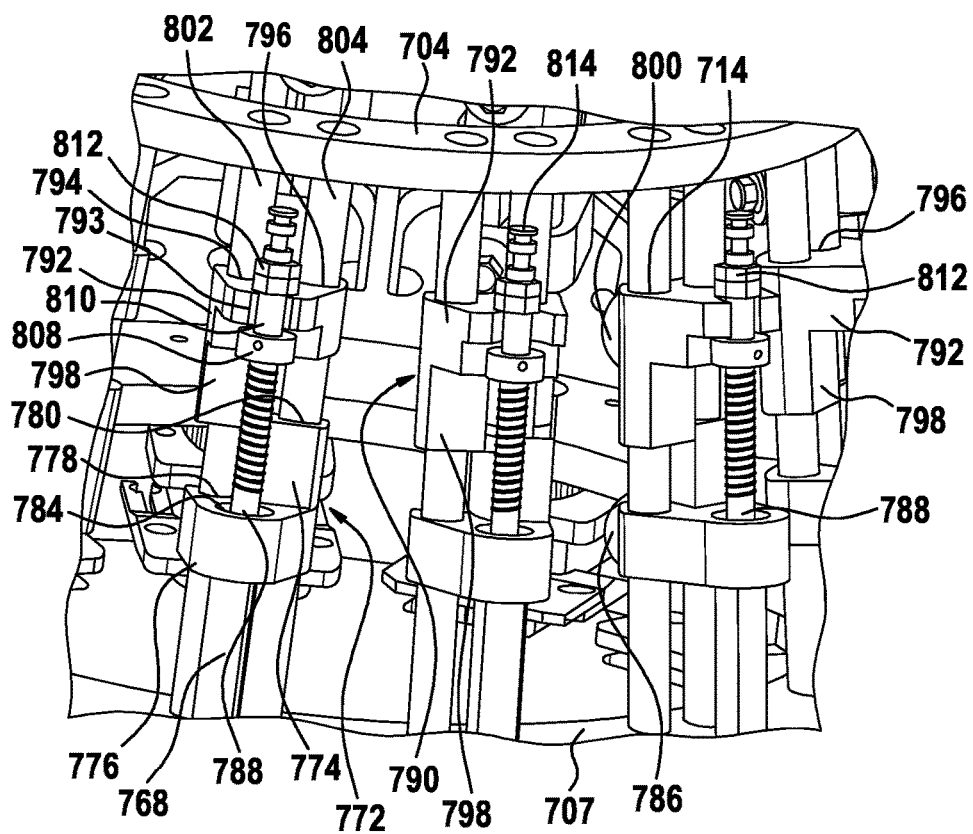
Figure 18:
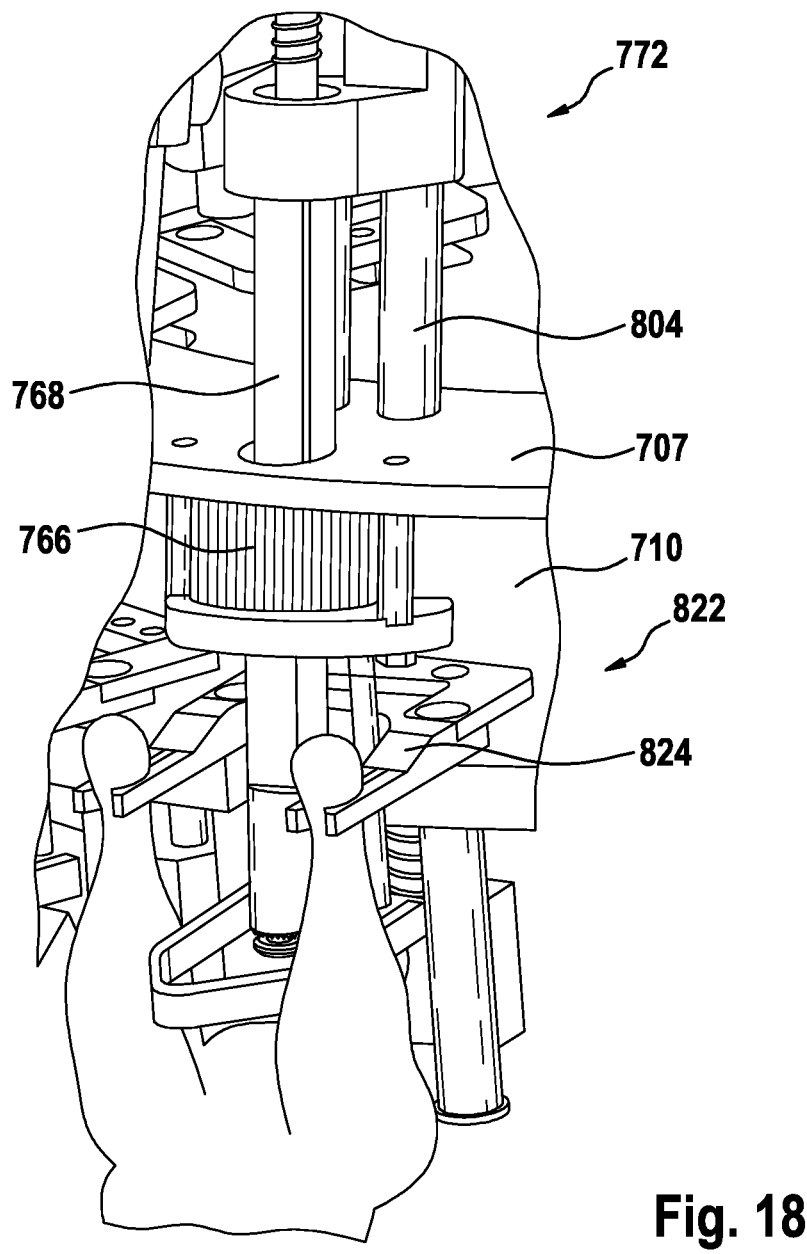
FIGS. 18 and 19 show, in a perspective view, a cutting device of the cloaca-cutting device.

The first rotary transfer device 602 has a plurality of gripper devices 618 which receive the poultry bodies 152 as soon as they are released from the carrier device 402. As can be seen in FIGS. 15 and 16 in particular, the gripper device 618 comprises an upper cam plate 608 which is fixed to a support and beneath which the gripper devices 618 are rotationally movably arranged along a path by rotation of a vertically oriented drive shaft 604. The cam plate 608 has a plate body which is mounted eccentrically and is of non-circular shape and which is attached and fixed by means of a cam holder 606 to a carrying frame 650 located above it or in another manner to a different carrying frame or support. The cam holder 608 is connected eccentrically to the cam plate 608 with the upper side 610 thereof. The drive shaft 604 passes through the carrying frame 650 and the cam holder 608 and projects at the underside 612 of the cam plate 608.

In one embodiment, the drive shaft is mounted beneath the cam plate 608 on a frame or support and extends in vertical orientation to the underside of the cam plate 608. In one embodiment, there is provided a gear which is connected to the main conveyor device 302 and to which the drive shaft 604 is coupled for driving. In the exemplary embodiment, the arrangement is such that the gripper devices 618 of the rotary transfer device 602, when viewed from above, are moved or rotate to the left counter-clockwise. The arrangement can also be such that the rotary drive of the drive shaft 604 is configured as a drive means independent of the main conveyor device 302, by means of a motor, for example a servomotor.

Each gripper device 618 has a pair of gripper arms with first and second gripper arms 628, 636 which are spaced apart. Each gripper arm 628, 636 has a holding opening 634, 642, each of which is formed to receive a poultry leg 182, 192 of the poultry body 152. According to the exemplary embodiment shown, the pair of gripper arms 628, 636 is fixed to a slider body 626, from which the two gripper arms 628, 636 extend outwards. Each slider body 626 is arranged on the underside 612 of the cam plate 608. A bearing element 624, which is arranged on the upper side of the slider body 626, engages with sliding movement into a guide means, namely a guide track 614, which is formed on the underside 612 of the cam plate 608.

Beneath the cam plate 608 there is arranged a ring of pairs of radial slide spokes 622, each of which pairs receives or guides a slider body 626 of the gripper device 618 with sliding movement. The slide spokes 622 are fixedly fastened to a base plate 620, by means of which they are connected in a rotationally secure manner to the drive shaft 604. The slide spokes 622 extend radially outwards from the base plate 620, pass in each case through the slider body 626 and end in the region of the outer edge of the cam plate 608.

The first gripper arm 628 has first and second gripper fingers 630, 632 which are located side by side and form between them the holding opening 634. In addition, the second gripper arm 636 has first and second gripper fingers 638, 640 which are located side by side and form the other holding opening 642. The gripper fingers 630, 632; 638, 640 are advantageously made of flexible or resilient material, for example of reinforced plastic, nylon, polyoxymethylene and polyethylene in particular of high density. They each receive a poultry leg 192 in a sliding manner between them.

Figure 4:
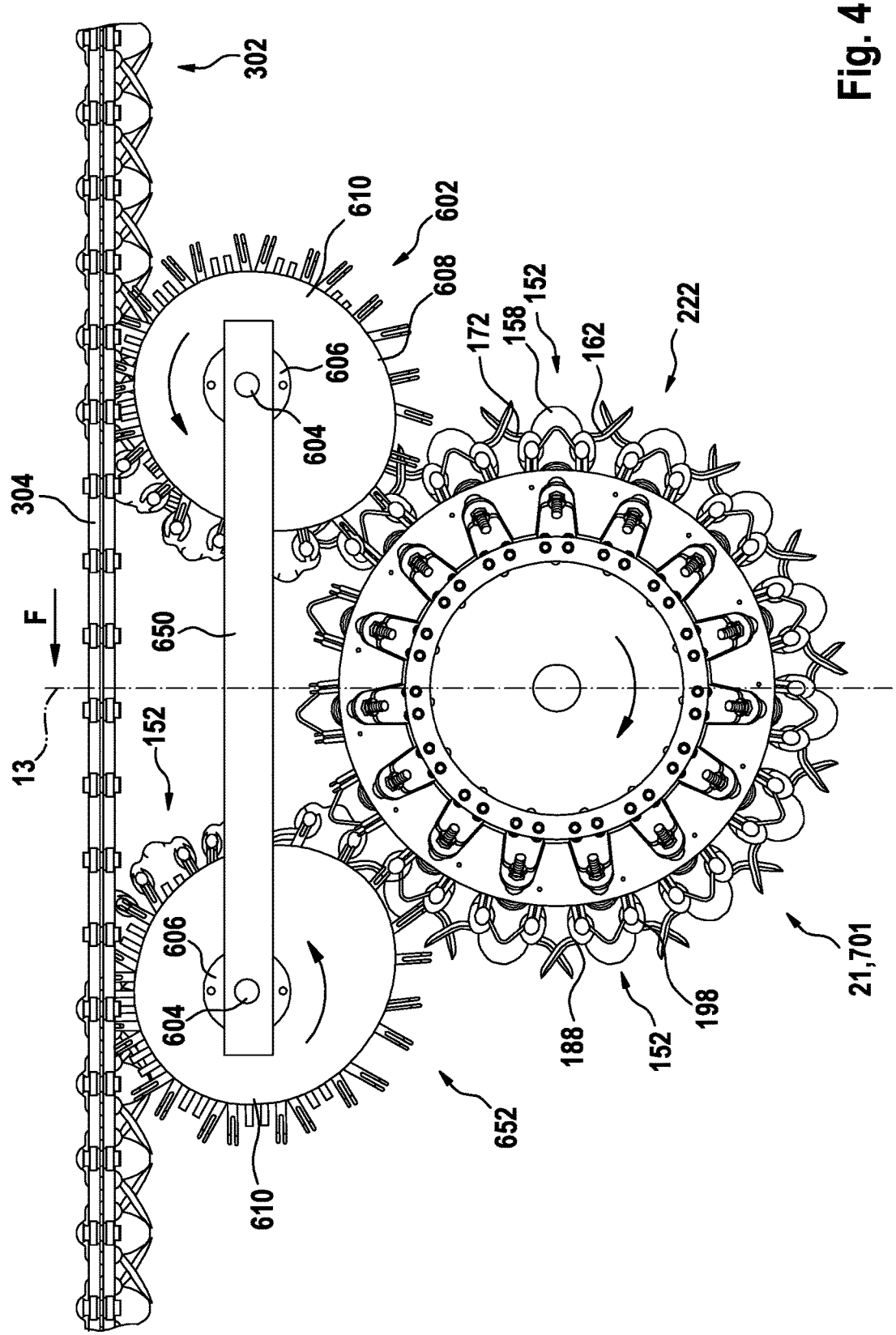
FIG. 4 shows a top view of a first transfer station and a cloaca-cutting device which is processing poultry bodies.

In the top view according to FIG. 4, the drive shaft 604 rotates counter-clockwise, the carrier devices 402 moving along the conveyor track 304 or the main conveyor line 20 in conveying direction F. As is shown in FIG. 5, each carrier device 402 passes the first rotary transfer device 602, whereby the poultry bodies 152 pass to the rotary transfer device 602 on a tangential path. The procedure is such that the first gripper arm 628 and the second gripper arm 636 of a gripper device 618 moved up to the main conveyor line 20 pass on the tangential path through a transfer zone, whereby they cooperate with the poultry body 152 of the carrier device 402, which runs close to the gripper device 618.

As soon as the first leg 468 of the carrier device 402 in question enters the transfer zone, the first gripper arm 628 of the gripper device 618 is rotated by means of the drive, through the drive shaft 604, into an engagement position with the left poultry leg 182, at a point or in a region beneath the projecting carrying edges 472, 490. In this movement, the left poultry leg 182 passes between the first and second gripper fingers 630, 632 of the first gripper arm 628.

There is advantageously provided a guide device (not shown), for example a guide rail or rod, which assists the guiding of the left poultry leg 182 from the carrier device 402 to the first gripper arm 628. As soon as the leading left poultry leg 182 is located in the holding opening 634, the control projection 450 of the control element 444 is raised. At the same time, the biasing element of the biasing device 452 is compressed, so that the projecting carrying edge 490 is moved away from the projecting carrying edge 472. As a result, the left poultry leg 182 is released without clamping, that is to say the holding connection at the carrier device 402 is released fully and transferred to the gripper device 618.

As is shown in FIG. 5, in one embodiment the main conveyor device 302 has the control-guide device 545, which is equipped with a cam track. The cam track has a control member, namely an inclined portion 542. The control body 450 moves onto the cam track and is lifted by means of the inclined portion 542.

As soon as the first carrier-leg 468 leaves the mentioned transfer zone, the first gripper arm 628 holds the left poultry leg 182 and moves it away from the carrier device 402 towards the cloaca-cutting device 702. The second carrier-arm 512 of the carrier device 402 thereby enters the transfer zone. The second gripper arm 636, which is moved further by the rotary drive through the drive shaft 604, engages the right poultry leg 192 at a point beneath the projecting carrying edges 506, 524. The right poultry leg 192 thereby enters the holding opening 642 between the first and second fingers 638, 640. There can be provided a guide device (not shown), for example a guide rail or rod, which assists with the guiding of the right poultry leg 192 from the carrier device 402 to the second gripper arm 636. As soon as the right poultry leg 192 is in the holding opening 642, the control body 460 of the second control element 454 is lifted, with the result that the second biasing element of the associated biasing device 462 is compressed, so that the projecting carrying edge 524 is moved away from the projecting carrying edge 506, with the result that the right poultry leg 192 is no longer held by the carrier device 402 but by the gripper device 618.

According to one embodiment, the control projection 460 comes into contact with the second control-guide device 545 of the main conveyor device 303, that is to say with the inclined portion 546 of a second cam track, which lifts the control body 460. As soon as the right poultry leg 192 leaves the mentioned transfer zone, the second gripper arm 636 transports it from the carrier device 402 to the cloaca-cutting device 702. The transfer of the poultry body 152 from the carrier device 402 to the gripper device 618 is thereby complete. The control system is generally so configured that the receiver 40.1 for the leading poultry leg 182 is opened before the receiver 40.2, according to the distance between the receivers 40.1, 40.2.

A following adjacent gripper device 618 then enters the transfer zone and likewise receives a poultry body 152 from the following carrier device 402. The steps described above are repeated with a new cycle.

As can be seen in FIG. 16 in particular, each gripper device 618 carrying a poultry body 152 is distanced radially outwards from the drive shaft 604. This occurs while the ring of slide spokes 622 is rotated with the gripper devices 618 by means of the drive shaft 604 and the gripper devices 618 are moved along the guide track 614 to the adjacent processing device 21, 702.

By means of the ring of slide spokes 622, the cam plate 608 with the guide track 614 and the slider elements 626 engaging therein, the distance separating the gripper devices 618 is configured in a controllable manner in dependence on the rotary position and movement of the rotary transfer device 602. That is to say, the distance between adjacent gripper devices 618 on the path from the carrier device 402 to the processing device 21, 702 increases. As a result, the distance between adjacent successive gripper devices 618 and accordingly the distance between adjacent successive poultry bodies 152 is increased. A desired greatest distance between the poultry bodies 152 is so configured that this transfer distance matches the transfer distance of the adjacent processing device 21, 702. The transfer distance is governed by the distance at the processing device 21, 702 which is required for processing the poultry body 152. In practical terms, any desired distance can be set. In particular, the distance can be 8, 10 or 12 inches.

As is shown in FIGS. 15 and 16, the first transfer device 602 transfers the poultry body 152 from each gripper device 618 to a corresponding processing-holding device 822 on the rotatable cloaca-cutting device 702. The cloaca-cutting device 702 has a plurality of processing units, namely cutting devices 720 in the exemplary embodiment, each of which introduces a hole into the cloaca 156 of the poultry body 152. This hole is cut in order to process the poultry body 152 in the subsequent processing device 21, which in the exemplary embodiment is an opening device 224.

According to the exemplary embodiment, the cloaca-cutting device 702 is equipped with a processing-holding means 820. This is formed by a row of processing-holding devices 822 and is so configured that the poultry body 152 is positioned beneath or in front of an associated cutting device 720, while the cloaca-cutting device 702, which is formed by a type of carousel, rotates about a vertical carousel axis or a drive shaft (not shown) rotating the carousel arrangement.

Figure 19:
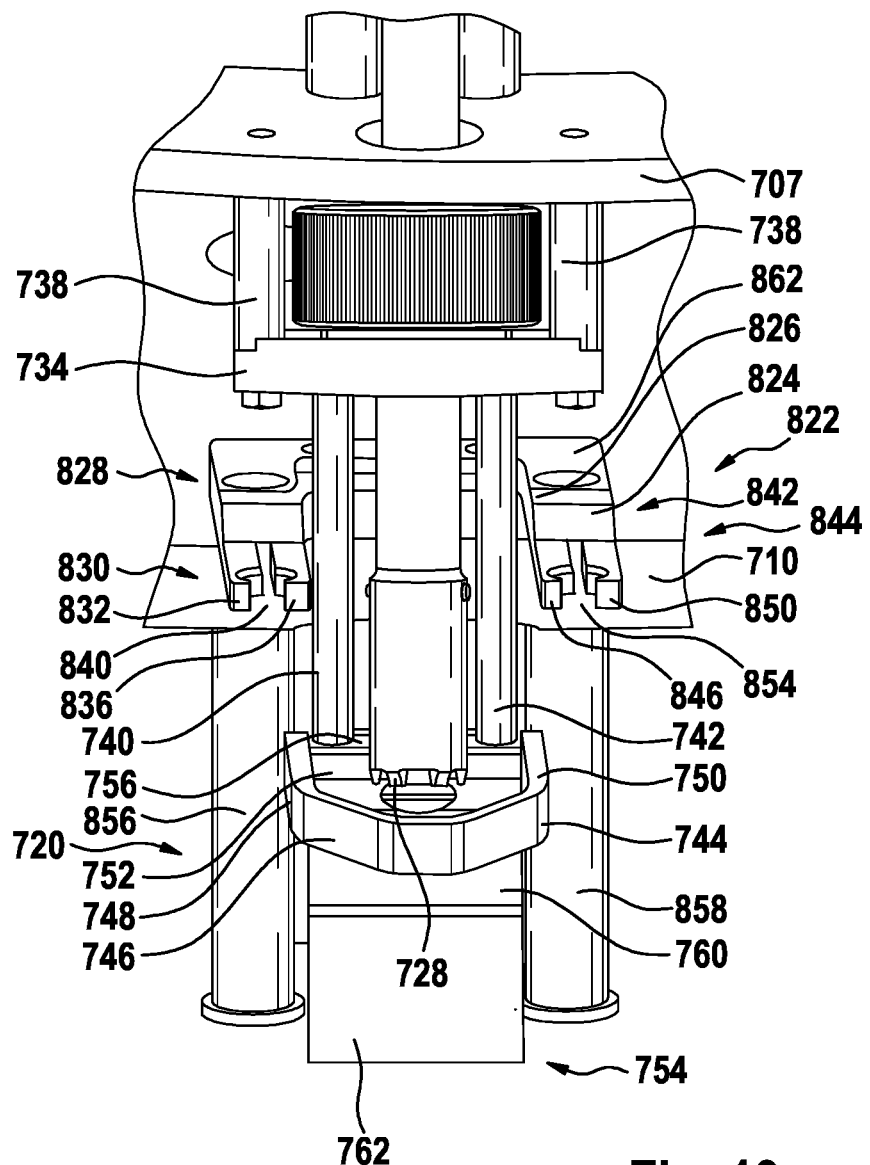

As is shown in FIGS. 17A and 18-26 in particular, the processing-holding device 822 has a gripper device 824 which is arranged to be movable in the vertical direction relative to a circular base plate 710. As can be seen in FIG. 19 in particular, the gripper device 824 has a substantially U-shaped body 826 having a first end 828 and a second end 842. On the first end there is formed a first hand-like gripper element 830, which extends at the end 828 and has first and second fingers 832, 836 which form a gripper opening 840. The second end 842 is formed with a second hand-like gripper element 844, which extends at the second end and has adjacent first and second gripper fingers 846, 850 which form a gripper opening 854. The base plate 710, a lower ring 707 and the upper ring 704 are parts of a rotary support of the processing device 21, 702.

Figure 20:
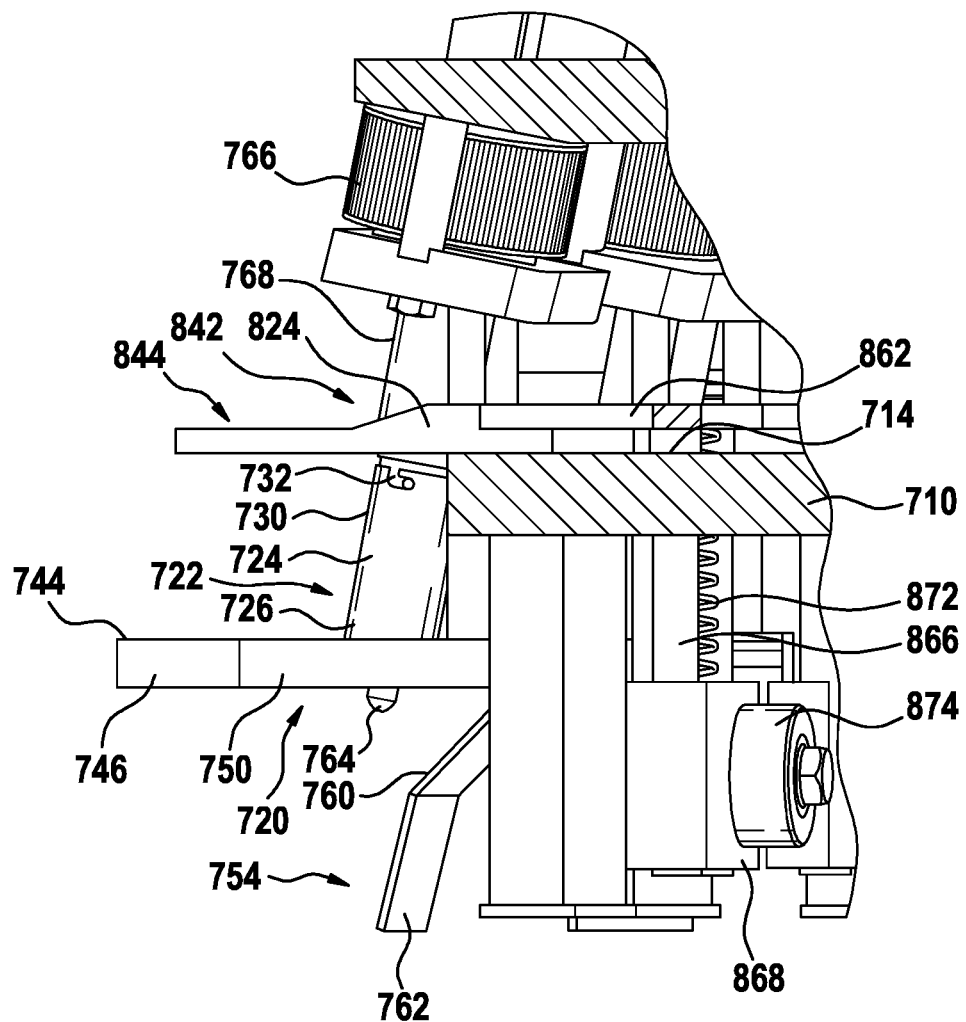
FIG. 20 shows, in a side view, a holding device of the cutting device of the cloaca-cutting device.
Figure 21:
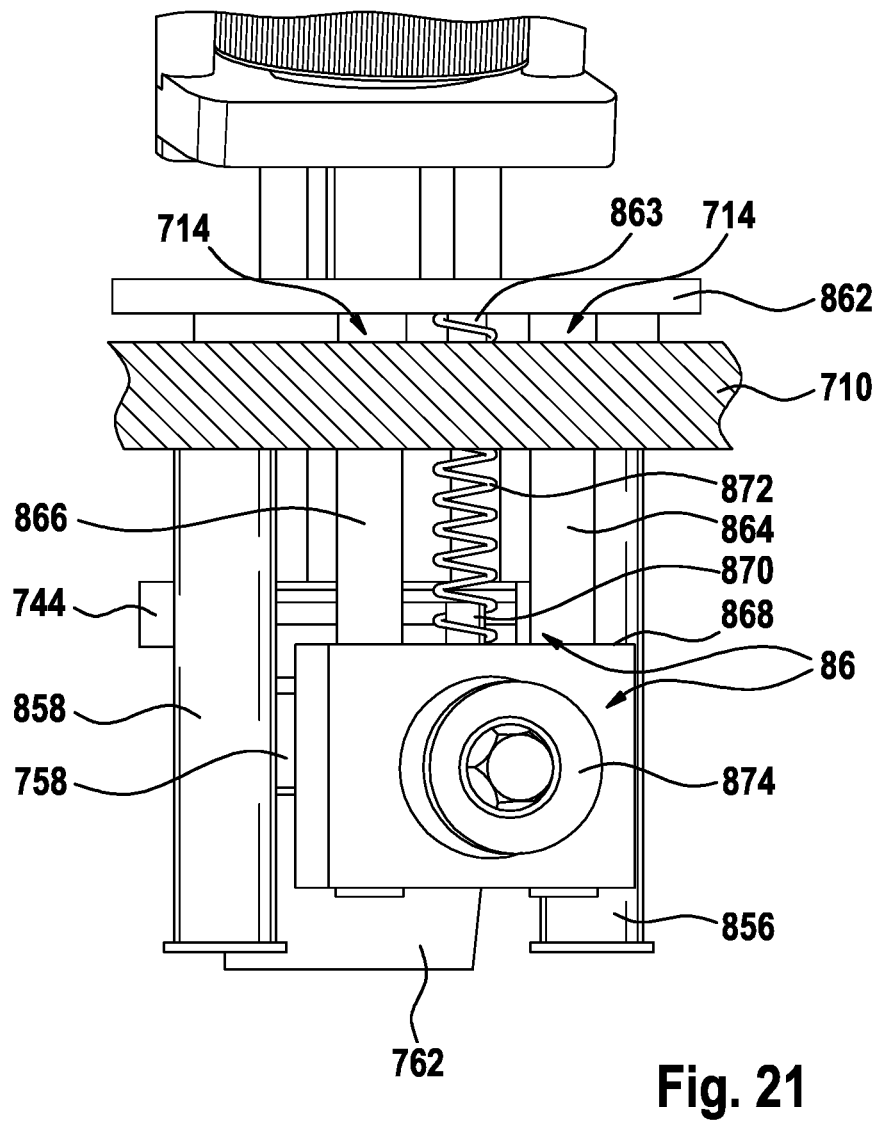
FIG. 21 shows, in a rear view, the holding device.
Figure 24:
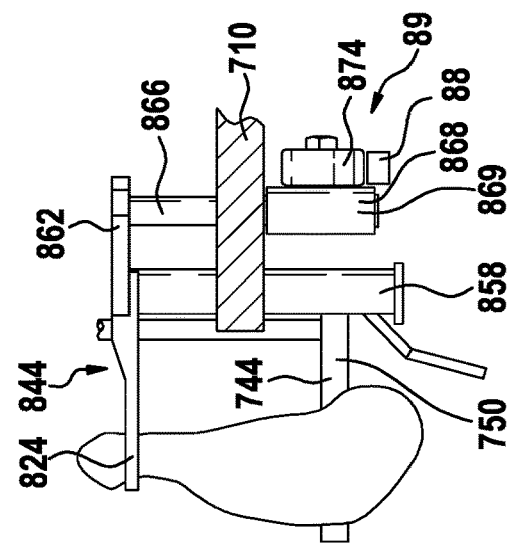
FIG. 22-24 show side views of the cloaca-cutting device with different positions of the holding device.
Figure 23:
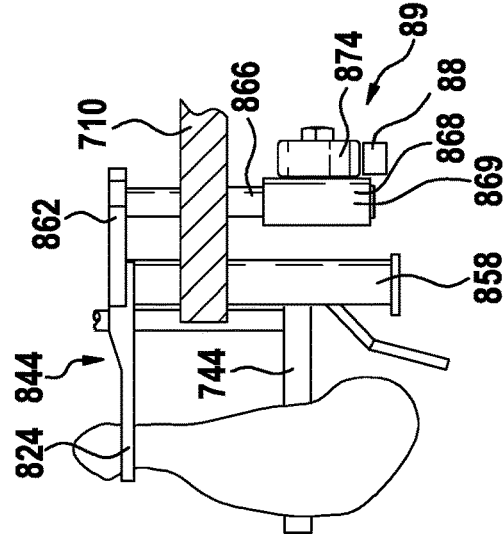
Figure 22:
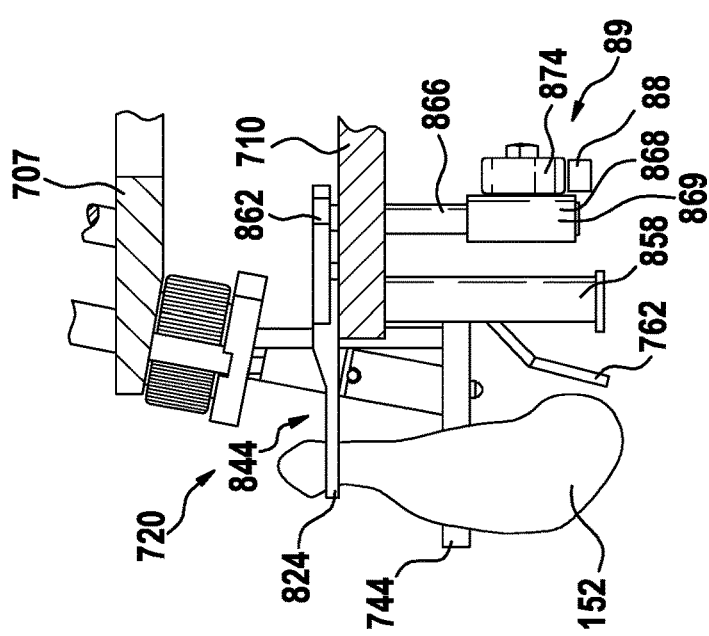

On the U-shaped body 826 there are arranged two shafts or rods 856, 858, which project downwards from the U-shaped body 826 and are received in a sliding manner in the base plate 710. By way of this sliding arrangement of the gripper elements 830, 844, they are positioned or oriented in the region of the outside edge of the base plate 710. As can be seen in FIGS. 20 and 21 in particular, a wheel holder device 862 is arranged on the rear side of the U-shaped body 826, which wheel holder device 862 supports first and second rods 864, 866 which cooperate with a biasing device 86, extend side by side, are fixed to the U-shaped body 826 and project downwards. The rods 864, 866 extend through a holding opening 714 beneath the base plate 710. The rods 864, 866 receive a wheel slide block 868, wherein the wheel slide block 868 is positioned beneath the wheel holder device 862. A biasing element of the biasing device 86, for example a spring 872, is held between the wheel holder device 862 and the wheel slide block 868 by means of a centrally arranged holding pin 863 which projects downwards from the wheel holder device 862, and by way of a centrally arranged holding pin 870 which projects upwards from the wheel slide block 868. A wheel 874 is attached to the inwardly directed side face of the wheel slide block 868. As can be seen in FIGS. 22 to 24, the wheel 874, when it engages in a holding-guide device 88, which is shown only schematically, is lifted and lowered with a to-and-fro movement. The holding-guide device 88 has, for example, a guide or cam track, in particular with ramps, on which the roller or wheel 874 runs. The biasing device 86, in conjunction with a biased guide element 869, forms a self-actuating buffer device. The holding-guide device 88, in conjunction with the guide element 869 and the buffer device, forms a holding-control device 89.

As can be seen in FIGS. 19 and 20 in particular, the cutting device 720 is positioned to enter the poultry body 152 at an angle through the cloaca 156. The cutting device 720 substantially comprises a cutting head 722 which crosses a leg-holding ring or loop 744. The leg-holding loop 744 is arranged beneath a frame ring 707 by means of a holder 734. The lower frame ring 707 forms a lower support device for each cutting device 720, wherein each cutting head 722 is arranged between the gripper elements 830, 844 of the gripper device 824. The holder 734 is arranged on or connected to an outwardly projecting face of the bottom ring 707 and is spaced apart therefrom by spacer bushings 738. The leg-holding loop 744 is mounted beneath the holder 734 and is connected to the holder 734 with first and second leg loop rods or shafts 740, 742 arranged side by side. The leg-holding loop 744 comprises a back web portion 752 which is connected to the leg loop rods 740, 742. First and second faces 748, 750 of the leg-holding loop 744 are fixedly connected to the web portion 752. A front web portion 746 connects the first and second faces 748, 750. A back plate 754 for holding the poultry body 152 extends downwards and outwards from the leg-holding loop 744.

The back plate 754 has an upper portion 756, which is connected to the upper side of the back web portion 752, and a back portion 750, which extends downwards from the upper portion 756. A front portion 760 extends downwards and outwards beneath the back web portion 752, and a downwardly directed portion 762 extends downwards and outwards beneath the front portion 760, in order to support the upper part of the rear end of the poultry body 152 beneath the cloaca 156. The back plate 754 assists the correct orientation of the poultry body 152 relative to the cutting device 720. The leg-holding loop 744 engages behind the poultry body 152 between its thighs.

The cutting device 720 comprises a cutting head 722 which is connected to a drive device. The cutting head 722 has a tubular body 724 with a plurality of teeth 728 at a first end 726 and with an L-shaped notch 732 at an opposite second end 730. The cutting head 722 is connected to a shaft 768, which is received in an externally driven bearing 766. The bearing 766 is located between the lower frame ring 707 and the holder 734 and holds the shaft 768. The bearing 766 forms a rotary drive for the shaft 768. A pair of index pins, which project laterally at the lower end of the shaft 768, are received in the L-shaped notch 732 in order to fix the cutting head 722 to the shaft 768. A nozzle 764, which is arranged beneath the first end 726, is connected to a lower end of a tube 788 which extends upwards through the cutting head 722 and the shaft 768 to a connecting member 814 at the upper end of the tube 788. The connecting member 814 is connected to a vacuum source for locating the cloaca 156 and to a fluid source (not shown) for supplying fluid to the nozzle 764 for cleaning-rinsing the cutting head 722.

First and second slide guides 790, 772 are received in a sliding manner on adjacent first and second carriers 802, 804 such as columns for carrying the shaft 768 and the tube 788. The first and second carriers 802, 804 extend between an upper frame ring 704 and the lower ring 707. The carriers 802, 804 extend upwards and inwards from the lower frame ring 707 to the upper frame ring 704 at an angle at which the cutting head 722 is able to enter the cloaca 156. The upper frame ring 704 and the lower frame ring 707 are connected to a central shaft (not shown) for rotation of the arrangement. In general, the frame or support rings 704, 707 form with the carriers 802, 804 or another carrying structure a frame or support device on which the processing-holding devices 822 and the processing tools, in the example the cutting heads 722 and the nozzle 764, are arranged to be vertically adjustable or positionable by means of an associated control device. The control device for the processing-holding devices 822 comprises the described control members, namely the controlled wheel holder 862 with the associated mentioned members. The control devices for the processing tools will be described in greater detail below.

The second slide guide 772 is arranged beneath the first slide guide 790 and comprises an upper body 774 and a lower body 776. The lower body 776 has a first through-hole 778 with a bushing which is seated in a sliding manner on the first carrier 802, and an adjacent second through-hole 780 having a bushing which is seated in a sliding manner on the second carrier 804. The upper body 774 extends from the lower body 776 upwards around the second carrier 804 and has a bushing which is seated in a sliding manner on the second carrier 804. Part of the lower body 776 projects outwards from the first and second carriers 802, 804 and has a third through-hole 784. A bearing inside the third hole 784 is oriented in a line with the bearing 766 located beneath, in order to receive a portion of the tube 788. The shaft 768 extends upwards from the bearing 766 with an upper end of the shaft 768, which there engages into the bearing inside the third through-hole 784. A wheel 786 is rotatably arranged on an inwardly facing side of the second slide guide 772. The wheel 786 engages into a control or cam face (not shown), which moves the cutting head 722 down and up.

The first slide guide 790 is arranged above the second slide guide 772 and comprises an upper body 792 and a lower body 798. The upper body 792 forms a first through-hole 794 with a bushing which is seated in a sliding manner on the second carrier 804. The lower body 798 extends downwards from the upper body 792 around the first carrier 802 and has a bushing which is seated in a sliding manner on the first carrier 802. A part of the upper body 792 projects outwards from the first and second carriers 802, 804 and forms an outwardly open retainer 793. An adapter piece 810, which is mounted on a guide body 808, engages in the retainer 793. The guide body 808 extends upwards in the retainer 793 and forms a passage which is oriented together with the bearing in the third through-hole 784. A jam nut 812 holds the arrangement together. The upper end of the tube 788 extends upwards into the guide body 808, and a connecting member 814 projects upwards from the jam nut 812 in order to establish fluid communication between the upper end of the tube 788 and the fluid source. A wheel 800, which is rotatably connected to the inwardly pointing face of the first slide guide 790, is in engagement with a control guide (not shown), for example a ramp or a cam surface, which moves the nozzle 764 down and up and optionally the cutting head 722 up and down.

In the top view according to FIGS. 4 and 15, the rotary transfer device 602 rotates to the left and the cloaca-cutting device 702 rotates to the right. While each gripper device 618 carrying a poultry body 152 moves to a corresponding holding device 822, the first holding arm 628 of the gripper device 618 crosses a transfer zone and the left poultry leg 182 is transferred to the first gripper element 830 of the holding device 822. The second gripper arm 636 of the gripper device 618 crosses the transfer zone, whereby the right poultry leg 192 is transferred to the second gripper element 844 of the holding device. The transfer zone is generally an overlapping zone with a tangential path. That is to say, generally, the delivering conveyor path of the rotary transfer device 602 is followed by the receiving conveyor path, formed by the processing device 21, in the same direction and continuously (without a bend in the path). In this case, the continuous transfer path section has a turning point between the path rotating to the left and the path rotating to the right. This will be described in greater detail below.

When the first gripper arm 628 enters the transfer zone, the first gripper element 830 engages the left poultry leg 182 at a point below the first gripper arm 628, the left poultry leg 182 passing between the first and second gripper fingers 832, 836 so that it is transferred from the gripper opening 634 to the holding opening 840. A guide device (not shown), for example a guide rail or rod, can be provided for assisting the guiding of the left poultry leg 182 from the first gripper arm 628 to the first gripper element 830. When the left poultry leg 182 leaves the transfer zone, it is moved by means of the first gripper element 830 away from the first rotary transfer device 602. While the cloaca-cutting device 702 and the first rotary transfer device 602 continue to rotate, the second gripper arm 636 enters the transfer zone and the second gripper element 844 comes into engagement with the right poultry leg 192 at a point below the second gripper arm 636, the right poultry leg 192 passing between the first and second gripper fingers 846, 850 so that the right poultry leg 192 is transferred from the gripper opening 642 to the holding opening 854. Advantageously, a guide device (not shown), for example a slide rail or rod, can be provided, which assists the guiding of the right poultry leg 192 from the second gripper arm 636 to the second gripper element 844. When the right poultry leg 192 leaves the transfer zone, the transfer of the poultry body 152 from the first rotary transfer device 602 to the cloaca-cutting device 702 is complete. An adjacent following holding device 822 enters the transfer zone in order to receive the next poultry body 152 from the next gripper device 618, and the described cycle is repeated.

When the poultry body 152 turns away from the first rotary transfer device 602, the processing-holding device 822 positions the poultry body 152 in relation to the leg-holding loop 744. Physical features of the poultry bodies 152 that are processed can vary. For example, the poultry legs 182, 192 of the poultry body 152 of a treated batch can have a different length between their hips 184, 194 and their hocks or ankle joints 188, 198 than another poultry body 152 of the batch. The correct positioning of each individual poultry body 152 in relation to the leg-holding loop 744 ensures that the cutting device 720 widens the cloaca 156 at the correct place of the poultry body 152 and cuts to the correct depth.

On rotation of each processing-holding device 822 together with the cloaca-cutting device 702, the poultry body 152 is in each case biased upwards against the leg-holding loop 744. This is achieved in that the holding device 822 (FIGS. 22 to 24) moves upwards when the wheel 874 of the holding-control device 89 runs onto an inclined portion of the holding-guide device 88. As soon as the wheel slide block or body 868 is moved upwards along the rods or shafts 864, 866, the spring 872 is biased upwards against the wheel holder 862. As a result of the upward movement of the wheel holder 822, the first and second rods 856, 858 move upwards relative to the base plate 710, so that the gripper elements 824 also move upwards. When the poultry body 152 is lifted by means of the gripper element 824, the insides of the left and right poultry legs 182, 192 come into contact with the leg-holding loop 744, which is an example of a positioning element, so that the poultry legs 182, 192 are spread further apart. In the case of poultry bodies 152 with relatively long poultry legs 182, 192, the ankle joints 188, 198 are to be positioned by means of the holding device 822 at a greater distance above the leg-holding loop 744 than in the case of poultry bodies 152 with shorter poultry legs. A poultry body 152 with short poultry legs 182, 192 reaches the leg-holding loop 744 earlier than a poultry body 152 with long poultry legs 182, 192. Consequently, the upward movement of the poultry body 152 is stopped and the upward movement of the wheel slide block 868 is continued upwards, whereby the wheel slide block 868 slides along the first and second rods 864, 866 and the spring 872 is compressed between the wheel slide block 868 and the wheel holder device 862 located above it. It will be seen that the buffer/biasing device 86 working against the bias of the spring 872 is thereby formed.

FIG. 22-23 show the situation for a poultry body 152 which has a maximum leg length and accordingly can still just be processed in the device. The poultry body 152 passes in a removal position according to FIG. 22 into the holding device 822 or into the gripper elements 824. Via a temporary position according to FIG. 23, the poultry body 152 is lifted into the processing position according to FIG. 24. The spring 872, which is not shown in FIG. 22-24, thereby behaves like a rigid element. Each poultry body 152 which is smaller than the poultry body shown in FIG. 22-24 is positioned by means of the biasing device 86, when the leg-loop 744 comes to rest on the cloaca, while the holding device 822, when the biased guide element 869 is lifted, is lifted by means of the spring 872, which is then compressed. A clamping space with a variable clamping distance is thereby formed between the positioning element and the gripper elements 824 or the processing-holding device 822.

Figure 26:
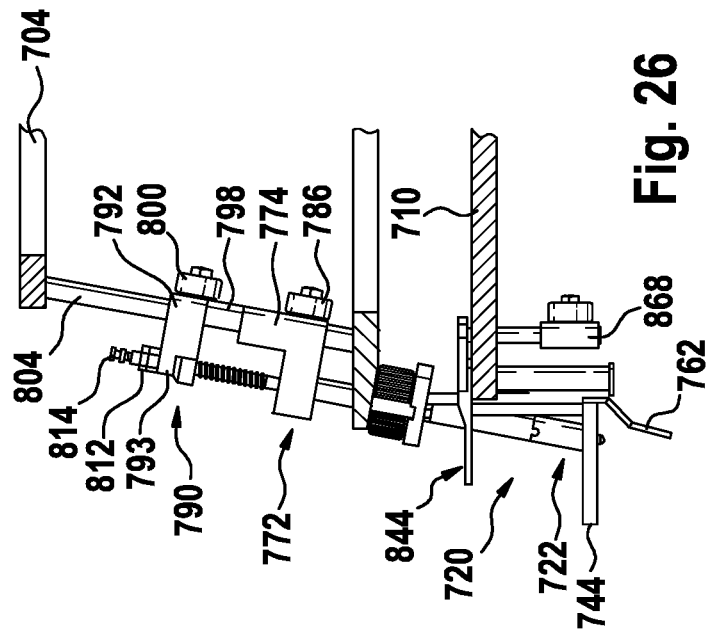
FIG. 25-26 show side views of the cloaca-cutting device with different vertical positions of a cutting tool of the cutting device.
Figure 25:
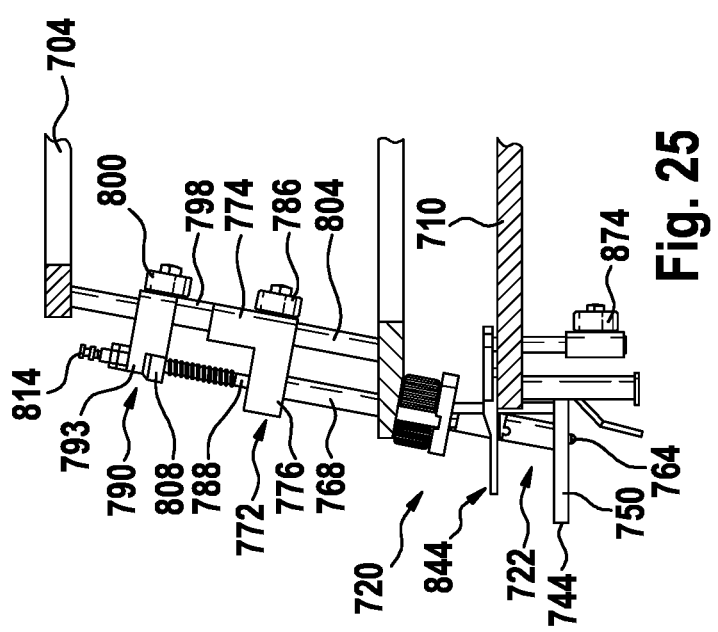
Figure 27:
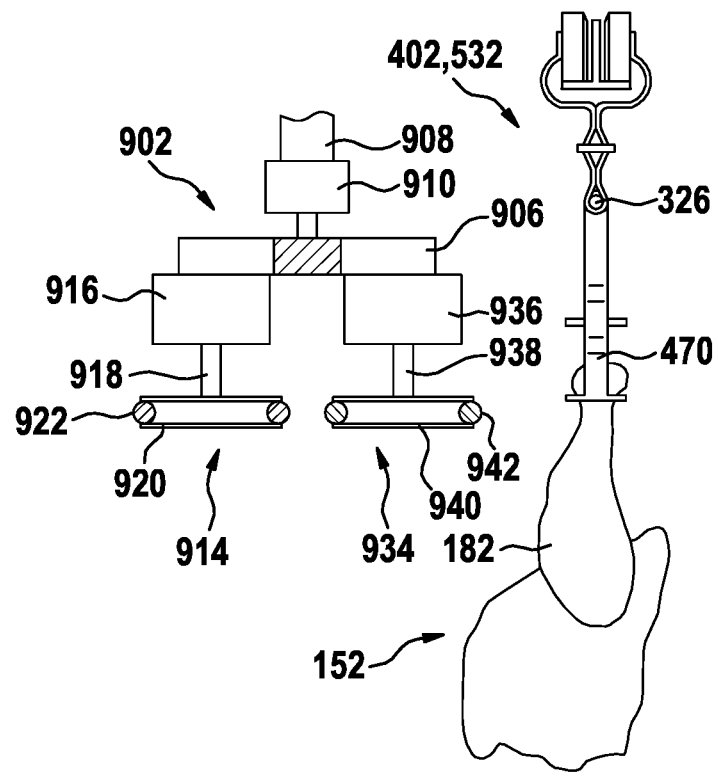
FIG. 27-28 show front views of an embodiment of a weighing device, which illustrates principles of the disclosed subject-matter.
Figure 28:
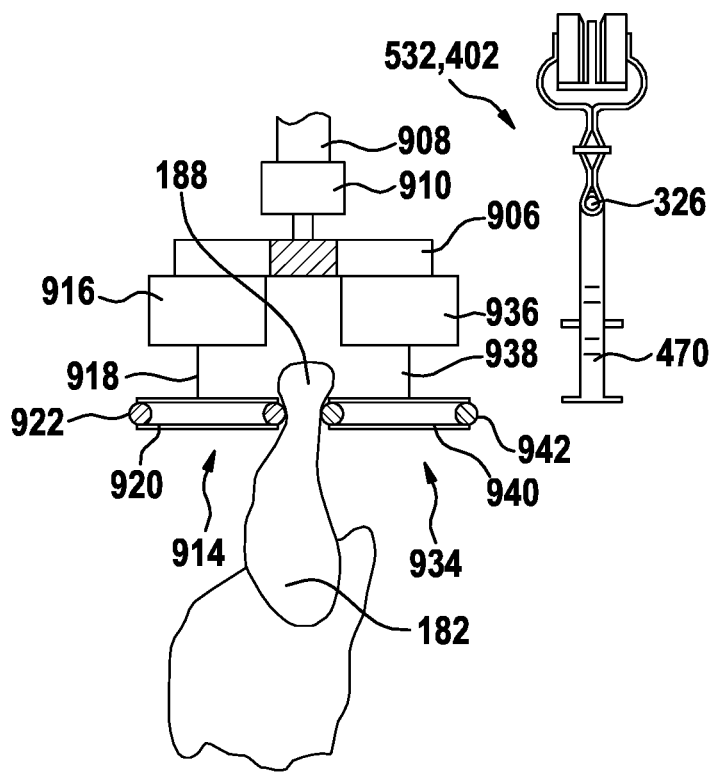

As soon as the poultry body 152 is in the correct position for the cutting device 720 for widening of the cloaca 156, the first slide guide 790 is moved downwards, and the second slide guide 722 is also moved downwards, so that the cutting head 722 is moved into the cloaca 156 when it is rotated (FIGS. 25 to 26). For locating the cloaca 156, vacuum is applied to the nozzle 764, and fluid is introduced into the tube 788 via the connecting means 814 and then distributed by the nozzle 764 in order to rinse the cutting head 722 and wash away residues formed during cutting. As soon as the cutting head 722 has moved into the cavity of the poultry body 152 to the correct depth, the operation of opening the cloaca 156 is complete. While the poultry body 152 moves to the second rotary transfer device 652, the wheel slide block 868 moves downwards, whereby the poultry body 152 is lowered, and the first slide guide 790 moves upwards, whereby the cutting head 722 and the nozzle 764 are moved upwards and away from the poultry body 152.

As can be seen in the top view of FIGS. 3 and 4 in particular, the second rotary transfer device 652 rotates to the left counter-clockwise. The second rotary transfer device 652 has the same features as the first rotary transfer device 602, so that identical or corresponding features are provided with correspondingly identical reference numerals.

While each holding device 822 of the cloaca-cutting device 702 carrying a poultry body 152 is rotated towards a gripper device 618, the first gripper element 830 passes through a transfer zone, whereby the left poultry leg 182 is transferred to the first holding arm 628, and the second holding element 844 passes through the transfer zone when the right poultry leg 192 is transferred to the second holding arm 636. As soon as the first holding element 830 enters the transfer zone, the first holding arm 628 comes into engagement with the left poultry leg 182 at a point below the first gripper element 830, the left poultry leg 182 passing between the first and second fingers 630, 632, so that the left poultry leg 182 is transferred from the gripper/holding opening 840 to the gripper/holding opening 634. A guide device (not shown), for example a guide rail or a rod, can assist with guiding the left poultry leg 182 from the first gripper element 830 to the first holding arm 628. As soon as the left poultry leg 182 leaves the transfer zone, it is removed from the cloaca-cutting device 702 by the first holding arm 628. While the cloaca-cutting device 702 and the second rotary transfer device 652 continue to rotate, the second holding arm 636 enters the transfer zone and the right poultry leg 192 comes into engagement with the second holding arm 636 at a point below the second gripper element 844, the right poultry leg 192 passing between the first and second holding fingers 638, 640 so that the right poultry leg 192 is transferred from the holding opening 854 to the holding opening 642. A guide device (not shown), such as a guide rail or a guide rod, can assist the guiding of the right poultry leg 192 from the gripper element 844 to the second holding arm 636. As soon as the right poultry leg 192 leaves the transfer zone, transfer of the poultry body 152 from the cloaca-opening device 702 to the second rotary transfer device 652 is complete. An adjacent following gripper device 668 enters the transfer zone in order to receive the poultry body 152 from the following holding device 822. The sequence of the above-described steps takes place again. Here too, the transfer zone between the processing device 21, 702 and the second rotary transfer device 652 forms, as described, an overlapping zone with a tangential path and a turning point.

As already mentioned, the second rotary transfer device 652 is in the same form as the first rotary transfer device 602, whereby it is arranged and configured as a mirror image with respect to an imaginary vertical middle plane 13, as is apparent from FIG. 4. By means of the ring of slide spokes 622, the cam plate 608 with the guide track 614 and the slide elements 624 engaging therein, the distance separating the gripper devices 618 is controllable in dependence on the rotary position and rotary movement of the rotary transfer device 652. That is to say, the distance between adjacent gripper devices 618 on the path away from the cloaca-cutting device 702 and towards the main conveyor device 302 diminishes. For the transfer path between the processing device 21, 702 and the main conveyor device 302, the portion of the guide track 614 is provided which moves the gripper devices 618 radially towards the drive shaft 604. By reducing the distance between the adjacent gripper devices 618, the distance between adjacent successive poultry bodies 152 diminishes, so that the distance separating the poultry bodies 152 is again returned to the distance required for transferring the poultry bodies 152 back to the carrier device 402 of the main conveyor device 302.

Each carrier device 402 passes the second rotary transfer device 652, which is arranged immediately at and adjacent to the main conveyor system 302, the poultry bodies 152 passing to the carrier devices 402 on a tangential path. The procedure is such that the first carrier-leg 468 and the first carrier-arm 478 as well as the second carrier-leg 502 and the second carrier-arm 512 pass through a transfer zone and engage into the poultry body 152 held by the gripper device 618 of the second rotary transfer device 652. It will be seen that the carrier devices 402, along the main conveyor device 302 or the main conveyor line 20, have continued the path from the point at which they transferred the poultry bodies 152 to the first rotary transfer device 602. As soon as the first carrier-leg 468 of the first carrier 41 enters the transfer zone, the first actuation element 444 is lifted, so that the first biasing element of the biasing device 452 is compressed and the projecting carrying edge 490 is moved away from the projecting carrying edge 472. In one embodiment, the control body 450 of the control element 44 engages into an inclined portion of the cam/guide track of the control device 540, so that the control body 450 is lifted. The inclined portion (not shown) corresponds to the inclined portion 542. As soon as the first carrying arm 628 enters the transfer zone, it is located in a higher position than the projecting carrying edge 472, and the left poultry leg 182 is located next to the carrying recess 474. While the carrier device 402 and the gripper device 618 continue to move, the control body 450 meets a falling portion (not shown) or an end portion of the first cam or guide track of the control device 540, so that the first biasing element is relaxed, with the result that the first carrier-arm 478 moves into a closed position in relation to the first carrier-leg 468 and the projecting carrying edge 490 is moved towards the projecting carrying edge 472. As soon as the first carrier-arm 628 leaves the transfer zone, the holding connection of the left poultry leg 182 changes from the gripper device 618 to the limb receiver 40.1 formed by the first carrier-leg 468 and the first carrier-arm 478. There is advantageously provided a guide device, for example a slide rail or a guide rod, which assists the guiding of the left poultry leg 182 from the first holding arm 628 to the carrier device 402.

As the carrier device 402 and the gripper device 618 continue to move, the left poultry leg 182 leaves the transfer zone and the second gripper arm 636 enters the transfer zone. As soon as the second carrier-arm 512 of the second carrier 42 enters the transfer zone, the second control element 454 is lifted. Consequently, the second biasing element of the second biasing device 462 is compressed, so that the projecting carrying edge 524 moves away from the projecting carrying edge 506 and a clamping-free position is established for transfer. According to one embodiment, the control projection or body 460 comes into engagement with the second guide or cam track of the control device 545 with an inclined portion (not shown), onto which the control body 460 runs and is lifted. This inclined portion corresponds to the inclined portion 546. As soon as the second holding arm 636 enters the transfer zone, the second carrier-leg 502 consequently enters the transfer zone, whereby the projecting carrying edge 506 comes to be located lower than the second holding arm 636, and the right poultry leg 192 comes to be located next to the holding recess 508. While the carrier device 402 and the gripper device 618 continue to move, the control body 460 runs onto an inclined portion (not shown) or an end portion of the second cam or guide track of the control device 545, as a result of which the second biasing element is relaxed, so that the second carrier-arm 512 is moved into a closed position in relation to the second carrier-leg 502 and the projecting carrying edge 524 is moved towards the projecting carrying edge 506. As soon as the second gripper arm 646 leaves the transfer zone, the holding connection for the right poultry leg 192 is transferred from the second gripper arm 636 to the second carrier-leg 502 and the second carrier-arm 512, which form the second carrier receiver 40.2. There is advantageously provided a guide device (not shown), for example a slide rail or a guide rod, for guiding the right poultry leg 192 from the second gripper arm 636 to the carrier device 402. An adjacent following carrier device 402 then enters the transfer zone in order to receive the poultry body 152 from the next gripper device 618. The above-described steps of the transfer are repeated.

In the exemplary embodiment, the described overlapping transfer is provided, the gripper arms 628, 636 overlapping with the carrying elements 475, 525. The tangential transfer path can also be so configured that the gripper devices 618 run next to the carrier-receivers 40.1 and 40.2 in the transfer zone without overlapping and a lateral guiding offset of the poultry bodies 152 is provided with the mentioned optional guide devices or corresponding guide means. This option is provided for each transfer zone between the carrier devices 402, the rotary transfer devices 602, 652 and the processing devices 21.

Advantageously, a weighing means is arranged after (downstream of) the transfer station 60 and associated therewith. In the exemplary embodiment of FIG. 2 there are arranged a weighing means 91 of processing group I, a weighing means 92 of processing group II, and a weighing means 93 after the cleaning device 234 in the main conveyor line 20 of the main conveyor device 302. In addition, as can be seen in FIG. 2, a weighing means 90 and 94 is arranged in the main conveyor line 20 at the beginning and at the end of the processing system 210. Instead of or in addition to the weighing means 94, it is possible, as can likewise be seen in FIG. 2, to provide a weighing means 95 which is formed in conjunction with a transfer station 66, which has a pair of rotary transfer devices 602, 652, a processing device 21 being formed by a weighing device 236. In general, the arrangement according to the invention of the transfer station 60 on the main conveyor line 20 can be provided with any processing device 21 which holds the poultry bodies 152 with its own processing-holding means which is arranged and movable on a circular path, whereby it is configured for removing the poultry bodies 152, holding them during processing and delivering them, and is preferably controllable in the vertical position. Instead of the carousel-type processing devices 21 shown, which have a frame/support body rotatable about an axis, there come into consideration instead of such circular machines oval or generally round machines with correspondingly configured rotary holding means. A processing device can, for example, also be a device for cutting up which, for example, separates wings from the poultry body.

Weighing of the poultry body 152 before and after processing/treatment, that is to say downstream of a processing device or a group of processing devices, provides information about the yield achieved for a poultry body 152. In particular, abnormal or unexpected deviations or variations in the weight of a poultry body 152, which is determined before and after processing, can give information about the functioning and mechanical operation of the processing device or a group of processing devices. In particular, operating problems which impair the yield can be detected. Deviations or variations in weight generally give information about the weight of the poultry body 152 which is achieved with the processing or is lost thereby. The weight data determined by weighing devices 902, 236 can be assigned to the poultry body 152 in question. Advantageously, the determined weight is assigned to an RFID element, which is arranged on the associated carrier device 402, 532. Advantageously, the weight data obtained for each poultry body 152 are stored electronically in a data processing system, equipped with processor and memory means, which is conventional per se. Weight and/or treatment data for each poultry body 152 can be used to determine, in a process as a whole, batches or sites to which the product obtained, in particular the product intended for sale, is assigned. Specific separated parts of the poultry body can be assigned and processed individually.

During the conveying of the carrier devices 402, 532 along the main conveyor device 302, the poultry bodies 152 are transferred from the carrier devices 402, 532 to the weighing devices 902 for weighing. Such weighing devices are shown in FIGS. 27 to 34. According to one form, the weighing device 902 is arranged next to the main conveyor device 302. In another embodiment, as shown in FIG. 2, the weighing device 902 is arranged in the main conveyor line 20 of the main conveyor device 302. With reference to FIGS. 27 to 34, a weighing device 902 will be described which is shown next to the main conveyor device 302.

First and second transport devices 914, 934 are held by a frame 906, which is suspended from a force-measuring device 910, for example a force sensor in the form of a load cell, or is arranged beneath it and connected therewith. The force-measuring device 910 is in turn held by means of a carrying or support element 908.

The first transport device 914 comprises a first circulating strand 922, for example a belt, which is arranged between a first drive or deflecting device or plate 920 and a second drive or deflecting device or plate 926. In the arrangement, the strand 922 passes through an inner section 921 located on the inside in the arrangement and an opposite, outer section 923 located on the outside in the arrangement. The drive device 920 is connected via a drive shaft 918 with a drive 916, for example a servomotor. The drive is arranged on the frame or support 906. The drive device 926 is also connected to the support or frame 906 via a drive shaft 924. It may be sufficient for only one of the shafts to be actively driven.

The second transport device 943 has a second circulating strand 942, for example a belt, which extends between a first drive or deflecting device or plate 940 and a second drive or deflecting device or plate 946, the strand 942 passing through a section 941 that is on the inside in the arrangement and an opposite, outer section 943. The drive device 940 is connected via a drive shaft 938 to a drive 936, for example a servomotor. The drive 936 is arranged on the support or frame 906. The drive 946 is connected to the support or frame 906 via a drive shaft 944. It may be sufficient for only one of the shafts to be actively driven.

The inner sections 921, 941 of the strands 922, 942 are each spaced apart from and parallel to one another, the arrangement being such that there is formed between the strands 922, 942 running along the inner sections 921, 942 a gap which receives a portion of the poultry legs 182, 192 between the hocks or ankle joints 188, 198 and the knees 186, 196. In one embodiment, as is shown in particular in FIGS. 27 and 28, the strands 922, 942 hold the poultry legs 182, 192 in the mentioned portions from beneath.

The arrangement and configuration is such that a carrier device 402, 532 which is loaded with a poultry body 152 travels further to the weighing device 902, where it is so arranged and moved that the poultry legs 182, 192 are oriented in a line with the gaps between the strands 922, 942. While the main conveyor device 302 moves the carrier device 402, 532 further, the left poultry leg 182 enters an entry transfer zone. The holding connection of the left poultry leg 182 with the carrier device 402, 532 there changes to the holding connection with the weighing device 902.

Figure 29:
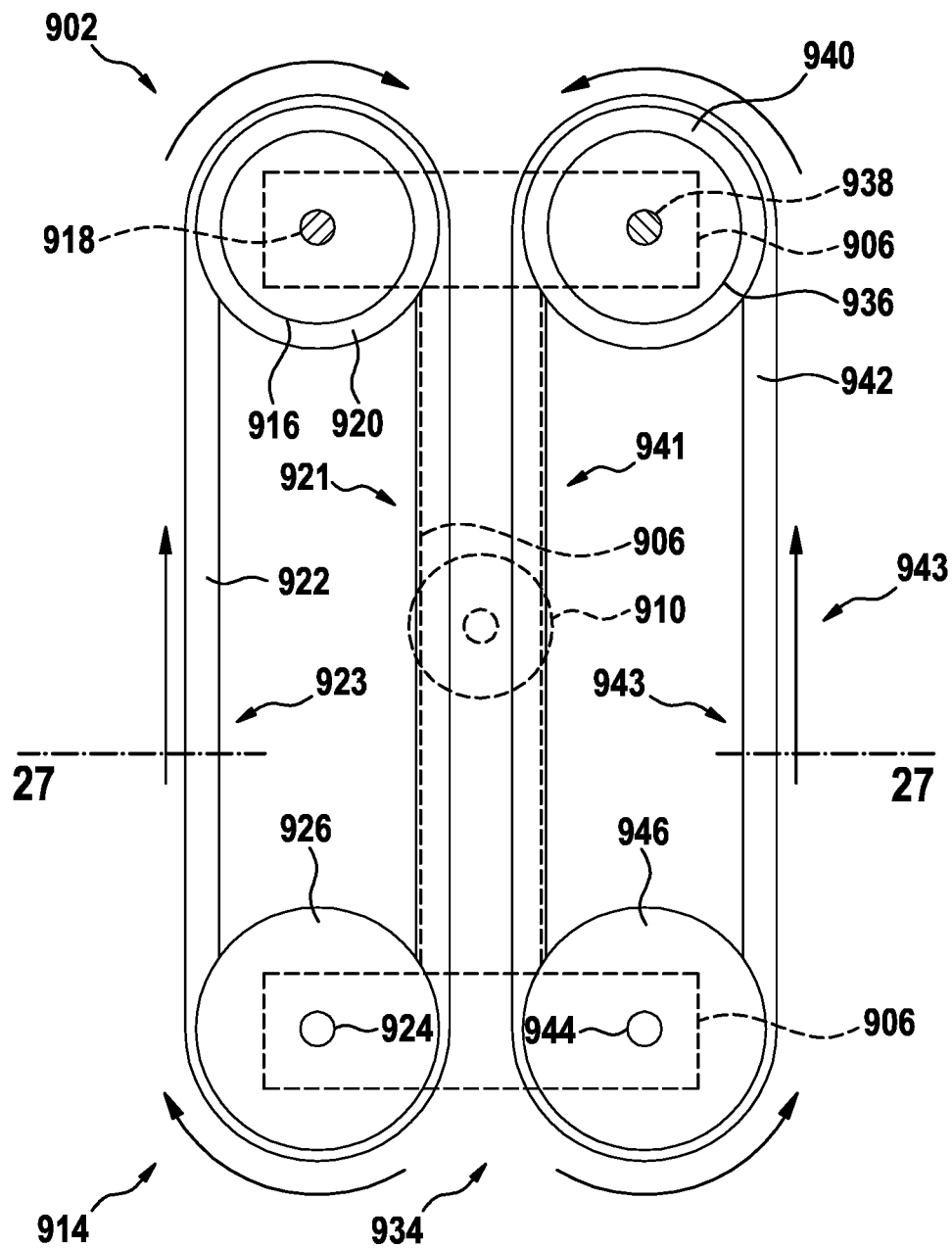
FIG. 29 shows, in a top view, an embodiment of a weighing unit with principles of the disclosed subject-matter.
Figure 30:
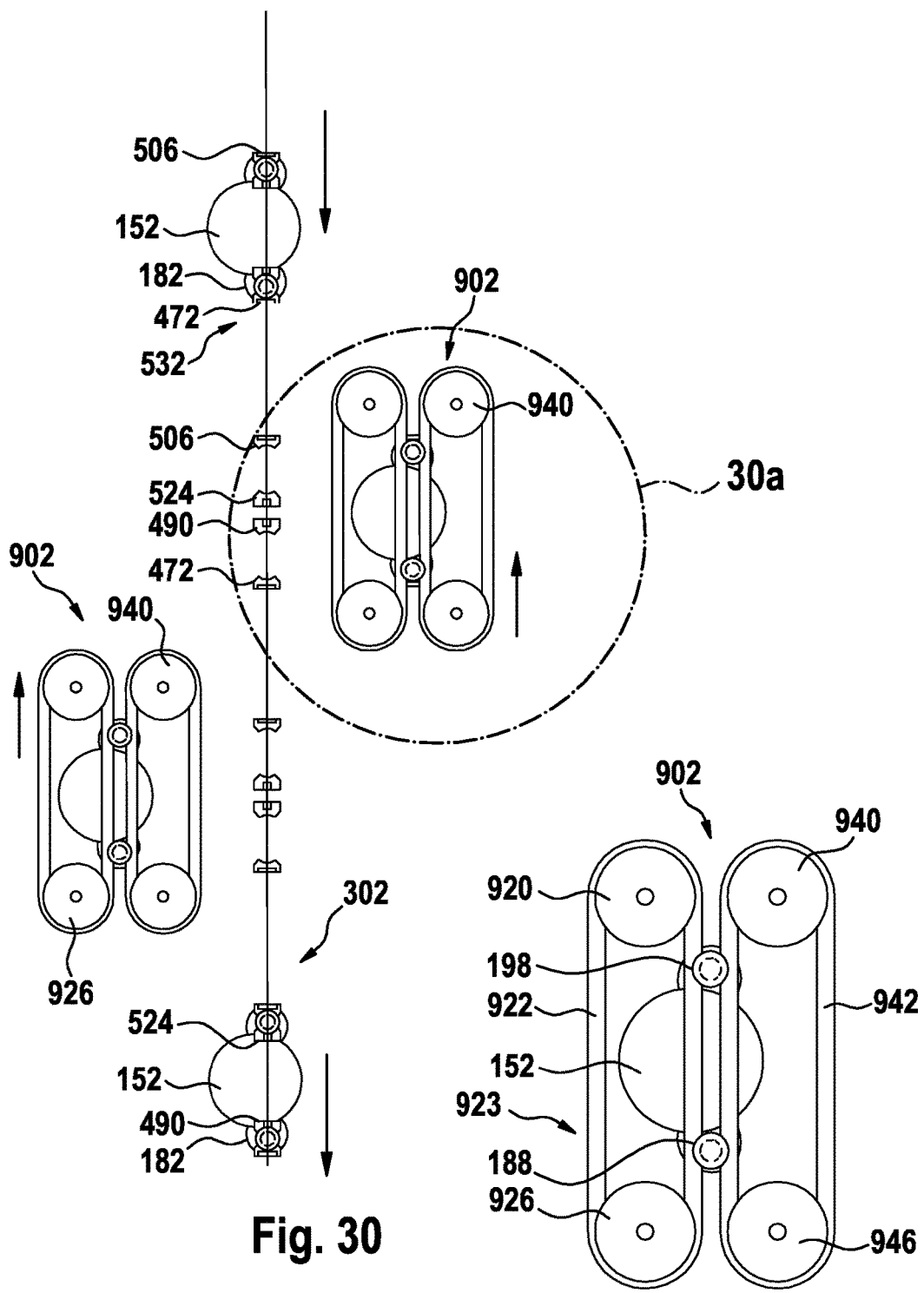
Figures 31, 31A:
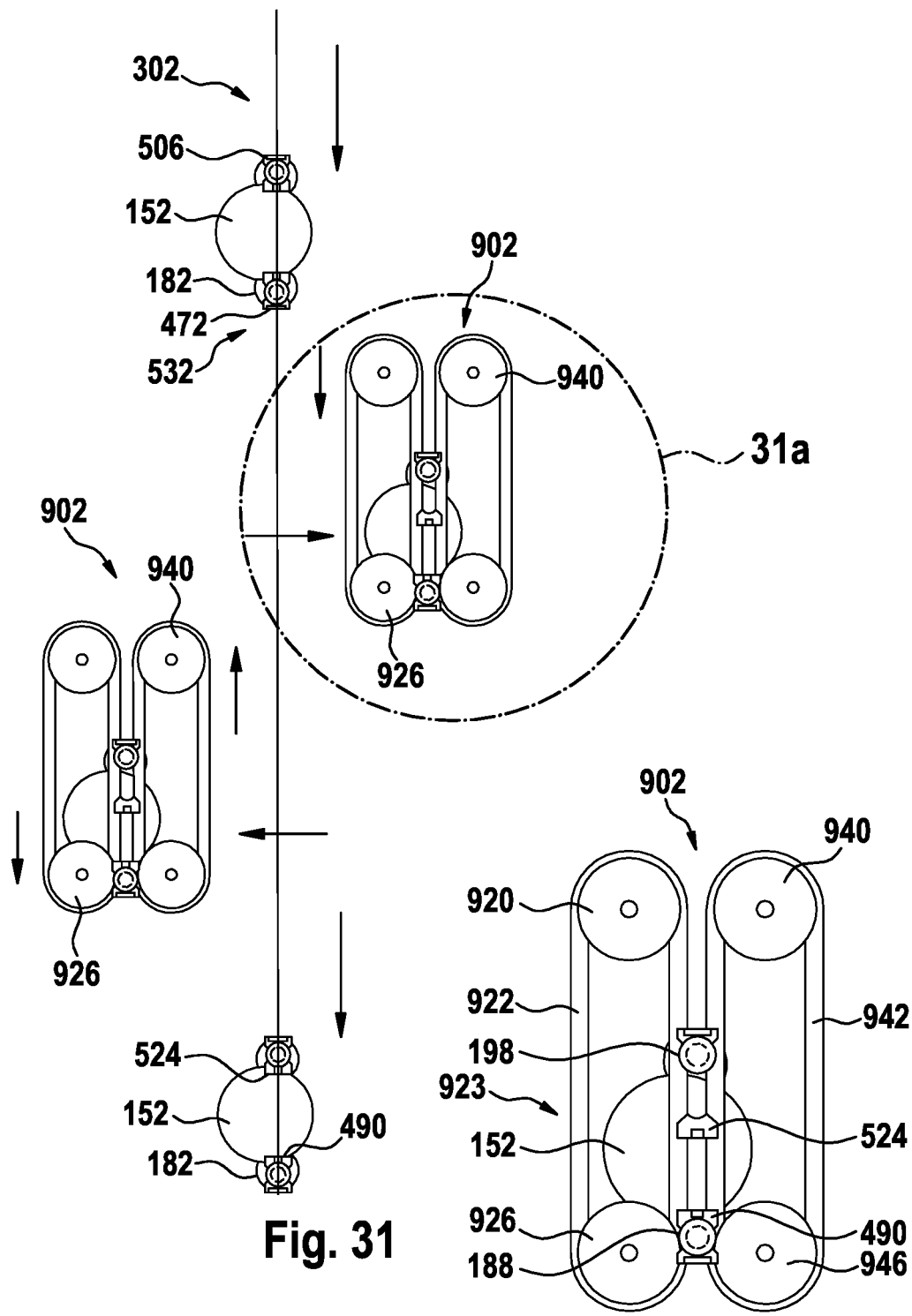
Figures 33, 33A:
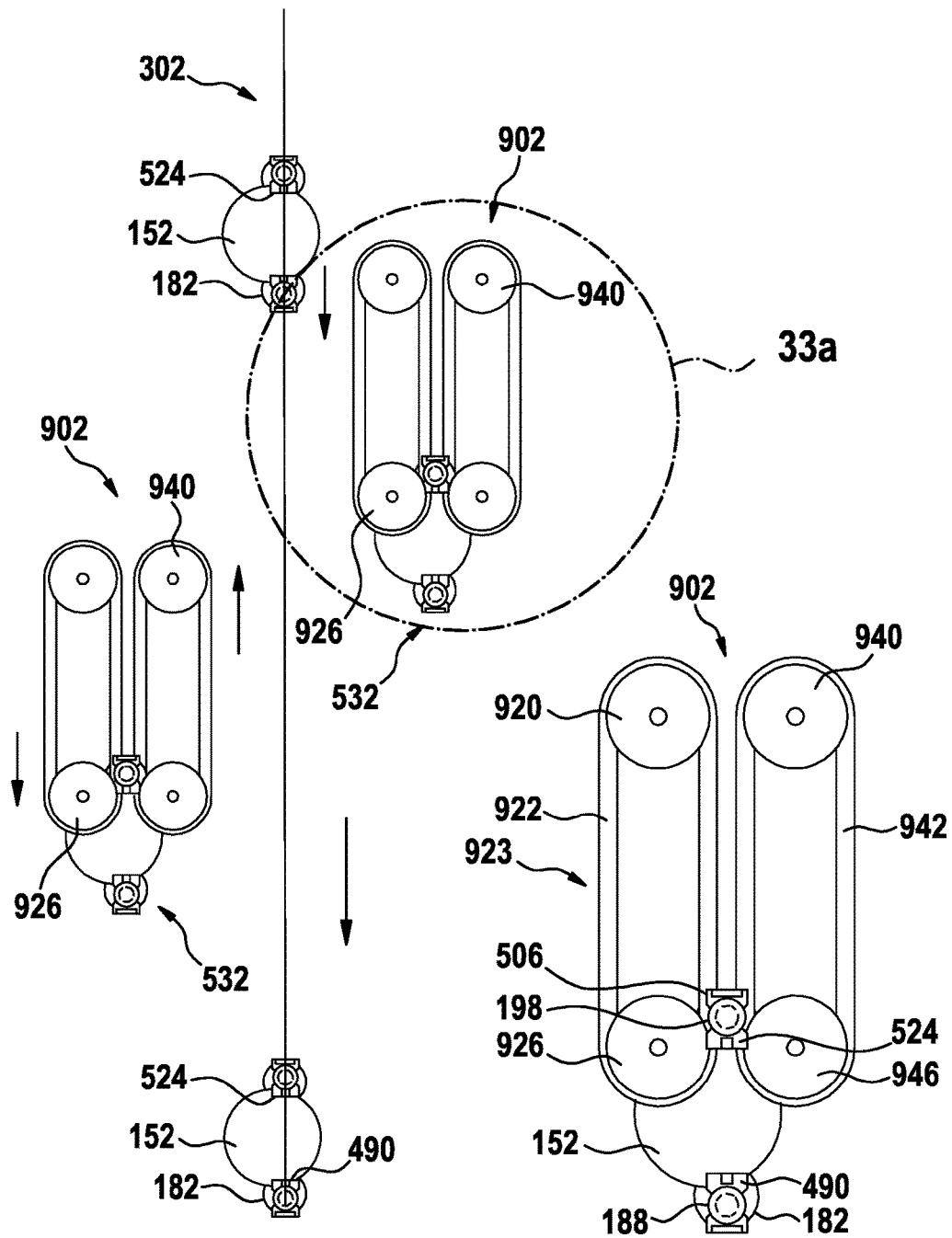
Figure 34:
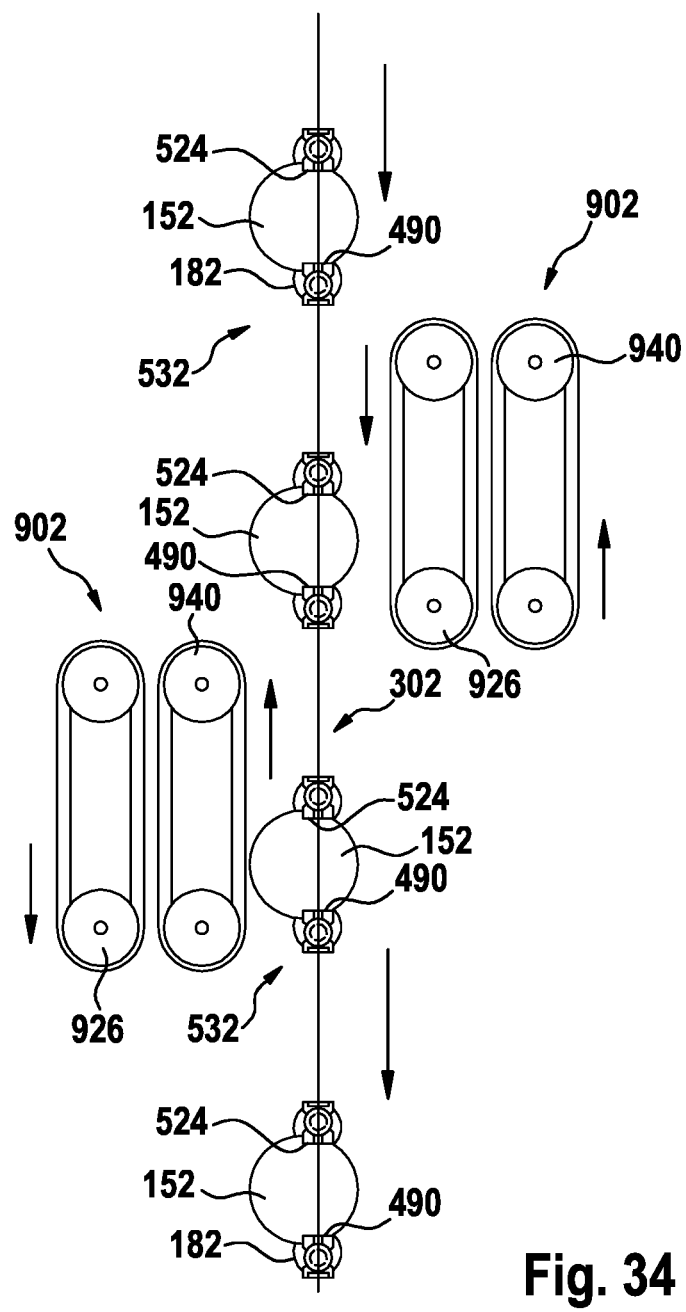

As can be seen in FIG. 29, the arrangement is such that a plate of the drive device 926 rotates to the right clockwise, so that the first strand 922 also rotates to the right, while a plate of the drive device 946, and accordingly also the second strand 942, rotates to the left counter-clockwise. It can be seen that a conveyor device is configured for conveying the poultry legs 182, 192 parallel to or in the direction of the conveyor section or main conveyor line 20 of the carrier device 402, 532. When the carrier device 402, 532 moves forwards, the strands 922, 942 engage the left poultry leg 182 at a point beneath the projecting carrying edges 472, 490. As soon as the left poultry leg 182 is located between the strands 922, 942, the control body or projection 450 of the first control element 444 is lifted, with the result that the first carrier-arm 478 is moved away from the first carrier-leg 468 to produce a clamping-free receiver, so that holding of the left poultry leg 182 is transferred from the carrier device 402, 532 to the weighing device 902. As already described above, in one embodiment the first control element 444 runs onto an inclined portion, for example of the first cam/guide track of the control device 540, so that the control element 444 is lifted. The drives 916, 936 are so configured that they move the left poultry leg 182 forwards at the same speed at which the right poultry leg 192 is moving towards the weighing device 902. When the right poultry leg 192 enters the entry transfer zone, the strands 922, 942 come into engagement with the right poultry leg 192 at a point beneath the projecting carrying edges 506, 524. As soon as the right poultry leg 192 is located in the gap between the strands 922, 942, the control body or projection 460 of the second control element 454 is lifted, for example by way of an inclined portion of the control device 545, with the result that the second carrier-arm 512 is moved away from the second carrier-leg 502. Consequently, holding of the right poultry leg 192 is transferred from the carrier device 402, 532 to the weighing device 902.

It can be seen that the weight of the poultry body 152 is measured by means of the force-measuring device 910 when the poultry body 152 is only held in the weighing device 902, that is to say the holding connection of the poultry body 152 with the carrier device 402, 532 has been removed. The force-measuring device 910 determines the weight of the poultry body 152 by subtracting the weight of the weighing device 902 from the measured total weight. In particular there are subtracted the weight of the strands 922, 942, of the elements of the drives 920, 940, 926, 946, of the drive shafts 918, 924, 938, 944, of motors 916, 936 of the drives 920, 940, of the support or frame 906 and also the weight of the forces resulting from the movement of the poultry body 152 through the weighing device 902. The force-measuring device accordingly subtracts the unladen weight of the mechanical device comprising the mentioned parts and optionally a dynamic weight component in order to determine the actual weight of the poultry body 152 while it passes through the weighing device 902. It is important that the poultry body 152 moves forward during weighing and the associated carrier device 402, 532 is not in engagement with the poultry body 152. The carrier device 402, 532 thereby moves together with the poultry body 152 in the main conveyor device 302.

The configuration and arrangement is such that, following the determination of the weight of the poultry body 152, the poultry legs 182, 192 are moved further by means of the strands 922, 942 to an exit transfer zone. While the poultry body 152 moves further, an empty carrier device 402, 532 is moved to the weighing device 902. The arrangement is such that the poultry legs 182, 192 are oriented in a line, that is to say according to the main conveyor line 20, with the first and second carrier-legs 468, 502 of the carrier device 532. As soon as the left poultry leg 182 leaves the transfer zone, holding of the left poultry leg 182 is transferred from the weighing device 902 to the carrier device 402, 532. The projecting carrying edges 470, 490 come into engagement with the left poultry leg 182 at a point above the strands 922, 942.

As soon as the left poultry leg 182 is located between the projecting carrying edges 472, 490, the control body or projection 450 of the first control element 444 is lowered, with the result that the first carrier-arm 478 is moved towards the first carrier-leg 468. Consequently, holding of the left poultry leg 182 is transferred from the weighing device 902 to the carrier device 402, 532. As described above, in one embodiment a control device has a first guide track with an inclined portion, onto which the first control element 444 moves for lowering. As soon as the right poultry leg 192 enters the exit transfer zone, the projecting carrying edges of 506, 524 engage the right poultry leg 192 at a point above the strands 922, 942. As soon as the right poultry leg 192 is located between the projecting carrying edges 506, 524, the control body or projection 460 of the second control element 454 is lowered so that the second carrier-arm 512 moves towards the second carrier-leg 502, with the result that holding of the right poultry leg 192 is transferred from the weighing device 902 to the carrier device 402, 532.

FIGS. 30 to 34 show an exemplary embodiment of a main conveyor device 302 with two weighing devices 902, which are arranged opposite one another on the main conveyor line 20. As a result, two poultry bodies 152 are lifted along the same region of the main conveyor device 302, contact between poultry bodies 152 which are in close succession being ruled out during weighing by the mentioned configuration. As soon as a carrier device 402, 532 that is loaded with a poultry body 152 reaches a weighing device 902, the steps described above are carried out again.

The invention claimed is:

1. A system for processing slaughtered and defeathered poultry bodies, comprising
a main conveyor device having carrier devices which are conveyed in succession along a main conveyor line and are each configured for the lateral transport of the poultry body, wherein each carrier device has a pair of carriers for suspending the poultry body by paired limbs,
and a plurality of processing devices,
characterised in
that for the processing-transport of the poultry bodies separately from the main conveyor device, the processing devices are each designed with a processing-holding means which is movable on a circulating path,
that the system has at least two transfer stations arranged in succession along the main conveyor line, each of which transfer stations has at least one associated processing device,
wherein each transfer station is formed by a transfer pair which has two rotary transfer devices, namely
a first rotary transfer device which, in each case on a tangential path, is arranged and configured for removing the poultry bodies from the carrier devices of the main conveyor line and for transferring the removed poultry bodies to the processing-holding means of an associated mentioned processing device, and
a second rotary transfer device which, in each case on a tangential path, is arranged and configured for removing the processed poultry bodies from the processing-holding means of an associated mentioned processing device and for transferring them to said carrier devices, which are free for the suspension of poultry bodies, for lateral further transport along the main conveyor line.

2. The system according to claim 1, characterised in that, in the processing path of the poultry bodies between the first rotary transfer device and the second rotary transfer device of said transfer pair, there is arranged at least one said processing device which is formed by a separating-processing device which separates poultry parts from the poultry bodies, and in that the separating-processing device is connected with a separating-conveyor device which is configured to convey separated poultry parts and is formed by a separating-circulating conveyor and a separating-transfer device, wherein the separating-transfer device is designed and arranged for removing the separated poultry parts from the separating-processing device and for transferring the separated poultry parts to the separating-circulating conveyor.

3. The system according to claim 2, characterised in that the separating-conveyor device is assigned a monitoring and testing device of the processing system which assigns the separated poultry parts conveyed by the separating-circulating conveyor to the poultry bodies from which the separated poultry parts have been removed, and which, for further conveying along the main conveyor path by the carrier device, are located downstream of the second rotary transfer device of the associated transfer pair.

4. The system according to claim 1, characterised in that at least one mentioned transfer station is configured to be in transfer communication with a processing group which comprises at least two processing devices.

5. The system according to claim 4, characterised in that at least two mentioned transfer stations are configured to be in transfer communication with a processing group which comprises at least, with a corresponding number, two processing devices, wherein the processing devices are divided between the pairs of rotary transfer devices of the transfer stations and are thereby completely separate from the carrier devices of the main conveyor line.

6. The system according to claim 4, characterised in that a viscera-removing group, which comprises three mentioned processing devices, is formed by
  a first processing device, namely a cloaca-cutting device for opening the rear end of the poultry body before evisceration,
  a second processing device, namely an opening device for making a cut in the poultry body from the cloaca to the breastbone, and
  a third processing device, namely an eviscerating device for removing the viscera from the poultry body.

7. The system according to claim 6, characterised in that the eviscerating device is connected with a viscera-conveyor device which is configured to convey removed viscera and is formed by a viscera-circulating conveyor and a viscera-transfer device, wherein the viscera-transfer device is designed and arranged to remove the viscera of each poultry body from the eviscerating device and to transfer the viscera to the viscera-circulating conveyor.

8. The system according to claim 7, characterised in that, in order to synchronise the transport of the viscera provided by the viscera-circulating conveyor with the transport of the eviscerated poultry bodies provided by the main conveyor device, the viscera-conveyor device is so configured that the viscera are associated with the separately transported poultry body from which they have been removed.

9. The system according to claim 6, characterised in that an inspection device for evaluating the viscera assigned to the associated eviscerated poultry body is formed in that an inspection conveyor portion of the viscera-circulating conveyor and an inspection conveyor portion of the main conveyor device are designed and arranged to run synchronously side by side.

10. The system according to claim 4, characterised in that one of the transfer stations is configured to be in transfer communication with a processing group which comprises three tissue-removing processing devices, wherein the group for processing has, in succession, a crop-removing device for removing neck tissue, in particular the crop and windpipe, a neck-removing device for breaking and removing the neck, and a lung-removing device for removing the lungs.

11. The system according to claim 10, characterised in that, along the main conveyor line, the tissue-removing processing group of the processing devices is arranged downstream of a viscera-removing processing group of the processing devices.

12. The system according to claim 1, characterised in that at least one of said transfer stations is configured to be in transfer communication with a mentioned processing device which is formed by a cleaning device.

13. The system according to claim 1, characterised in that at least one of said transfer stations is configured to be in transfer communication with a mentioned processing device which is formed by a weighing device.

14. The system according to claim 1, characterised in that at least one of said transfer stations is arranged between two conveyor portions of the main conveyor line that are formed by diverting the main conveyor line and the conveying directions of which are opposite, wherein the first rotary transfer device of the transfer pair is arranged on the conveyor portion situated upstream, and the second rotary transfer device of the transfer pair is arranged on the conveyor portion situated downstream.

15. The system according to claim 1, characterised in that there is arranged along the main conveyor line at least one weighing device which is formed by a transport and weighing means which is oriented and movable parallel to the main conveyor line and which is designed for the simultaneous and joint transport, separate from the carrier device of the main conveyor device, and weighing of in each case a poultry body.

16. The system according to claim 1, characterised in that the system is arranged between a pre-processing device and an post-processing device, wherein the pre-processing device has at least means for supplying, for slaughtering and for defeathering and the post-processing device has at least one means from the group of means for cooling, cutting up and filleting eviscerated poultry bodies.

17. The system according to claim 1, characterised in that at least one station of said transfer stations is arranged on a different running and processing side of the main conveyor device than at least one further mentioned transfer station.

18. The system according to claim 1, characterised in that the two carriers of the carrier pair of the carrier device are formed to be open on at least one lateral longitudinal side of the carrier device, such that the poultry bodies can be suspended and removed free of vertical offset.

19. The system according to claim 18, characterised in that the carrier devices are suspended, in each case free of rotation about a vertical axis corresponding to the direction of suspension of the poultry body, on a conveyor line, wherein the two carriers are formed to be open on both lateral longitudinal sides of the carrier device so that the poultry body can be suspended without offset in the vertical direction and removed without offset in the vertical direction.

20. The system according to claim 1, characterised in that each of the two carriers of a mentioned carrier device is configured with a carrier-holding device which, for the suspension and removal of the left and right paired limbs, can be controlled into an open state, a closed state and, associated therewith, into a holding state in dependence on the conveyor position of the carrier device along the main conveyor line.

21. The system according to claim 20, characterised in that the carrier-holding devices of the two carriers can be operated and controlled independently of and separate from one another.

22. The system according to claim 21, characterised in that the main conveyor device has at least one control-guide device which is formed with separate control members which are configured, for engagement in control elements of the two carrier-holding devices, in such a manner that they can be controlled into the open states and, on the other hand, into the closed states with an offset in terms of location and time.

23. The system according to claim 1, characterised in that each of the two carriers of each carrier device is configured with carrier elements which receive the paired limbs in a suspended manner and which are formed on at least one common longitudinal side of the carrier device which is associated with said transfer station, in each case with a passage in which the limbs of the poultry bodies are movable without hindrance, free of vertical offset, for suspension and for removal.

24. The system according to claim 23, characterised in that each rotary transfer device has gripper devices for gripping, in pairs, the paired limbs of the poultry bodies and for the transfer-transport of the poultry bodies, which gripper devices are configured to be on the same level as the carrier elements of the carriers of the carrier devices, so that the poultry bodies are movable free of vertical displacement for suspension and for removal.

25. The system according to claim 1, characterised in that the two rotary transfer devices of at least one transfer station have gripper devices which are arranged distributed in a line on the periphery of the rotary transfer device and are designed for gripping, holding and removing the paired limbs of the poultry bodies, wherein the distance separating the gripper devices is configured to be controllable in dependence on the rotary position and movement of the rotary transfer device, namely between at least a smallest distance, which corresponds to an associated separating distance of the carrier devices along the main conveyor line, and at least a greatest distance, which corresponds to an associated separating distance of the processing-holding devices forming the processing-holding means along the circulating path of the associated processing device.

26. The system according to claim 1, characterised in that all the rotary transfer devices are configured as modular elements which are identical in terms of construction and can be used mutually interchangeably.

27. The system according to claim 1, characterised in that at least one of the processing devices has a control device with which the processing-holding means is connected and can be controlled in terms of its height position in dependence on its path position along its circular path, wherein at least three height positions are provided, namely a starting position, which is associated with the transfer of the poultry bodies from the first rotary transfer device, at least one processing position during processing, and an end position which is associated with the removal of the poultry bodies from the processing device.

28. The system according to claim 27, characterised in that the processing-holding means is formed by a row of processing-holding devices which are arranged along the circular path and are each formed with a gripper device for receiving, firmly holding and delivering the paired limbs of the poultry bodies.

29. The system according to claim 1, characterised in that at least one of the processing devices comprises a mounting device on which there are arranged a row of processing units and the processing-holding means which is movable on the circular path.

30. The system according to claim 29, characterised in that each processing unit comprises at least one processing means from a group of processing means to which processing tools and positioning devices belong.

31. The system according to claim 29, characterised in that at least one of the processing devices comprises a control device with which at least one mentioned processing means of the processing units can be controlled to act on the poultry bodies in dependence on the processing-transport of the poultry body.

32. The system according to claim 1, wherein the carrier device comprises an upper portion with a connecting member for connection with a conveyor line of a conveyor device, and a lower portion having a gripper device which has a pair of carriers having limb receivers for suspension of the poultry body from paired limbs, characterised in that the carrier device has a carrier-control device which forms part of the carrier device and has at least one control element, and in that each of the two carriers is configured with a controllable holding device which is connected with the carrier-control device via the at least one control element and which has at least one holding member, as part of the limb receiver, which is controllable by means of a mentioned control element, wherein the limb receiver is open in an open position of the controllable holding member for the clamping-free insertion and removal of the limbs and can be placed in contact with the limbs only in a closed position of the holding member, wherein the limb receivers comprise mutually facing carrying edges between which there is formed a passage which is open on the two longitudinal sides of the carrier device, wherein the passage is provided at least in the state with the limb receiver open, and wherein the at least one control element is provided to control the carrier-holding device in dependence on the conveyor position of the carrier device along the main conveyor line.

33. The system according to claim 32, characterised in that the carrier-control device is so configured that said controllable holding members are freely movable beyond a controlled open position for further opening of the limb receiver.

34. The system according to claim 32, characterised in that the carrier-control device has a biasing device, associated with a mentioned control element, which produces a return force and is mounted on the carrier device, and in that the control element is mounted on the biasing device for controlled offset, movable under the return force along a track.

35. The system according to claim 32, characterised in that each of the two carriers has a pair of carrier-leg members, wherein free leg ends of the carrier-leg members are the only means for forming the limb receiver for the suspended holding of the left or right limb, and wherein in each case at least one carrier-leg member of the pair of leg members forming said controllable holding member is movable by means of the at least one control element from a closed position, which holds the associated limb receiver in the closed state, by an adjusting movement into an open position which is distanced from the other carrier-leg member and opens the limb receiver and can be placed in the closed position again by controlled elimination of the offset.

36. The system according to claim 35, characterised in that the carrier-control device is so configured that the movable leg ends are held in the closed position, free from clamping and return force, with a fixed maximum distance from the opposite carrier-leg member in the pair.

37. The system according to claim 35, characterised in that inner carrier-leg members of the two pairs of leg members are movable in a controlled manner for opening and closing the limb receivers, while the two other, outer leg members of the two pairs of leg members are fixedly arranged on the carrier device.

38. The system according to claim 35, characterised in that the movable leg members are each pivotably mounted about a pivot axis for movement between the closed position and the open position.

39. The system according to claim 38, characterised in that the control element is formed by a rod member, which is mounted on a biasing device which produces a return force, and a control body oriented transversely thereto, wherein in the closed state of the limb receiver, the rod member relieved of the return force of the biasing device engages the pivotable leg member to prevent pivoting, and wherein in the open state of the limb receiver, the control body engages, in the state in which it can be loaded under the return force, on the pivotable leg member in order to swing it open about the associated pivot axis.

40. The system according to claim 35, characterised in that the limb receiver of the holding device has at least one carrying element, and in that said carrying element is formed on at least one free leg end of the leg members.

41. The system according to claim 40, characterised in that said carrier elements are formed at the two free leg ends of the pairs of leg members, wherein the carrying elements have mutually facing carrying edges and wherein there is formed on at least one mentioned carrying edge an edge recess which forms a holding enclosure.

42. The system according to claim 41, characterised in that the mutually facing carrying edges are formed with projections and corresponding recesses in such a manner that, in the state with the limb receiver closed, a holding enclosure that is closed on all sides is formed.

43. The system according to claim 32, characterised in that the carrier-control device is configured to control the two controllable holding devices independently and separately from one another, wherein each holding device is in control communication with its own associated mentioned control element.

44. The system according to claim 43, characterised in that the two control elements each have a control projection projecting from the carrier device with an arrangement such that the control projections are configured independently of one another for engagement in an individual control member of at least one control-guide device.

45. The system according to claim 44, characterised in that the two control projections project from the carrier device on mutually opposing longitudinal sides thereof.

46. The system according to claim 32, characterised in that the carrier device comprises a carrier housing having at least one cavity in which the carrier-control device is arranged.

47. The system according to claim 32, characterised in that there is formed on the connecting member, which is configured for connection with a conveyor line of a conveyor device, a pivot bearing for pivotal articulation about a horizontal pivot axis, wherein the horizontal pivot axis is so oriented that the carrier device in the suspended state for the lateral transport of a poultry body comes to lie parallel to the straight-line section of the conveyor line.

* * * * *